United States Patent
Seki et al.

(10) Patent No.: US 10,044,250 B2
(45) Date of Patent: Aug. 7, 2018

(54) ARMATURE, METHOD FOR WINDING ARMATURE COIL, AND DC MOTOR

(71) Applicant: ASMO CO., LTD., Shizuoka-ken (JP)

(72) Inventors: Akihiko Seki, Toyokawa (JP); Tomohisa Okamoto, Hamamatsu (JP); Takehiko Ohshita, Kosai (JP)

(73) Assignee: DENSO CORPORATION, Kariya (JP)

( * ) Notice: Subject to any disclaimer, the term of this patent is extended or adjusted under 35 U.S.C. 154(b) by 855 days.

(21) Appl. No.: 14/518,019

(22) Filed: Oct. 20, 2014

(65) Prior Publication Data

US 2015/0108869 A1 Apr. 23, 2015

(30) Foreign Application Priority Data

Oct. 22, 2013 (JP) .................................. 2013-219374
Aug. 5, 2014 (JP) .................................. 2014-159601

(51) Int. Cl.
*H02K 23/36* (2006.01)
*H02K 1/24* (2006.01)
(Continued)

(52) U.S. Cl.
CPC ............... *H02K 23/36* (2013.01); *H02K 1/24* (2013.01); *H02K 3/18* (2013.01); *H02K 3/28* (2013.01);
(Continued)

(58) Field of Classification Search
CPC .. H02K 1/24; H02K 3/18; H02K 3/28; H02K 15/095; H02K 23/36; H02K 23/30; H02K 23/38
(Continued)

(56) References Cited

U.S. PATENT DOCUMENTS 7,959,238 B2    6/2011    Qin et al.
8,941,280 B2    1/2015    Sakon et al.
(Continued)

FOREIGN PATENT DOCUMENTS

CN    101933217 A    12/2010
CN    102132475 A    7/2011
(Continued)

OTHER PUBLICATIONS

Japanese Office Action for Application No. 2013-219374, dated Oct. 25, 2016, including English language translation (6 pages total).
(Continued)

*Primary Examiner* — Naishadh Desai
(74) *Attorney, Agent, or Firm* — Patterson Thuente Pedersen, P.A.

(57) ABSTRACT

An armature includes an armature core, teeth, a commutator, concentrated winding wires, and distributed winding wires. Each of the teeth includes a first branch portion and a second branch portion. Each of segments in the commutator has a riser. A start end and a terminal end of the concentrated winding wire are pulled out separately in a direction getting closer to the commutator and in a direction away from the commutator. The conductor between the concentrated winding wires is hooked by the riser by which the conductor between the other concentrated winding wires is not hooked. A start end and a terminal end of the distributed winding wire are pulled out separately in a direction getting closer to the commutator and in a direction away from the commutator. The conductor between the distributed winding wires is hooked by the riser by which at least one of the conductor between the concentrated winding wires and the conductor between the other distributed winding wires is not hooked.

1 Claim, 25 Drawing Sheets

(51) Int. Cl.
*H02K 3/18* (2006.01)
*H02K 3/28* (2006.01)
*H02K 15/095* (2006.01)
*H02K 23/30* (2006.01)
*H02K 23/38* (2006.01)

(52) U.S. Cl.
CPC ........... *H02K 15/095* (2013.01); *H02K 23/30* (2013.01); *H02K 23/38* (2013.01); *Y10T 29/49009* (2015.01)

(58) Field of Classification Search
USPC ................................ 310/219–225, 233, 234
See application file for complete search history.

(56) References Cited

U.S. PATENT DOCUMENTS

| | | | |
|---|---|---|---|
| 2001/0038252 A1* | 11/2001 | Yamamoto | H02K 23/32 310/207 |
| 2002/0121831 A1 | 9/2002 | Egawa et al. | |
| 2005/0029894 A1 | 2/2005 | Egawa et al. | |
| 2007/0152531 A1 | 7/2007 | Santo et al. | |
| 2008/0280469 A1* | 11/2008 | Kageyama | H02K 13/04 439/188 |
| 2010/0289326 A1 | 11/2010 | Qin et al. | |
| 2010/0308681 A1 | 12/2010 | Kawashima et al. | |
| 2011/0095638 A1 | 4/2011 | Sakata et al. | |
| 2012/0319520 A1 | 12/2012 | Sakon et al. | |
| 2014/0009027 A1 | 1/2014 | Kawai et al. | |

FOREIGN PATENT DOCUMENTS

| | | | |
|---|---|---|---|
| JP | S 53-164611 U | 6/1977 | |
| JP | H11-252843 A | 9/1999 | |
| JP | 2003-259582 A | 9/2003 | |
| JP | 2005-224052 A | 8/2005 | |
| JP | 2010-093930 A | 4/2010 | |
| JP | 2010-98927 | 4/2010 | |
| JP | 2010-0213490 A | 9/2010 | |
| JP | 2010-264975 A | 11/2010 | |
| JP | 2010-283963 A | 12/2010 | |
| JP | 2012-223047 A | 11/2012 | |
| JP | 2013-233085 A | 11/2013 | |
| JP | 2014-14199 A | 1/2014 | |
| WO | WO 2011/121991 A1 | 10/2011 | |

OTHER PUBLICATIONS

Office Action for CN Application No. 201410557327.9, dated Dec. 21, 2017, 21 pages (CN Office Action pp. 1-10; English Translation pp. 11-21).

Japanese Office Action for Application No. 2014-159601, dated Feb. 27, 2018 (4 pgs) and English Machine Translation (4 pgs) (8 pgs total).

* cited by examiner

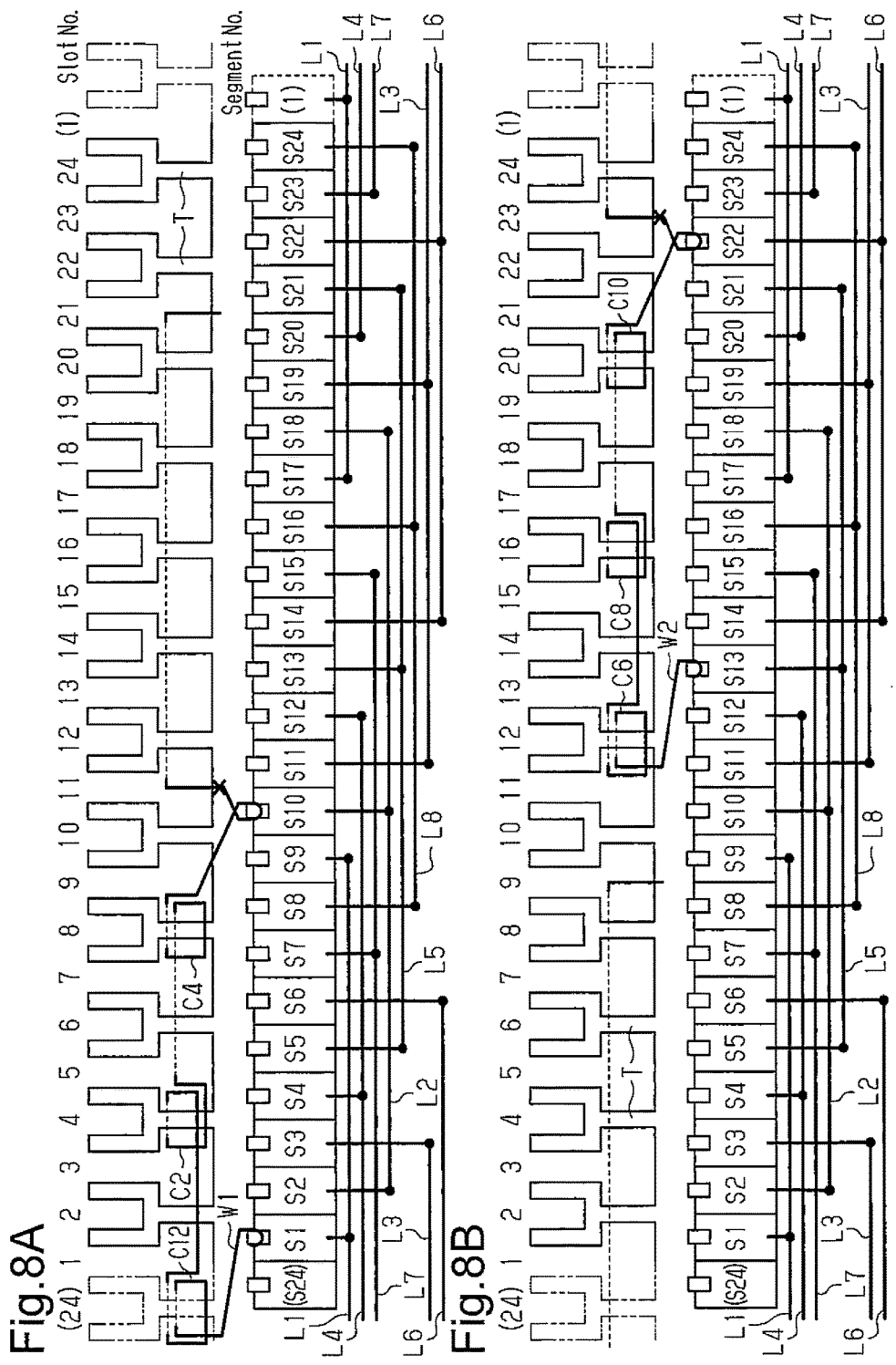

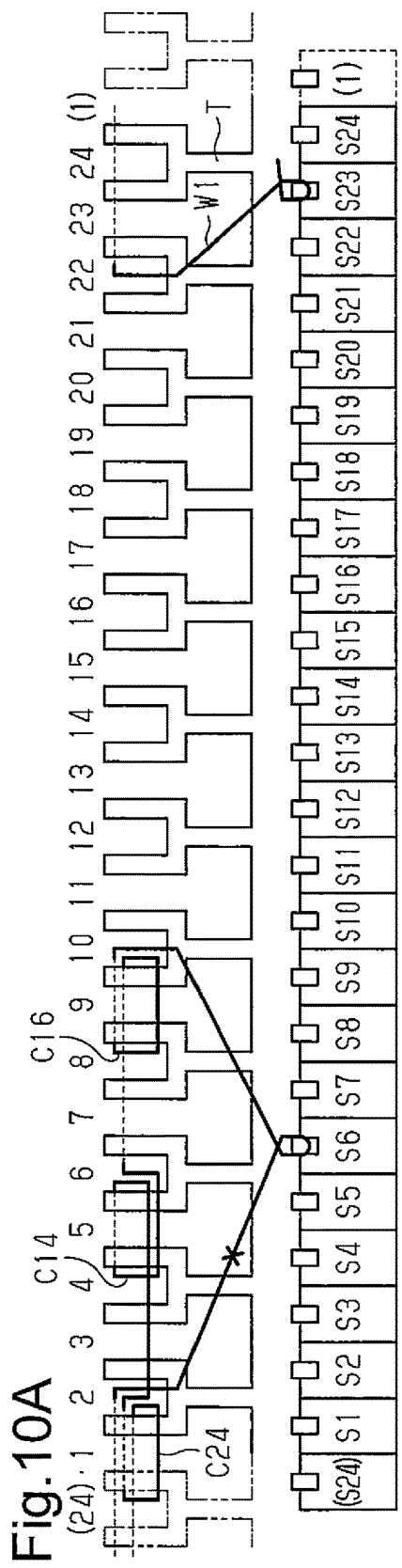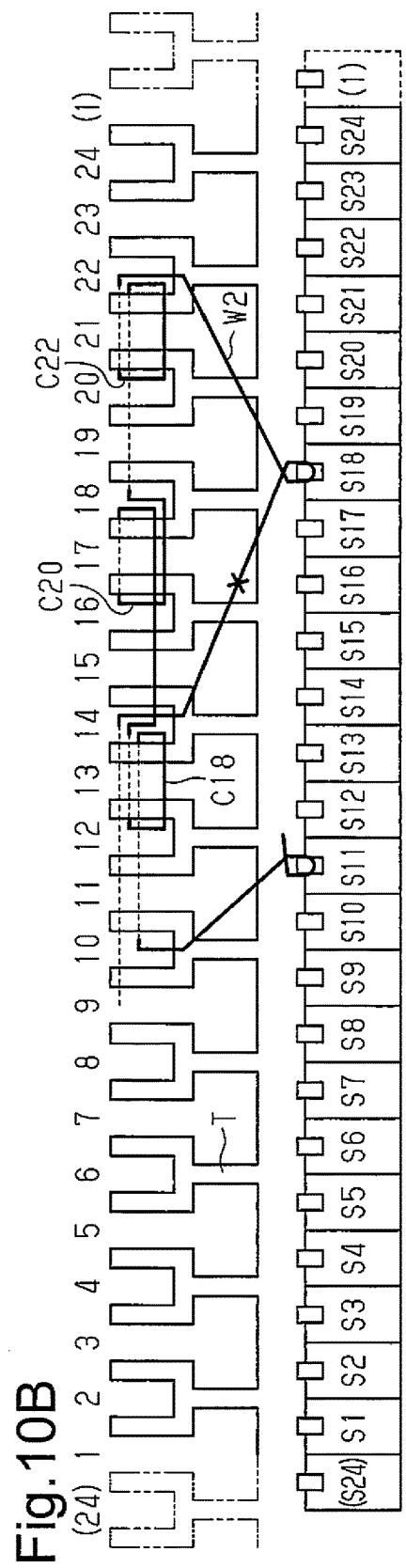
Fig.10A
Fig.10B

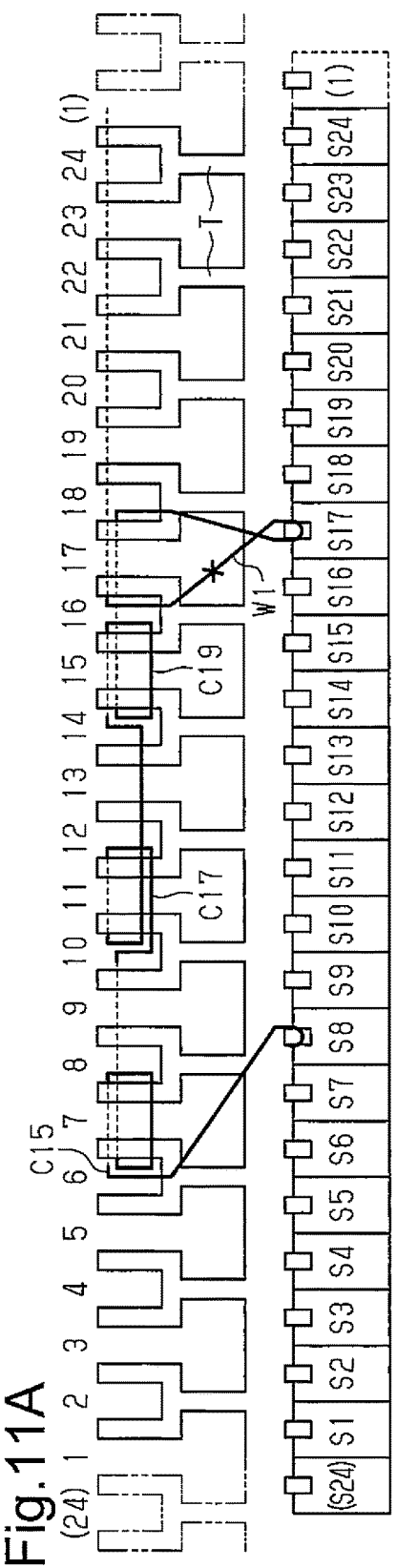
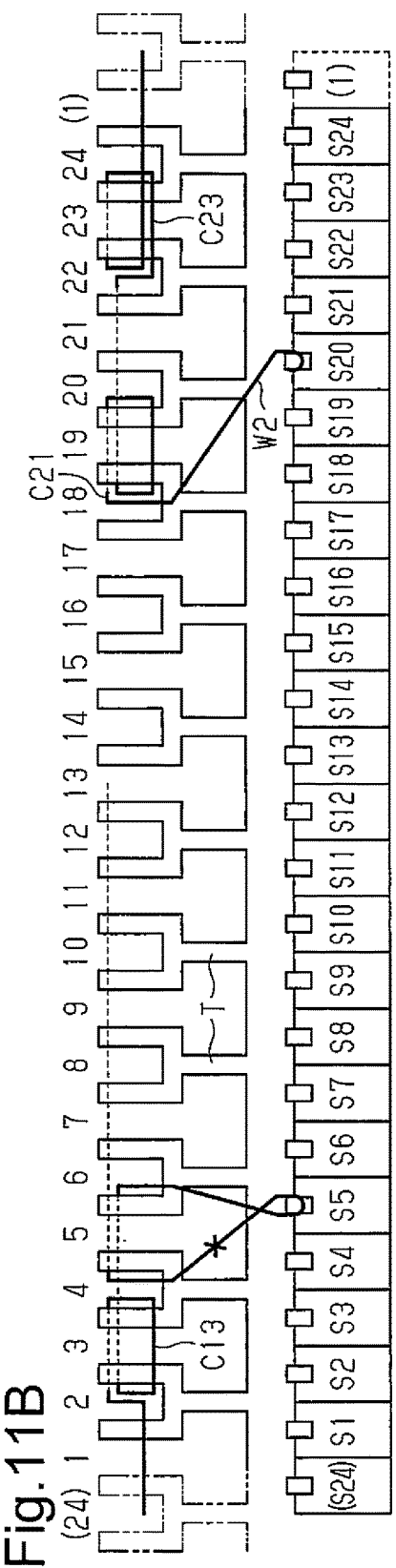
Fig.11A
Fig.11B

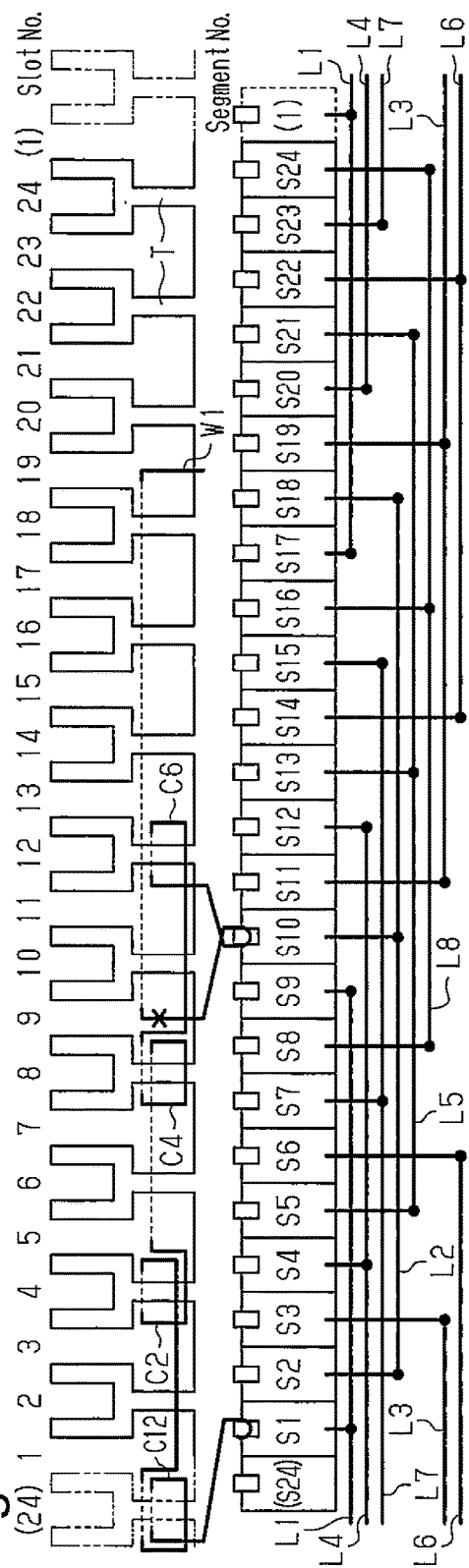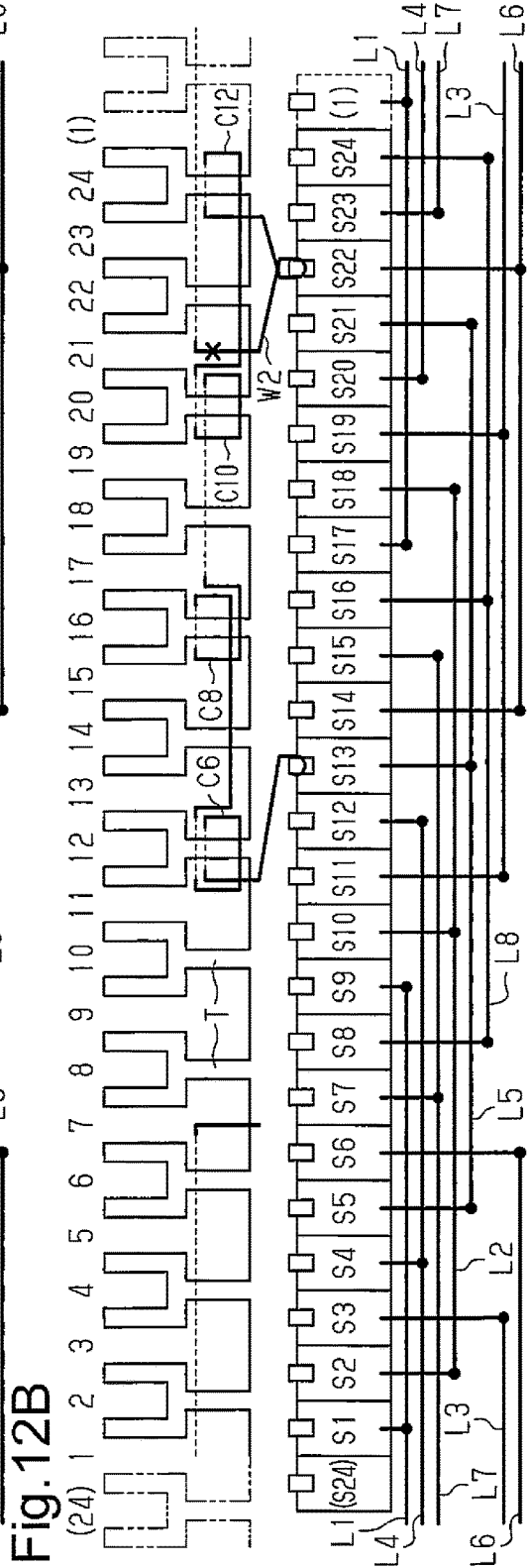

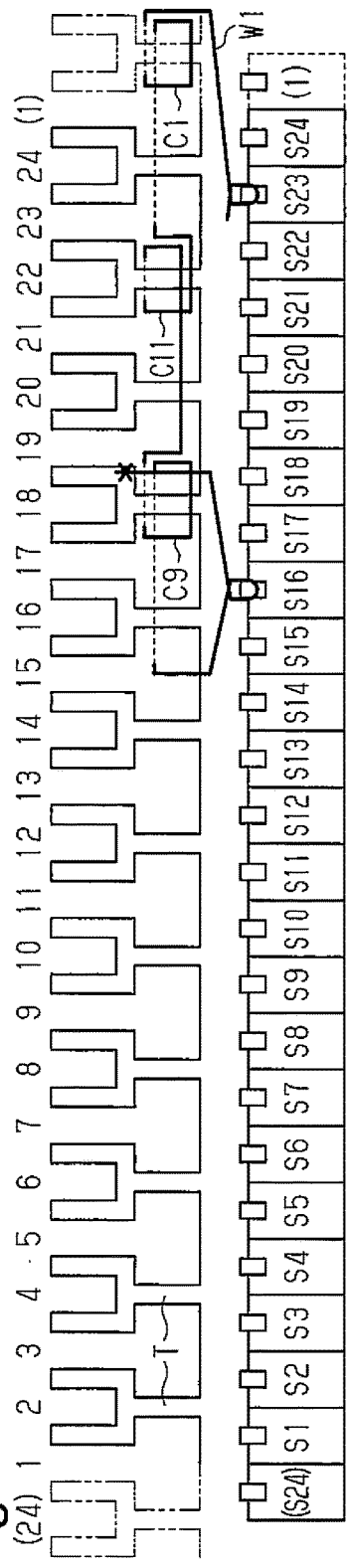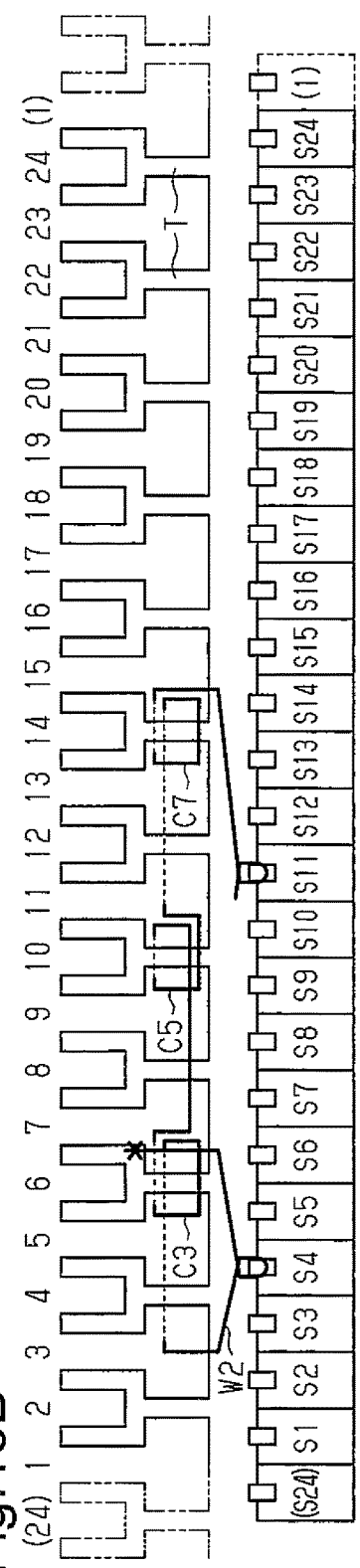

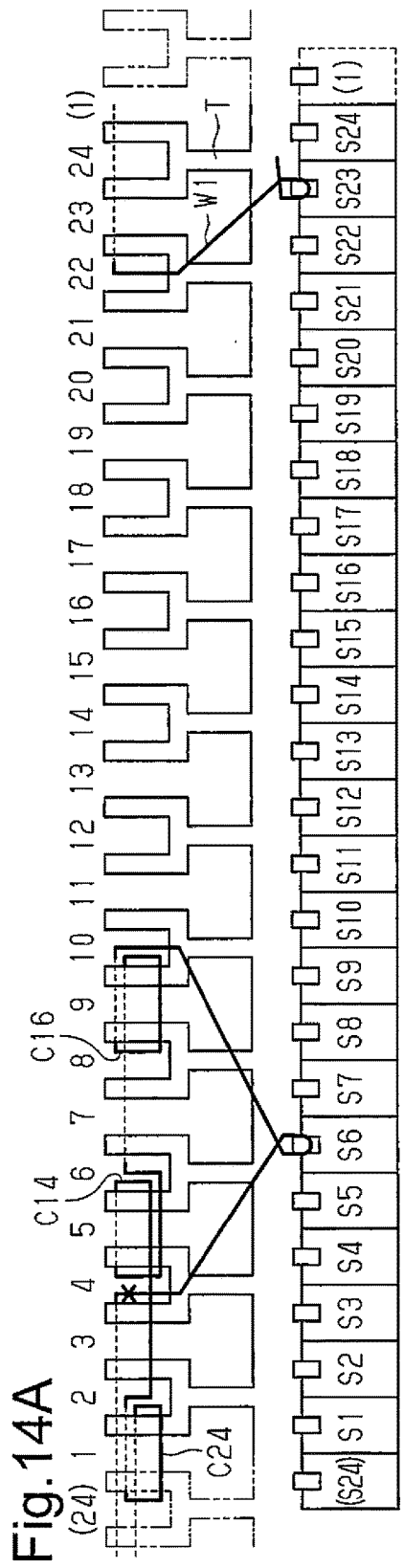
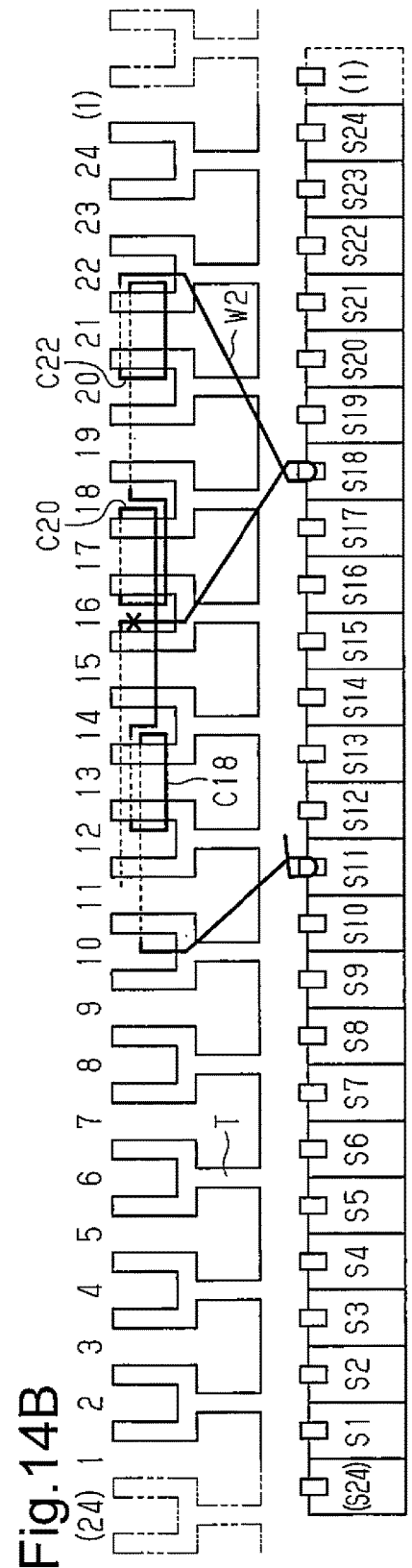
Fig. 14A
Fig. 14B

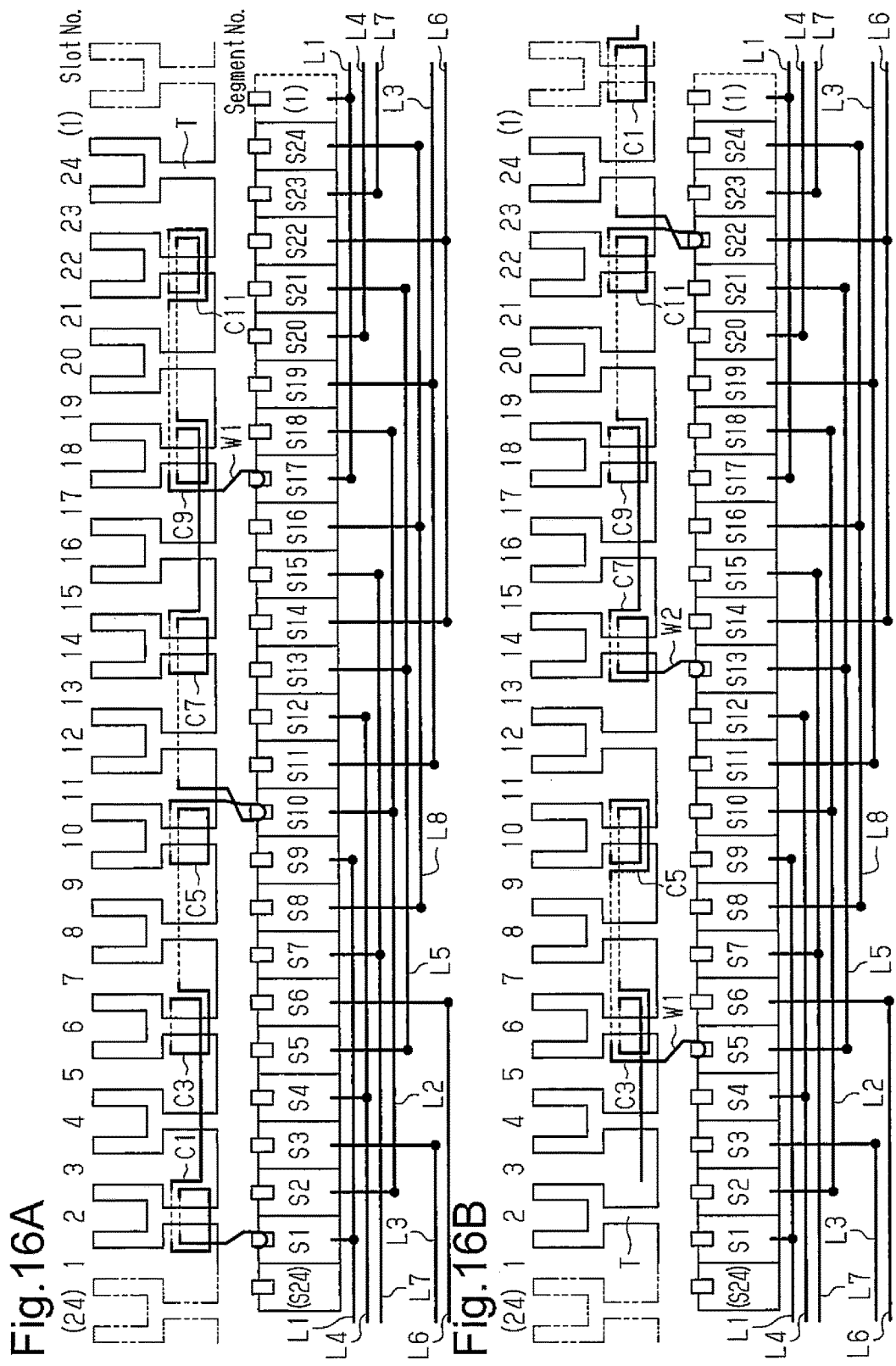

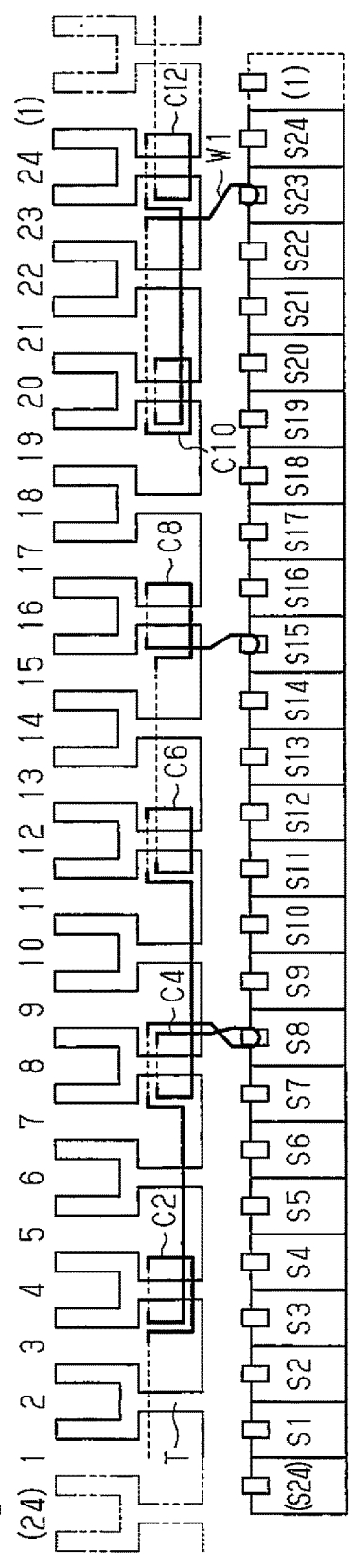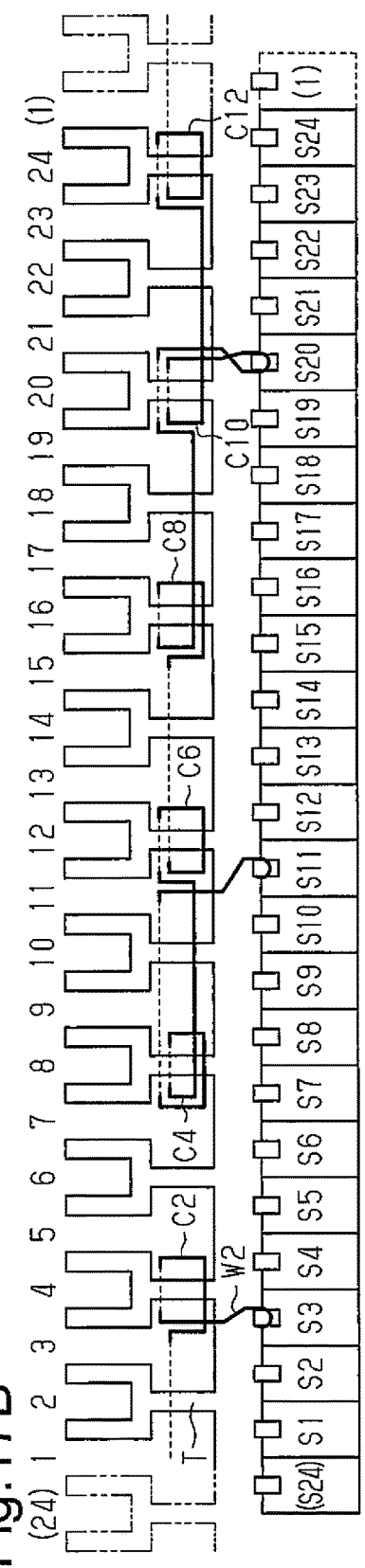

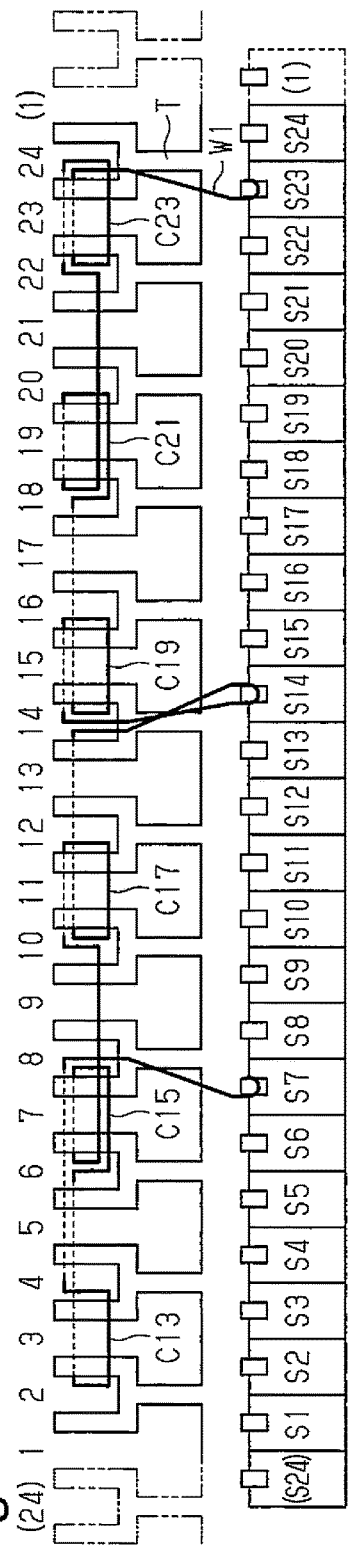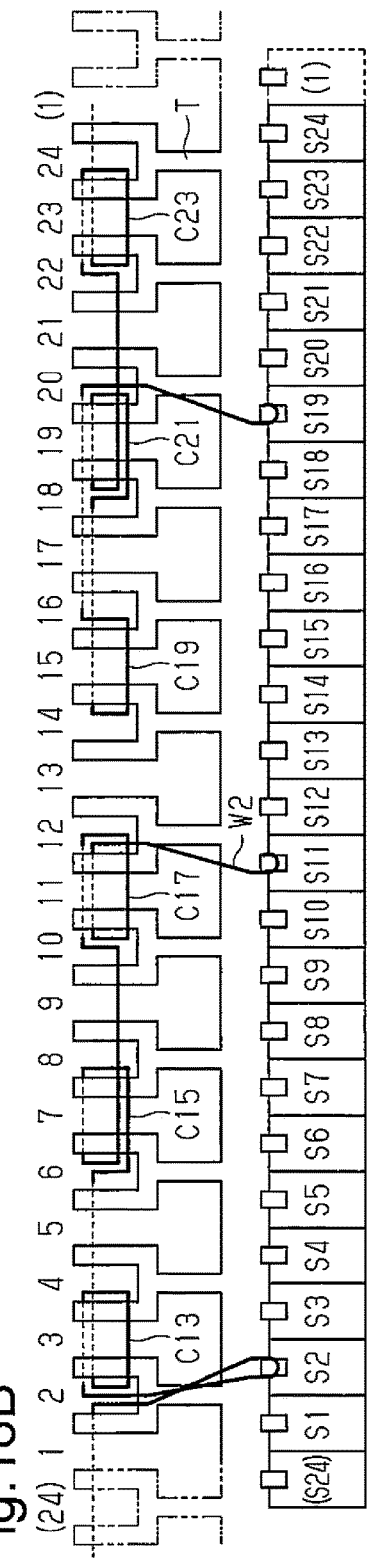

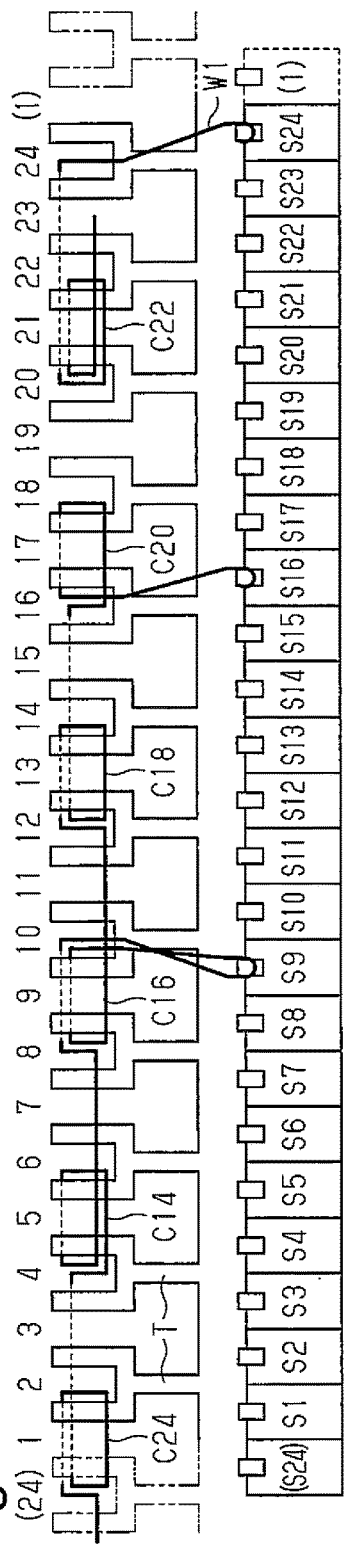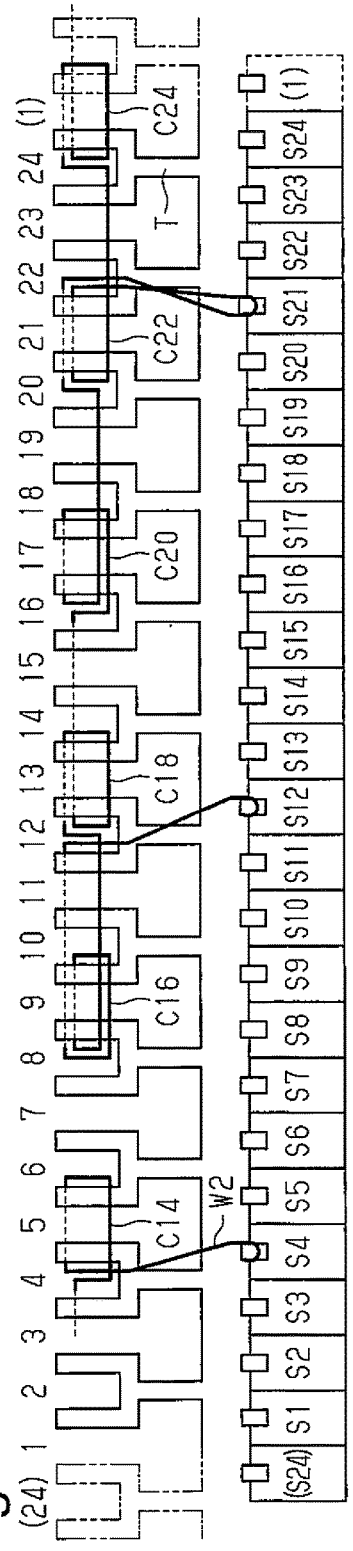

ARMATURE, METHOD FOR WINDING ARMATURE COIL, AND DC MOTOR

RELATED APPLICATIONS

This application claims benefit of priority of Japanese Application No. 2013-219374, filed Oct. 22, 2013, and Japanese Application No. 2014-159601, filed Aug. 5, 2014, said applications being hereby fully incorporated herein by reference.

BACKGROUND OF THE INVENTION

The present invention relates to an armature, a winding-wire winding method of an armature, and a DC motor.

An armature of a DC motor described in Japanese Patent Laid-Open Publication No. 2010-98927 has a plurality of teeth aligned in a circumferential direction of an armature core. Each of the teeth has a pair of branch portions formed while branching in a bifurcated manner. A winding wire of concentrated winding is provided at a base end portion of each of the teeth. A winding wire of distributed winding is provided between the branch portions of the mutually adjacent teeth. As a result, an amount of a copper wire used in the windings can be reduced, and moreover, a DC motor with less cogging is realized.

Moreover, in the armature, a commutator juxtaposed with the armature core is provided. In the commutator, segments in the same number as the number of slots are provided. A short-circuit wire connecting the plurality of segments in an electrical conduction state is hooked and connected to a riser provided in each segment in order to make the corresponding plurality of segments at the same potential. Moreover, a winding wire wound around each of the teeth is hooked and connected to the riser.

SUMMARY OF THE INVENTION

The number of segments increases as the number of winding wires increases. In this case, a width of each segment in the circumferential direction becomes short. That is, a distance between the risers of the adjacent segments becomes short. Thus, if the risers, on which a plurality of winding wires are hooked in addition to the short-circuit wires, are adjacent to each other, its insulation cannot be ensured easily.

Thus, in order to ensure insulation between the risers of the adjacent segments, the width of the segment in the circumferential direction can be made longer. In this case, a diameter of the commutator becomes large, which results in an increase in a size of the armature and hence, the size of the DC motor. Thus, prolongation of the width of the segment in the circumferential direction has limitation.

When one of a start end part and a terminal end part of the short-circuit wire and a winding end part of the winding wire are to be connected to the riser of the segment, the start end part and the terminal end part of the short-circuit wire are hooked on the riser of the segment. After that, the winding end part of the winding wire is hooked on the riser of the segment, and a winding work of the winding wire is performed.

Therefore, the winding end part of the winding wire might be hooked on the riser of the same segment on which the start end part or the terminal end part of the short-circuit wire is hooked. When the winding end part of the winding wire is hooked on the riser of the segment, there is a concern that a hooked part of the start end part or the terminal end part of the short-circuit wire previously hooked is loosened by the hooking. Therefore, when one of the start end part and the terminal end part of the short-circuit wire and the winding end part of the winding wire are joined and connected by fusing or the like, there is a concern that the short-circuit wire cannot be connected with accuracy.

Particularly, there is a problem in a DC motor in which the number of winding wires, the number of segments, and the number of magnetic poles are large and there are many short-circuit wires, accordingly.

Moreover, as the number of the winding wires and the number of segments connecting the winding wires increase, the distance between the risers of the adjacent segments becomes short. In this case, when the winding end part of the winding wire is to be wound and stopped at the riser of the segment, the risers of the adjacent segments present an obstacle. Thus, an easy and accurate winding work cannot be performed in a short time.

A first object of the present invention is to provide an armature, a winding-wire winding method of an armature, and a DC motor which can ensure insulation between the adjacent risers without enlarging the diameter of the commutator.

A second object of the present invention is to provide an armature, a winding-wire winding method of an armature, and a DC motor capable of connection without loosening the short-circuit wire and capable of performing a winding work of the winding wire easily and with accuracy.

To achieve the first object, first aspect according to the present invention is an armature including: an armature core; a plurality of teeth provided so as to be arranged in a circumferential direction of the armature core, each of the teeth including an inner winding portion located on a base end side and extending in a radial direction and a first branch portion and a second branch portion branching from a distal end of the inner winding portion in a bifurcated manner in the circumferential direction and extending in the radial direction; a commutator integrally rotated with the armature core, the commutator having segments in the number twice of the number of the teeth arranged in the circumferential direction and each of the segments having a riser; a plurality of concentrated winding wires, each of the concentrated winding wires being formed of a conductor wound around each of the inner winding portions of the teeth; and a plurality of distributed winding wires, each of the distributed winding wires being formed of the conductor wound between the first branch portion of one of the adjacent teeth and the second branch portion of another of the teeth. Each of the concentrated winding wires is wound such that a start end and a terminal end thereof are pulled out separately in a direction getting closer to the commutator and in a direction away from the commutator. The conductor between the concentrated winding wires is hooked by the riser by which the conductor between the other concentrated winding wires is not hooked. Each of the distributed winding wires is wound such that a start end and a terminal end thereof are pulled out separately in a direction getting closer to the commutator and in a direction away from the commutator. The conductor between the distributed winding wires is hooked by the riser by which at least one of the conductor between the concentrated winding wires and the conductor between the other distributed winding wires is not hooked.

To achieve the first object, second aspect according to the present invention is a winding-wire winding method of an armature including: an armature core; a plurality of teeth provided so as to be arranged in a circumferential direction of the armature core, each of the teeth including an inner winding portion located on a base end side and extending in a radial direction and a first branch portion and a second branch portion branching from a distal end of the inner winding portion in a bifurcated manner in the circumferential direction and extending in the radial direction; a commutator integrally rotated with the armature core, the commutator having segments in the number twice of the number of the teeth arranged in the circumferential direction and each of the segments having a riser; a plurality of concentrated winding wires, each of the concentrated winding wires being formed of a conductor wound around each of the inner winding portions of the teeth; and a plurality of distributed winding wires, each of the distributed winding wires being formed of the conductor wound between the first branch portion of one of the adjacent teeth and the second branch portion of another of the teeth. The method includes winding the plurality of concentrated winding wires by two winding machines relatively arranged so as to face each other by 180°, each of the two winding machines winding a half of the plurality of concentrated winding wires. The method includes, after winding the concentrated winding wires, winding the plurality of distributed winding wires by the two winding machines. Each of the two winding machines winds a half of the plurality of distributed winding wires. Each of the concentrated winding wires is wound such that a start end and a terminal end thereof are pulled out separately in a direction getting closer to the commutator and in a direction away from the commutator. The conductor between the concentrated winding wires is hooked by the riser by which the conductor between the other concentrated winding wires is not hooked. Each of the distributed winding wires is wound such that a start end and a terminal end thereof is pulled out separately in a direction getting closer to the commutator and in a direction away from the commutator. The conductor between the distributed winding wires is hooked by the riser by which at least one of the conductor between the concentrated winding wires and the conductor between the other distributed winding wires is not hooked.

To achieve the first object, third aspect according to the present invention is a winding-wire winding method of an armature including: an armature core; a plurality of teeth provided so as to be arranged in a circumferential direction of the armature core, each of the teeth including an inner winding portion located on a base end side and extending in a radial direction and a first branch portion and a second branch portion branching from a distal end of the inner winding portion in a bifurcated manner in the circumferential direction and extending in the radial direction; a commutator integrally rotated with the armature core, the commutator having segments in the number twice of the number of the teeth arranged in the circumferential direction and each of the segments having a riser; a plurality of concentrated winding wires, each of the concentrated winding wires being formed of a conductor wound around each of the inner winding portions of the teeth; and a plurality of distributed winding wires, each of the distributed winding wires being formed of the conductor wound between the first branch portion of one of the adjacent teeth and the second branch portion of another of the teeth. The method includes winding the plurality of concentrated winding wires by two winding machines relatively arranged so as to face each other by 180°. The method includes winding the plurality of distributed winding wires by the two winding machines after the concentrated winding wires are wound. Each of the concentrated winding wires is wound by the two winding machines so that the number of turns of each of the concentrated winding wires is shared. The conductor between the concentrated winding wires is hooked by the riser by which the conductor between the other distributed winding wires is not hooked. Each of the distributed winding wires is wound by the two winding machines so that the number of turns of each of the distributed winding wires is shared. The conductor between the distributed winding wires is hooked by the riser by which at least one of the conductor between the concentrated winding wires and the conductor between the other distributed winding wires is not hooked.

To achieve the second object, fourth aspect according to the present invention is an armature comprising a commutator including: a plurality of segments grouped into a plurality of sets, each set including the plurality of segments, and each of the segments having a riser; a plurality of short-circuit wires, each of the short-circuit wires being configured such that the plurality of segments are electrically conducted to equalize in potential the plurality of segments in each set, each of the short-circuit wires including a start end portion, a terminal end portion, and a non-end portion located between the start end portion and the terminal end portion, and the non-end portion is hooked by the riser of segment in the same set as the segment to which the start end portion is connected and the segment to which the terminal end portion is connected but different from them. The non-end portion of each of the short-circuit wires is hooked by the riser of segment so as not to become adjacent to the non-end portion of another short-circuit wire in the circumferential direction. The winding wire is wound by using the riser of segment by which each of the non-end portions of the short-circuit wires is hooked.

To achieve the second object, fifth aspect according to the present invention is a winding-wire winding method of an armature including: a plurality of segments grouped into a plurality of sets, each set including the plurality of segments, and each of the segments having a riser; a plurality of short-circuit wires, each of the short-circuit wires being configured such that the plurality of segments are electrically conducted to equalize in potential the plurality of segments in each set, each of the short-circuit wires including a start end portion, a terminal end portion, and a non-end portion located between the start end portion and the terminal end portion, and the non-end portion is hooked by the riser of the segment in the same set as the segment to which the start end portion is connected and the segment to which the terminal end portion is connected but different from them. The method includes connecting the start end portion and the terminal end portion of each of the short-circuit wires to the segment in the same set as the segment by which the non-end portion is hooked so that the non-end portion of each of the short-circuit wires is not adjacent with the non-end portion of another short-circuit wire in a circumferential direction. The method includes bending the riser of the segment in the segments of each set excluding the riser of the segment by which the non-end portion is hooked in a direction in which the start end portion and the terminal end portion of the short-circuit wire can be held. The method includes winding the winding wire by using the riser by which the non-end portion is hooked and which is not bent.

BRIEF DESCRIPTION OF THE DRAWINGS

The invention, together with objects and advantages thereof, may best be understood by reference to the following description of the presently preferred embodiments together with the accompanying drawings in which:

FIG. 8A is an explanatory view of winding-wire winding processes 1 to 7 of an A flyer in the first embodiment;

FIG. 8B is an explanatory view of winding-wire winding processes 1 to 7 of a B flyer in the first embodiment;

FIG. 10A is an explanatory view of winding-wire winding processes 14 to 19 of the A flyer in the first embodiment;

FIG. 10B is an explanatory view of winding-wire winding processes 14 to 19 of the B flyer in the first embodiment;

FIG. 11A is an explanatory view of winding-wire winding processes 20 to 26 of the A flyer in the first embodiment;

FIG. 11B is an explanatory view of winding-wire winding processes 20 to 26 of the B flyer in the first embodiment;

FIG. 12A is an explanatory view of winding-wire winding processes 1 to 7 of an A flyer in a second embodiment;

FIG. 12B is an explanatory view of winding-wire winding processes 1 to 7 of a B flyer in the second embodiment;

FIG. 13A is an explanatory view of winding-wire winding processes 8 to 14 of the A flyer in the second embodiment;

FIG. 13B is an explanatory view of winding-wire winding processes 8 to 14 of the B flyer in the second embodiment;

FIG. 14A is an explanatory view of winding-wire winding processes 14 to 20 of the A flyer in the second embodiment;

FIG. 14B is an explanatory view of winding-wire winding processes 14 to 20 of the B flyer in the second embodiment;

FIG. 16A is an explanatory view of winding-wire winding processes 1 to 11 of an A flyer in a third embodiment;

FIG. 16B is an explanatory view of winding-wire winding processes 1 to 11 of a B flyer in the third embodiment;

FIG. 17A is an explanatory view of winding-wire winding processes 13 to 23 of the A flyer in the third embodiment;

FIG. 17B is an explanatory view of winding-wire winding processes 13 to 23 of the B flyer in the third embodiment;

FIG. 18A is an explanatory view of winding-wire winding processes 23 to 33 of the A flyer in the third embodiment;

FIG. 18B is an explanatory view of winding-wire winding processes 23 to 33 of the B flyer in the third embodiment;

FIG. 19A is an explanatory view of winding-wire winding processes 35 to 45 of the A flyer in the third embodiment;

FIG. 19B is an explanatory view of winding-wire winding processes 35 to 45 of the B flyer in the third embodiment;

DETAILED DESCRIPTION OF THE PREFERRED EMBODIMENTS (First Embodiment)

A first embodiment embodying the present invention will be described below by referring to FIGS. 1 to 11.

Figure 1:
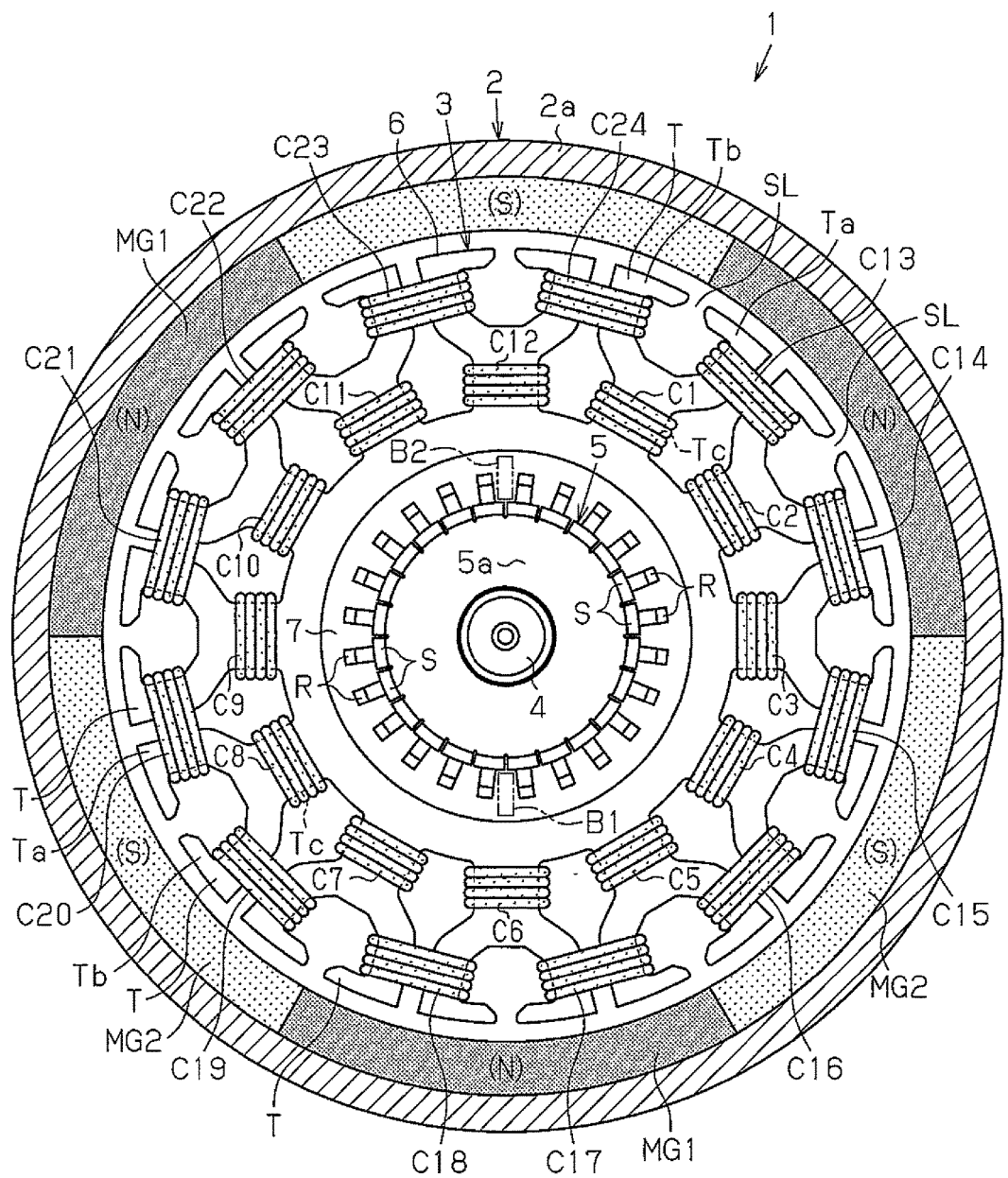
FIG. 1 is a sectional view of a DC motor according to a first embodiment of the present invention when seen from an axial direction.

As illustrated in FIG. 1, a DC motor 1 includes a stator 2 and an armature 3 arranged inside the stator 2.

(Stator 2)

On an inner circumferential surface of a substantially cylindrical yoke housing 2a constituting the stator 2, three first permanent magnets MG1 and three second permanent magnets MG2 as magnetic poles are fastened alternately so as to have an equal pitch (60° interval in this embodiment) in a circumferential direction.

The three first permanent magnets MG1 are magnetized in a radial direction so that an inside in the radial direction is an N-pole and an outside in the radial direction is an S-pole. On the other hand, the three second permanent magnets MG2 are magnetized in the radial direction so that the inside in the radial direction is the S-pole and the outside in the radial direction is the N-pole.

Therefore, in the stator 2, the three first permanent magnets MG1 are arranged at an interval of 120°, sandwiching the second permanent magnets MG2, respectively. In other words, the three second permanent magnets MG2 are arranged at a pitch of 120°, sandwiching the first permanent magnets MG1, respectively. The DC motor 1 has the number of magnetic poles of "6" by alternately arranging the three first permanent magnets MG1 and the three second permanent magnets MG2 in the circumferential direction. That is, the number of pole pairs is "3".

(Armature 3)

As illustrated in FIG. 1, the armature 3 includes a rotating shaft 4, the substantially cylindrical commutator 5 fixed to the rotating shaft 4, and an armature core 6 similarly fixed to the rotating shaft 4. This armature 3 has the rotating shaft 4 pivotally supported by the stator 2 and is supported rotatably with respect to the stator 2. The commutator 5 and the armature core 6 are both fixed to the rotating shaft 4 and are integrally rotated with rotation of the rotating shaft 4.

(Commutator 5)

As illustrated in FIG. 1, the commutator 5 has a cylindrical holding member 5a made of an insulating resin material fastened to the rotating shaft 4, and 24 segments S are arranged in a state spaced away from each other in order in a clockwise direction in a circumferential direction of an outer circumferential surface of the holding member 5a.

Figure 2:
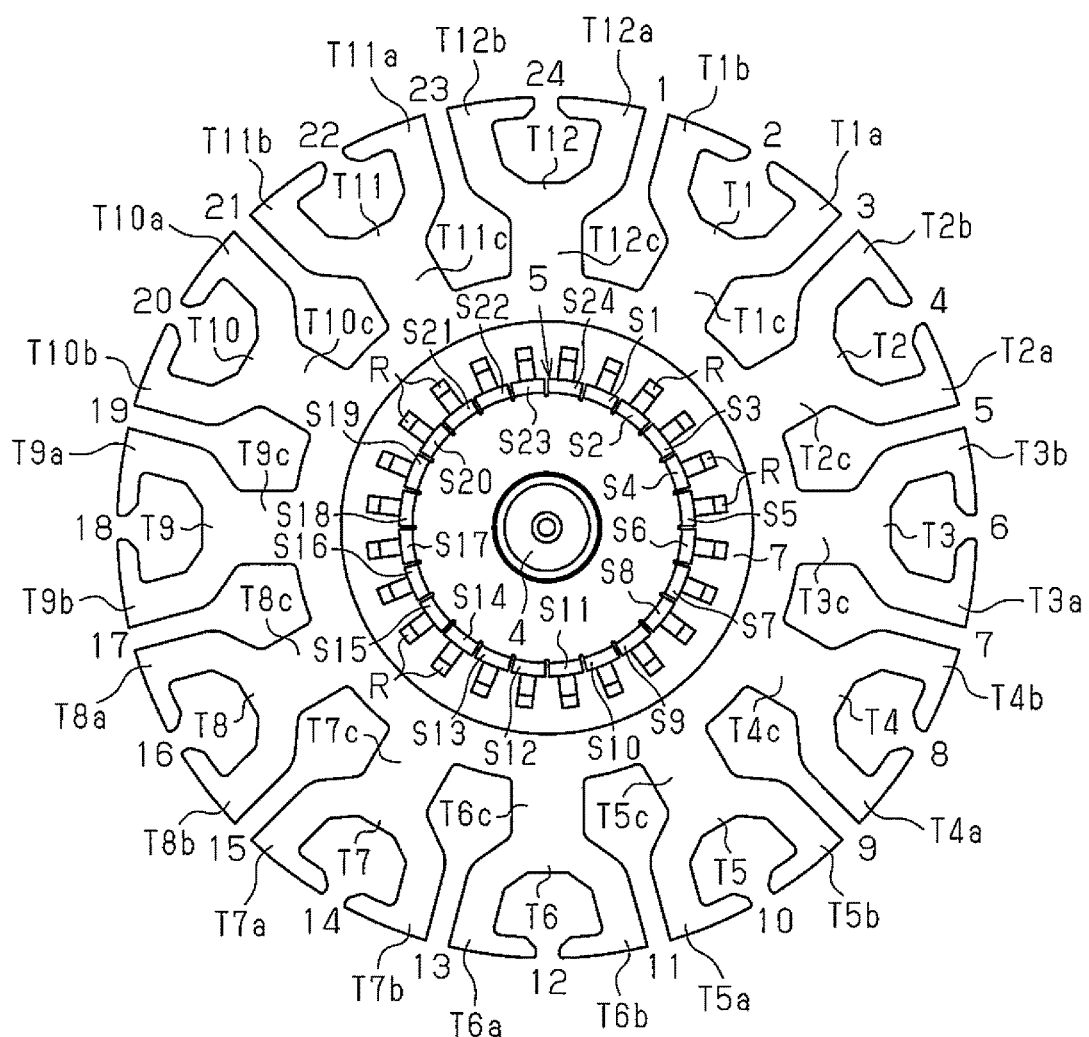
FIG. 2 is a front view of an armature core in FIG. 1 when seen from the axial direction.

Here, as illustrated in FIG. 2, the 24 segments S are hereinafter referred to as the first to twenty-fourth segments S1 to S24 in order to specify each of them, respectively. Then, as illustrated in FIG. 2, the first to twenty-fourth segments S1 to S24 are arranged in the state spaced away from each other in order in the clockwise direction on the outer circumferential surface of the holding member 5a. Therefore, the 24 first to twenty-fourth segments S1 to S24 are arranged so as to have an equal pitch (15° interval) in the circumferential direction.

As indicated by a two-dot chain line in FIG. 1, a positive-pole brush B1 and a negative-pole brush B2 are arranged on the outer circumference of the commutator 5, capable of sliding contact with the first to twenty-fourth segments S1 to S24. The anode-side brush B1 and the cathode-side brush B2 are arranged at positions faced with each other by 180° in the circumferential direction, and the anode-side brush B1 is arranged at a position corresponding to a center position in the circumferential direction of the first permanent magnets MG1 and the cathode-side brush B2 is arranged at a position corresponding to a center position in the circumferential direction of the second permanent magnets MG2. To the armature 3, an electric current is supplied through the anode-side brush B1 and the cathode-side brush B2.

Figure 3:
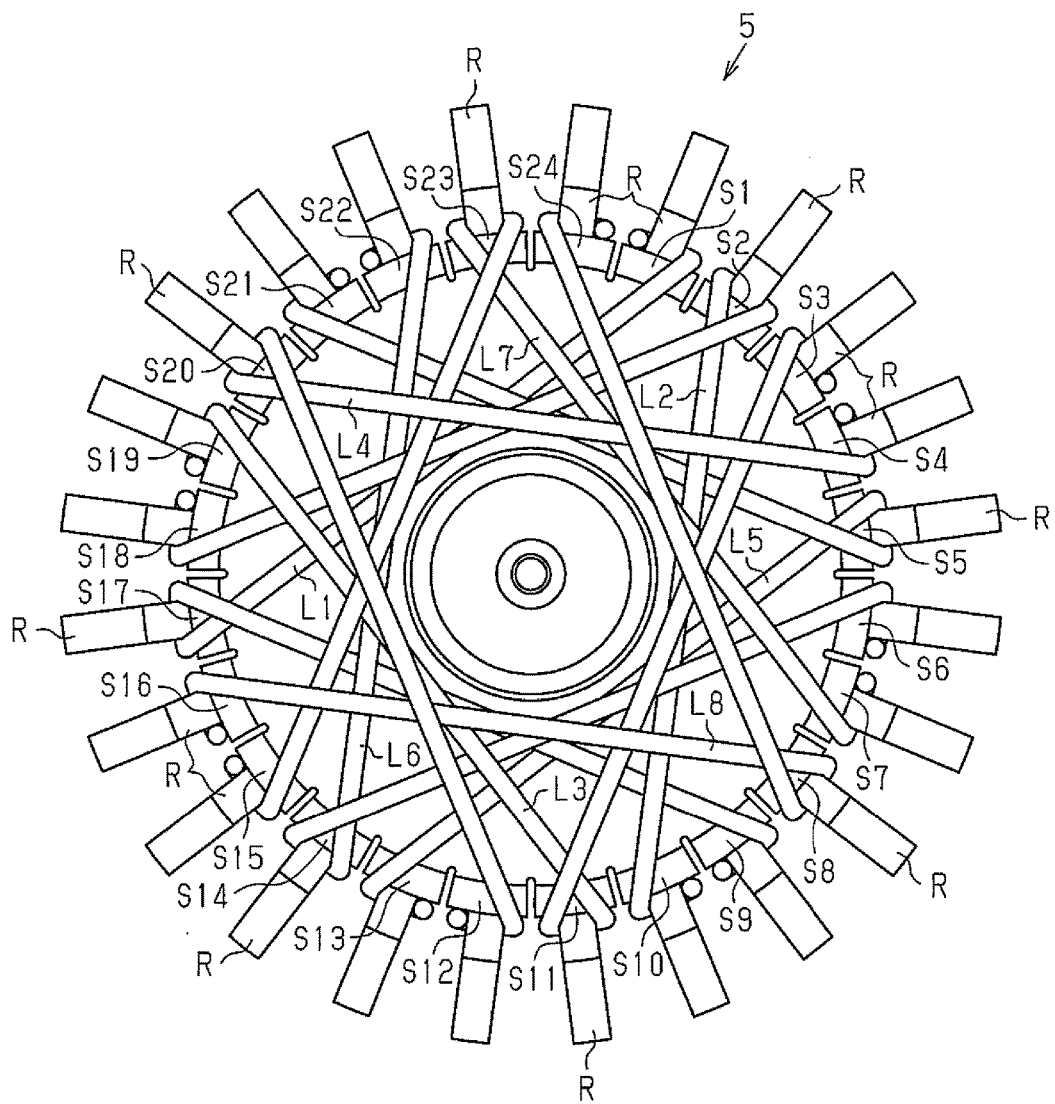
FIG. 3 is a front view of a connection state of a short-circuit wire of an armature in FIG. 1 when seen from the axial direction.

As illustrated in FIG. 3, in the commutator 5, the segments S (S1 to S24) arranged at the same angular interval as the angular interval at which the magnetic poles of the same pole in the stator 2 are arranged are short-circuited by a short-circuit wire. That is, the N-pole first permanent magnets MG1 in the stator 2 are arranged at the 120° interval. Thus, the three segments S arranged at the 120° interval form one set, which is short-circuited by corresponding first to eighth short-circuit wires L1 to L8, respectively, and have the same potential.

As illustrated in FIG. 3, each of a set of the first, seventeenth, and ninth segments S1, S17, and S9 is short-circuited by a first short-circuit wire L1 and has the same potential.

Moreover, each of a set of the tenth, second, and eighteenth segments S10, S2, and S18 is short-circuited by a second short-circuit wire L2 and has the same potential.

Moreover, each of a set of the nineteenth, eleventh, and third segments S19, S11, and S3 is short-circuited by a third short-circuit wire L3 and has the same potential.

Moreover, each of a set of the fourth, twentieth, and twelfth segments S4, S20, and S12 is short-circuited by a fourth short-circuit wire L4 and has the same potential.

Moreover, each of a set of the thirteenth, fifth, and twenty-first segments S13, S5, and S21 is short-circuited by a fifth short-circuit wire L5 and has the same potential.

Moreover, each of a set of the twenty-second, fourteenth, and sixth segments S22, S14, and S6 is short-circuited by a sixth short-circuit wire L6 and has the same potential.

Moreover, each of a set of the seventh, twenty-third, and fifteenth segments S7, S23, and S15 is short-circuited by a seventh short-circuit wire L7 and has the same potential.

Moreover, each of a set of the sixteenth, eighth, and twenty-fourth segments S16, S8, and S24 is short-circuited by an eighth short-circuit wire L8 and has the same potential.

(Armature Core 6)

As illustrated in FIG. 1, the armature core 6 is formed integrally of a cylindrical core back 7 and 12 teeth T extending outward in a radial direction from an outer circumferential surface of the core back 7 and is fixed to the rotating shaft 4 by externally fitting the core back 7 to the rotating shaft 4. The number of the first to twenty-fourth segments S1 to S24 is set so as to become twice the number of the 12 teeth T.

As illustrated in FIG. 1, at a distal end portion of each of the teeth T, a first branch portion Ta branching in the clockwise direction in the circumferential direction and extended outward in the radial direction and a second branch portion Tb branching in a counterclockwise direction in the circumferential direction and extended outward in the radial direction are provided. By forming a pair of the bifurcated first and second branch portions Ta and Tb on each of the teeth T, 24 slots SL are formed on the armature core 6. In each of the teeth T, a portion on a side of a base end portion which is an inner side in the radial direction of each pair of the first and second branch portions Ta and Tb is referred to as an inner winding portion Tc.

Here, as illustrated in FIG. 2, in order to specify each of the 12 teeth T, hereinafter they are referred to as the first to twelfth teeth T1 to T12. Moreover, the first and second branch portions Ta and Tb of the first to twelfth teeth T1 to T12 are referred to as first and second branch portions T1a, T1b to T12a, T12b. Moreover, the inner winding portions Tc of the first to twelfth teeth T1 to T12 are referred to as the inner winding portions T1c to T12c.

As illustrated in FIG. 2, the 12 first to twelfth teeth T1 to T12 are formed in order in the clockwise direction at positions at an equal pitch (30° interval) in the circumferential direction with respect to the core back 7. At this time, the first to twelfth teeth T1 to T12 and the first to twenty-fourth segments S1 to S24 are arranged by facing each other so that two each of the first to twenty-fourth segments S1 to S24 are faced with each of the first to twelfth teeth T1 to T12 in the radial direction.

In more detail, as illustrated in FIG. 2, with the first tooth T1, the first and second segments S1 and S2 are faced, respectively. With the second tooth T2, the third and fourth segments S3 and S4 are faced, respectively. With the third tooth T3, the fifth and sixth segments S5 and S6 are faced, respectively. With the fourth tooth T4, the seventh and eighth segments S7 and S8 are faced, respectively.

Moreover, with the fifth tooth T5, the ninth and tenth segments S9 and S10 are faced, respectively. With the sixth tooth T6, the eleventh and twelfth segments S11 and S12 are faced, respectively. With the seventh tooth T7, the thirteenth and fourteenth segments S13 and S14 are faced, respectively. With the eighth tooth T8, the fifteenth and sixteenth segments S15 and S16 are faced, respectively.

Furthermore, with the ninth tooth T9, the seventeenth and eighteenth segments S17 and S18 are faced, respectively. With the tenth tooth T10, the nineteenth and twentieth segments S19 and S20 are faced, respectively. With the eleventh tooth T11, the twenty-first and twenty-second segments S21 and S22 are faced, respectively. With the twelfth tooth T12, the twenty-third and twenty-fourth segments S23 and S24 are faced, respectively.

Moreover, by forming the pairs of first and second branch portions T1a, T1b to T12a, T12b on the first to twelfth teeth T1 to T12, the 24 slots SL are formed on the armature core 6. Here, for convenience of explanation, in order to specify the 24 slots SL formed on the armature core 6, they are specified by slot numbers "1" to "24", and the numbers are given in FIGS. 2 and 8 to 11.

In this embodiment, a width in the circumferential direction of each of the pairs of first and second branch portions T1a, T1b to T12a, T12b is a half of a width in the circumferential direction of each of the inner winding portions T1c to T12c.

Here, in each of the teeth, an intermediate position of an interval between the two segments is located on a line connecting an intermediate position of an interval (slot SL) formed by each of the pairs of first and second branch portions T1a, T1b to T12a, T12b and a center axis of the rotating shaft 4.

That is, on the line connecting the intermediate position of the interval (the slot SL with the slot number "2") between the first and second branch portions T1a and T1b of the first tooth T1 and the center axis of the rotating shaft 4, the intermediate position of the interval between the first and second segments S1 and S2 is located.

Hereinafter, on the line connecting the intermediate position of the interval (the slot SL with the slot number "4") between the first and second branch portions T2a and T2b of the second tooth T2 and the center axis of the rotating shaft 4, the intermediate position of the interval between the third and fourth segments S3 and S4 is located.

On the line connecting the intermediate position of the interval (the slot SL with the slot number "6") between the first and second branch portions T3a and T3b of the third tooth T3 and the center axis of the rotating shaft 4, the intermediate position of the interval between the fifth and sixth segments S5 and S6 is located.

On the line connecting the intermediate position of the interval (the slot SL with the slot number "8") between the first and second branch portions T4a and T4b of the fourth tooth T4 and the center axis of the rotating shaft 4, the intermediate position of the interval between the seventh and eighth segments S7 and S8 is located.

On the line connecting the intermediate position of the interval (the slot SL with the slot number "10") between the first and second branch portions T5a and T5b of the fifth tooth T5 and the center axis of the rotating shaft 4, the intermediate position of the interval between the ninth and tenth segments S9 and S10 is located.

On the line connecting the intermediate position of the interval (the slot SL with the slot number "12") between the first and second branch portions T6a and T6b of the sixth tooth T6 and the center axis of the rotating shaft 4, the intermediate position of the interval between the eleventh and twelfth segments S11 and S12 is located.

On the line connecting the intermediate position of the interval (the slot SL with the slot number "14") between the first and second branch portions T7a and T7b of the seventh tooth T7 and the center axis of the rotating shaft 4, the intermediate position of the interval between the thirteenth and fourteenth segments S13 and S14 is located.

On the line connecting the intermediate position of the interval (the slot SL with the slot number "16") between the first and second branch portions T8a and T8b of the eighth tooth T8 and the center axis of the rotating shaft 4, the intermediate position of the interval between the fifteenth and sixteenth segments S15 and S16 is located.

On the line connecting the intermediate position of the interval (the slot SL with the slot number "18") between the first and second branch portions T9a and T9b of the ninth tooth T9 and the center axis of the rotating shaft 4, the intermediate position of the interval between the seventeenth and eighteenth segments S17 and S18 is located.

On the line connecting the intermediate position of the interval (the slot SL with the slot number "20") between the first and second branch portions T10a and T10b of the tenth tooth T10 and the center axis of the rotating shaft 4, the intermediate position of the interval between the nineteenth and twentieth segments S19 and S20 is located.

On the line connecting the intermediate position of the interval (the slot SL with the slot number "22") between the first and second branch portions T11a and T11b of the eleventh tooth T11 and the center axis of the rotating shaft 4, the intermediate position of the interval between the twenty-first and twenty-second segments S21 and S22 is located.

On the line connecting the intermediate position of the interval (the slot SL with the slot number "24") between the first and second branch portions T12a and T12b of the twelfth tooth T12 and the center axis of the rotating shaft 4, the intermediate position of the interval between the twenty-third and twenty-fourth segments S23 and S24 is located.

Moreover, in the adjacent teeth, on a line connecting an intermediate position of an interval (slot SL) formed by the first branch portion of one of the adjacent teeth and the second branch portion of the other tooth and the center axis of the rotating shaft 4, an intermediate position of the interval of one of the segments relatively arranged on the adjacent teeth is located.

In more detail, on the line connecting the intermediate position of the interval (the slot SL with the slot number "3") between the first branch portion T1a of the first tooth T1 and the second branch portion T2b of the second tooth T2 and the center axis of the rotating shaft 4, the intermediate position of the interval of the second and third segments S2 and S3 is located.

Hereinafter, on the line connecting the intermediate position of the interval (the slot SL with the slot number "5") between the first branch portion T2a of the second tooth T2 and the second branch portion T3b of the third tooth T3 and the center axis of the rotating shaft 4, the intermediate position of the interval of the fourth and fifth segments S4 and S5 is located.

On the line connecting the intermediate position of the interval (the slot SL with the slot number "7") between the first branch portion T3a of the third tooth T3 and the second branch portion T4b of the fourth tooth T4 and the center axis of the rotating shaft 4, the intermediate position of the interval of the sixth and seventh segments S6 and S7 is located.

On the line connecting the intermediate position of the interval (the slot SL with the slot number "9") between the first branch portion T4a of the fourth tooth T4 and the second branch portion T5b of the fifth tooth T5 and the center axis of the rotating shaft 4, the intermediate position of the interval of the eighth and ninth segments S8 and S9 is located.

On the line connecting the intermediate position of the interval (the slot SL with the slot number "11") between the first branch portion T5a of the fifth tooth T5 and the second branch portion T6b of the sixth tooth T6 and the center axis of the rotating shaft 4, the intermediate position of the interval of the tenth and eleventh segments S10 and S11 is located.

On the line connecting the intermediate position of the interval (the slot SL with the slot number "13") between the first branch portion T6a of the sixth tooth T6 and the second branch portion T7b of the seventh tooth T7 and the center axis of the rotating shaft 4, the intermediate position of the interval of the twelfth and thirteenth segments S12 and S13 is located.

On the line connecting the intermediate position of the interval (the slot SL with the slot number "15") between the first branch portion T7a of the seventh tooth T7 and the second branch portion T8b of the eighth tooth T8 and the center axis of the rotating shaft 4, the intermediate position of the interval of the fourteenth and fifteenth segments S14 and S15 is located.

On the line connecting the intermediate position of the interval (the slot SL with the slot number "17") between the first branch portion T8a of the eighth tooth T8 and the second branch portion T9b of the ninth tooth T9 and the center axis of the rotating shaft 4, the intermediate position of the interval of the sixteenth and seventeenth segments S16 and S17 is located.

On the line connecting the intermediate position of the interval (the slot SL with the slot number "19") between the first branch portion T9a of the ninth tooth T9 and the second branch portion T10b of the tenth tooth T10 and the center axis of the rotating shaft 4, the intermediate position of the interval of the eighteenth and nineteenth segments S18 and S19 is located.

On the line connecting the intermediate position of the interval (the slot SL with the slot number "21") between the first branch portion T10a of the tenth tooth T10 and the second branch portion T11b of the eleventh tooth T11 and the center axis of the rotating shaft 4, the intermediate position of the interval of the twentieth and twenty-first segments S20 and S21 is located.

On the line connecting the intermediate position of the interval (the slot SL with the slot number "23") between the first branch portion T11a of the eleventh tooth T11 and the second branch portion T12b of the twelfth tooth T12 and the center axis of the rotating shaft 4, the intermediate position of the interval of the twenty-second and twenty-third segments S22 and S23 is located.

On the line connecting the intermediate position of the interval (the slot SL with the slot number "1") between the first branch portion T12a of the twelfth tooth T12 and the second branch portion T1b of the first tooth T1 and the center axis of the rotating shaft 4, the intermediate position of the interval of the twenty-fourth and first segments S24 and S1 is located.

As illustrated in FIG. 1, an armature winding wire is wound around each of the teeth T (first to twelfth teeth T1 to T12) of the armature core 6 constituted as above.

Here, for convenience of explanation, regarding the armature winding wire wound around each of the inner winding portions T1c to T12c of the first to twelfth teeth T1 to T12, each winding wire wound from the inner winding portion T1c of the first tooth T1 to the inner winding portion T12c of the twelfth tooth T12 in the clockwise direction in FIG. 1 is referred to as first to twelfth winding wires C1 to C12 in order.

Moreover, regarding the armature winding wire wound between the first branch portion and the second branch portion of the adjacent teeth, each of the winding wires wound, from that wound between the first branch portion T1a of the first tooth T1 and the second branch portion T2b of the second tooth T2 to that wound between the first branch portion T12a of the twelfth tooth T12 and the second branch portion T1b of the first tooth T1 in the clockwise direction in FIG. 1 is referred to as thirteenth to twenty-fourth winding wires C13 to C24 in order.

Therefore, the first to twelfth winding wires C1 to C12 wound around the inner winding portions Tc1 to T12c of the first to twelfth teeth T1 to T12 are wound in a concentrated winding manner. The thirteenth to twenty-fourth winding wires C13 to C24 wound between the first branch portion of one of the adjacent teeth and the second branch portion of the other tooth are wound in a distributed winding manner.

(Short-circuit Wire Connecting Process)

Subsequently, a connecting method of the first to eighth short-circuit wires L1 to L8 will be described by referring to a short-circuit wire connection process table illustrated in Table 1 below and short-circuit wire connection diagrams illustrated in FIGS. 4 to 7.

TABLE 1

| | | Flyer | |
| --- | --- | --- | --- |
| | | A Flyer | B Flyer |
| Conductor | | W1 | W2 |
| Short-circuit wire connection process 1 | Segment | S1→S17→S9 | S13→S5→S21 |
| 2 | | Disconnection | Disconnection |
| 3 | Segment | S10→S2→S18 | S22→S14→S6 |
| 4 | | Disconnection | Disconnection |
| 5 | Segment | S19→S11→S3 | S7→S23→S15 |
| 6 | | Disconnection | Disconnection |
| 7 | Segment | S4→S20→S12 | S16→S8→S24 |
| 8 | | Disconnection | Disconnection |

In this embodiment, as is obvious from the short-circuit wire connection process table illustrated in Table 1 and the connection diagrams illustrated in FIGS. 4 to 7, this is a method of connecting one short-circuit wire and the other short-circuit wire arranged at positions faced with each other by 180° at the same time, and a double-flyer winding machine is used.

Therefore, in the short-circuit wire connection process table, an A flyer (winding machine) and a B flyer (winding machine) share connection of the first to eighth short-circuit wires L1 to L8.

Short-circuit Wire Connection Process 1 (Segment: S1→S17→S9, S13→S5→S21)

Figure 4:
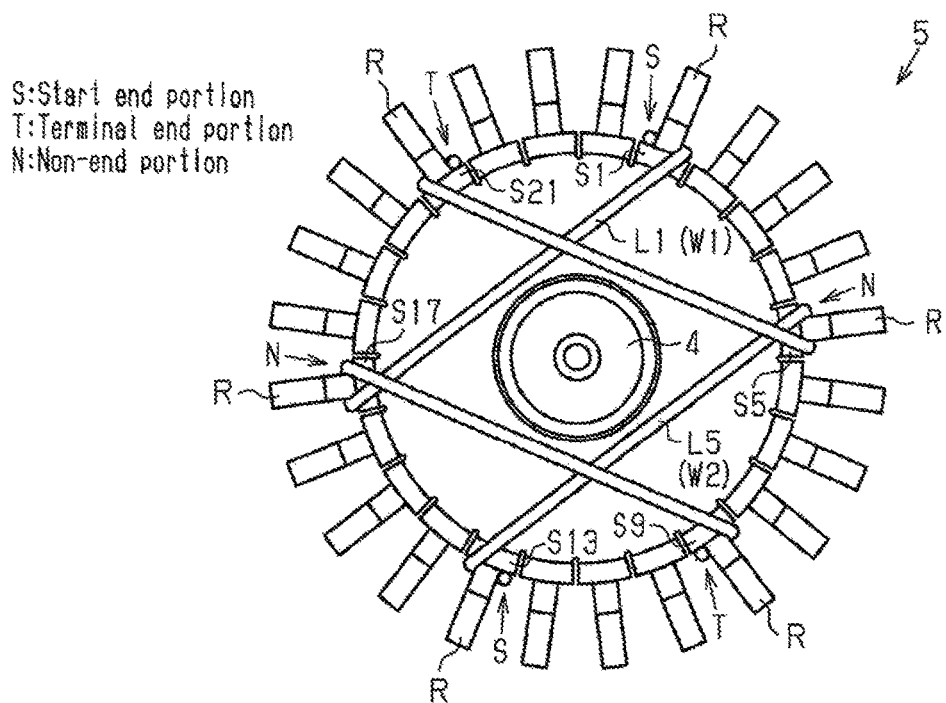
FIG. 4 is an explanatory view illustrating a connecting order of first and fifth short-circuit wires in FIG. 3.

As illustrated in FIG. 4, the A flyer catches and hooks a start end portion of an insulated and covered first conductor W1 on a riser R of the first segment S1 and then routes it in the counterclockwise direction to the seventeenth segment S17 spaced away by 120° in the counterclockwise direction in FIG. 4. Then, the A flyer crosses and hooks the routed first conductor W1 on the riser R of the seventeenth segment S17. The A flyer routes the first conductor W1 hooked on the riser R of the seventeenth segment S17 in the counterclockwise direction to the ninth segment S9 spaced away by 120° in the counterclockwise direction and catches and hooks it on the riser R of the ninth segment S9.

On the other hand, as illustrated in FIG. 4, the B flyer catches and hooks a start end portion of a second conductor W2 which is insulated and covered on the riser R of the thirteenth segment S13 and then routes it in the counterclockwise direction to the fifth segment S5 spaced away by 120° in the counterclockwise direction in FIG. 4. Then, the B flyer crosses and hooks the routed second conductor W2 on the riser R of the fifth segment S5. The B flyer routes the second conductor W2 hooked on the riser R of the fifth segment S5 in the counterclockwise direction to the twenty-first segment S21 spaced away by 120° in the counterclockwise direction and catches and hooks it on the riser R of the twenty-first segment S21.

Short-circuit Wire Connection Process 2 (Disconnection)

The A flyer cuts off (disconnects) the first conductor W1 hooked by the riser R of the ninth segment S9. As a result, the first conductor W1 with its intermediate portion (non-end portion) hooked on the riser R of the seventeenth segment S17 becomes the first short-circuit wire L1 having its start end portion hooked by the riser R of the first segment S1 and its terminal end portion hooked by the riser R of the ninth segment S9.

The B flyer cuts off (disconnects) the second conductor W2 hooked by the riser R of the twenty-first segment S21. As a result, the second conductor W2 with its intermediate portion (non-end portion) hooked on the riser R of the fifth segment S5 becomes the fifth short-circuit wire L5 having its start end portion hooked by the riser R of the thirteenth segment S13 and its terminal end portion hooked by the riser R of the twenty-first segment S21.

Short-circuit Wire Connection Process 3 (Segment: S10→S2→S18, S22→S14→S6)

Figure 5:
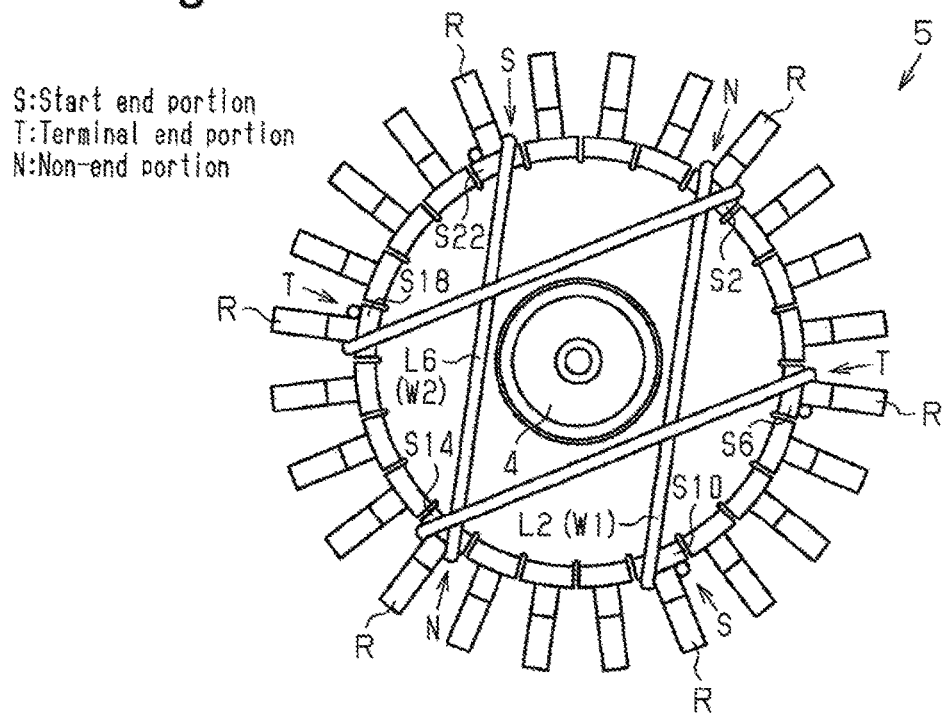
FIG. 5 is an explanatory view illustrating a connecting order of second and sixth short-circuit wires in FIG. 3.

As illustrated in FIG. 5, the A flyer catches and hooks the start end portion of the disconnected first conductor W1 on the riser R of the tenth segment S10 and then routes it in the counterclockwise direction to the second segment S2 spaced away by 120° in the counterclockwise direction in FIG. 5. Then, the A flyer crosses and hooks the routed first conductor W1 on the riser R of the second segment S2. The A flyer routes the first conductor W1 hooked on the riser R of the second segment S2 in the counterclockwise direction to the eighteenth segment S18 spaced away by 120° in the counterclockwise direction and catches and hooks it on the riser R of the eighteenth segment S18.

On the other hand, as illustrated in FIG. 5, the B flyer catches and hooks a start end portion of the disconnected second conductor W2 on the riser R of the twenty-second segment S22 and then routes it in the counterclockwise direction to the fourteenth segment S14 spaced away by 120° in the counterclockwise direction in FIG. 5. Then, the B flyer crosses and hooks the routed second conductor W2 on the riser R of the fourteenth segment S14. The B flyer routes the second conductor W2 hooked on the riser R of the fourteenth segment S14 in the counterclockwise direction to the sixth segment S6 spaced away by 120° in the counterclockwise direction and catches and hooks it on the riser R of the sixth segment S6.

Short-circuit Wire Connection Process 4 (Disconnection)

The A flyer cuts off (disconnects) the first conductor W1 hooked by the riser R of the eighteenth segment S18. As a result, the first conductor W1 with its intermediate portion (non-end portion) hooked on the riser R of the second segment S2 becomes the second short-circuit wire L2 having its start end portion hooked by the riser R of the tenth segment S10 and its terminal end portion hooked by the riser R of the eighteenth segment S18.

The B flyer cuts off (disconnects) the second conductor W2 hooked by the riser R of the sixth segment S6. As a result, the second conductor W2 with its intermediate portion (non-end portion) hooked on the riser R of the fourteenth segment S14 becomes the sixth short-circuit wire L6 having its start end portion hooked by the riser R of the twenty-second segment S22 and its terminal end portion hooked by the riser R of the sixth segment S6.

Short-circuit Wire Connection Process 5 (Segment: S19→S11→S3, S7→S23→S15)

Figure 6:
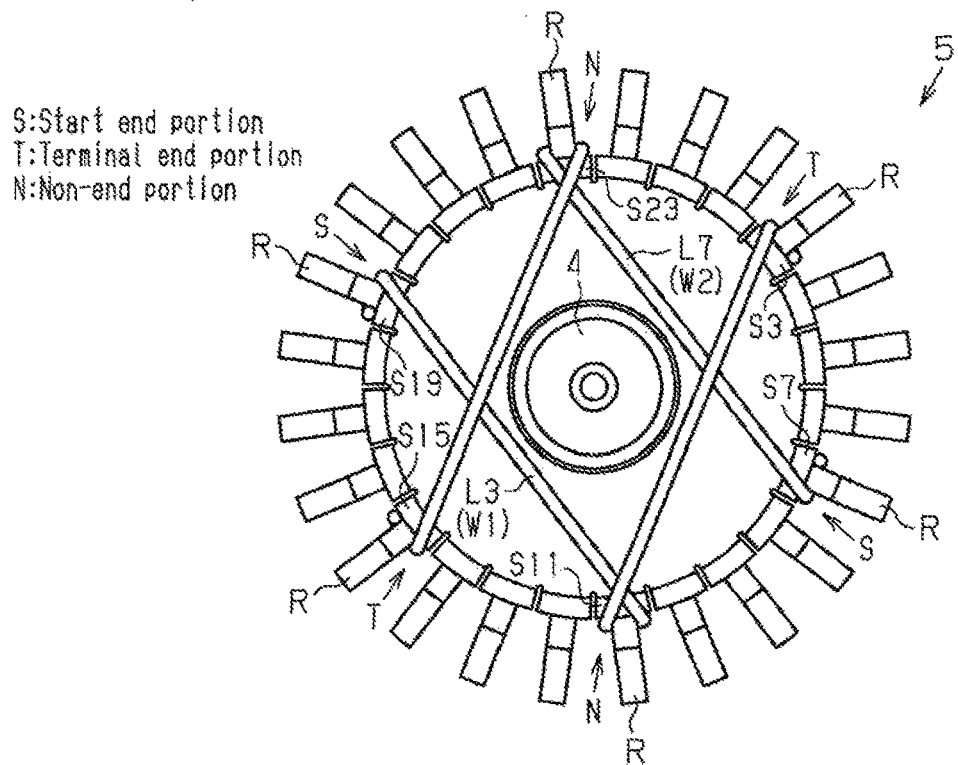
FIG. 6 is an explanatory view illustrating a connecting order of third and seventh short-circuit wires in FIG. 3.

As illustrated in FIG. 6, the A flyer catches and hooks the start end portion of the disconnected first conductor W1 on the riser R of the nineteenth segment S19 and then routes it in the counterclockwise direction to the eleventh segment S11 spaced away by 120° in the counterclockwise direction in FIG. 6. Then, the A flyer crosses and hooks the routed first conductor W1 on the riser R of the eleventh segment S11. The A flyer routes the first conductor W1 hooked on the riser R of the eleventh segment S11 in the counterclockwise direction to the third segment S3 spaced away by 120° in the counterclockwise direction and catches and hooks it on the riser R of the third segment S3.

On the other hand, as illustrated in FIG. 6, the B flyer catches and hooks a start end portion of the disconnected second conductor W2 on the riser R of the seventh segment S7 and then routes it in the counterclockwise direction to the twenty-third segment S23 spaced away by 120° in the counterclockwise direction in FIG. 6. Then, the B flyer crosses and hooks the routed second conductor W2 on the riser R of the twenty-third segment S23. The B flyer routes the second conductor W2 hooked on the riser R of the twenty-third segment S23 in the counterclockwise direction to the fifteenth segment S15 spaced away by 120° in the counterclockwise direction and catches and hooks it on the riser R of the fifteenth segment S15.

Short-circuit Wire Connection Process 6 (Disconnection)

The A flyer cuts off (disconnects) the first conductor W1 hooked by the riser R of the third segment S3. As a result, the first conductor W1 with its intermediate portion (non-end portion) hooked on the riser R of the eleventh segment S11 becomes the third short-circuit wire L3 having its start end portion hooked by the riser R of the nineteenth segment S19 and its terminal end portion hooked by the riser R of the third segment S3.

The B flyer cuts off (disconnects) the second conductor W2 hooked by the riser R of the fifteenth segment S15. As a result, the second conductor W2 with its intermediate portion (non-end portion) hooked on the riser R of the twenty-third segment S23 becomes the seventh short-circuit wire L7 having its start end portion hooked by the riser R of the seventh segment S7 and its terminal end portion hooked by the riser R of the fifteenth segment S15.

Short-circuit Wire Connection Process 7 (Segment: S4→S20→S12, S16→S8→S24)

Figure 7:
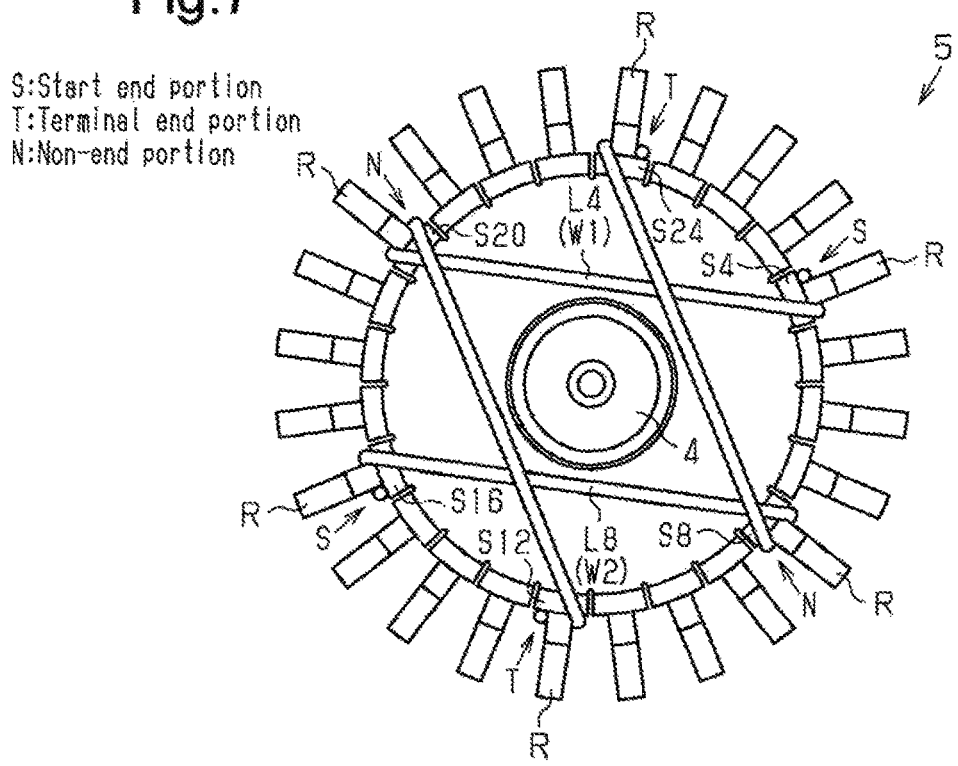
FIG. 7 is an explanatory view illustrating a connecting order of fourth and eighth short-circuit wires in FIG. 3.

As illustrated in FIG. 7, the A flyer catches and hooks the start end portion of the disconnected first conductor W1 on the riser R of the fourth segment S4 and then routes it in the counterclockwise direction to the twentieth segment S20 spaced away by 120° in the counterclockwise direction in FIG. 7. Then, the A flyer crosses and hooks the routed first conductor W1 by the riser R of the twentieth segment S20. The A flyer routes the first conductor W1 hooked on the riser R of the twentieth segment S20 in the counterclockwise direction to the twelfth segment S12 spaced away by 120° in the counterclockwise direction and catches and hooks it on the riser R of the twelfth segment S12.

On the other hand, as illustrated in FIG. 7, the B flyer catches and hooks a start end portion of the disconnected second conductor W2 on the riser R of the sixteenth segment S16 and then routes it in the counterclockwise direction to the eighth segment S8 spaced away by 120° in the counterclockwise direction in FIG. 7. Then, the B flyer crosses and hooks the routed second conductor W2 on the riser R of the eighth segment S8. The B flyer routes the second conductor W2 hooked on the riser R of the eighth segment S8 in the counterclockwise direction to the twenty-fourth segment S24 spaced away by 120° in the counterclockwise direction and catches and hooks it on the riser R of the twenty-fourth segment S24.

Short-circuit Wire Connection Process 8 (Disconnection)

The A flyer cuts off (disconnects) the first conductor W1 hooked by the riser R of the twelfth segment S12. As a result, the first conductor W1 with its intermediate portion (non-end portion) hooked on the riser R of the twentieth segment S20 becomes the fourth short-circuit wire L4 having its start end portion hooked by the riser R of the second segment S2 and its terminal end portion hooked by the riser R of the twelfth segment S12.

The B flyer cuts off (disconnects) the second conductor W2 hooked by the riser R of the twenty-fourth segment S24.

As a result, the second conductor W2 with its intermediate portion (non-end portion) hooked on the riser R of the eighth segment S8 becomes the eighth short-circuit wire L8 having its start end portion hooked by the riser R of the sixteenth segment S16 and its terminal end portion hooked by the riser R of the twenty-fourth segment S24.

Then, a connecting work of the first to eighth short-circuit wires L1 to L8 by using the double-flyer winding machine composed of the A flyer and the B flyer is finished.

At this time, the double-flyer winding machine provided with the A flyer and the B flyer performs the connecting work in a state in which the A flyer and the B flyer are faced with each other at 180° in the short-circuit wire connecting work from the short-circuit wire connection process 1 to the short-circuit wire connection process 8. Thus, in the short-circuit wire connection process 1 to the short-circuit wire connection process 8, the connecting work is performed by each share without collision between the A flyer and the B flyer in the middle of the connecting work.

(Winding-wire Winding Process)

When the short-circuit wire connection process is finished, a winding work of the first to twenty-fourth winding wires C1 to C24 is started.

Here, the winding of the first to twenty-fourth winding wires C1 to C24 will be described in accordance with a winding-wire winding process table illustrated in Table 2 below and the winding diagrams illustrated in FIGS. 8 to 11.

TABLE 2

| | | Flyer | |
| --- | --- | --- | --- |
| | | A Flyer | B Flyer |
| Winding-wire winding process 1 | Segment | S1: (Latched) | S13: (Latched) |
| 2 | Slot | Slot No. "23"→"1": (C12) | Slot No. "11"→"13": (C6) |
| 3 | Slot | Slot No. "5"→"3": (C2) | Slot No. "17"→"15": (C8) |
| 4 | Slot | Slot No. "9"→"7": (C4) | Slot No. "21"→"19": (C10) |
| 5 | Segment | S10: (Latched) | S22: (Latched) |
| 6 | Slot | Slot No. "11": (To side opposite to commutator) | Slot No. "23": (To side opposite to commutator) |
| 7 | Slot | Slot No. "21": (To commutator side) | Slot No. "9": (To commutator side) |
| 8 | Segment | S16: (Latched) | S4: (Latched) |
| 9 | Slot | Slot No. "15": (To side opposite to commutator) | Slot No. "3": (To side opposite to commutator) |
| 10 | Slot | Slot No. "19"→"17": (C9) | Slot No. "7"→"5": (C3) |
| 11 | Slot | Slot No. "23"→"21": (C11) | Slot No. "11"→"9": (C5) |
| 12 | Slot | Slot No. "3"→"1": (C1) | Slot No. "15"→"13": (C7) |
| 13 | Segment | S23: (Latched) | S11: (Latched) |
| 14 | Slot | Slot No. "22": (To side opposite to commutator) | Slot No. "10": (To side opposite to commutator) |
| 15 | Slot | Slot No. "2"→"24": (C24) | Slot No. "14"→"12": (C18) |
| 16 | Slot | Slot No. "6"→"4": (C14) | Slot No. "18"→"16": (C20) |
| 17 | Slot | Slot No. "10"→"8": (C16) | Slot No. "22"→"20": (C22) |
| 18 | Segment | S6: (Latched) | S18: (Latched) |
| 19 | Slot | Slot No. "2": (To side opposite to commutator) | Slot No. "14": (To side opposite to commutator) |
| 20 | Slot | Slot No. "16": (To commutator side) | Slot No. "4": (To commutator side) |
| 21 | Segment | S17: (Latched) | S5: (Latched) |
| 22 | Slot | Slot No. "18": (To side opposite to commutator) | Slot No. "6": (To side opposite to commutator) |
| 23 | Slot | Slot No. "14"→"16": (C19) | Slot No. "2"→"4": (C13) |
| 24 | Slot | Slot No. "10"→"12": (C17) | Slot No. "22"→"24": (C23) |
| 25 | Slot | Slot No. "6"→"8": (C15) | Slot No. "18"→"20": (C21) |
| 26 | Segment | S8: (Latched)→Disconnection | S20: (Latched)→Disconnection |
| 27 | Cut-off/removal | 4 spots cut-off→removed | 4 spots cut-off→removed |

In this embodiment, as is obvious from the process table illustrated in Table 2 and the winding explanatory views illustrated in FIGS. 8 to 11, this is a method of winding one of the winding wires and another of the winding wires arranged at positions faced with each other at 180° at the same time, and the double-flyer winding machine (A flyer and B flyer) same as above is used.

Winding-wire Winding Process 1 (Segment: S1, S13)

As illustrated in FIG. 8A, the A flyer hooks the start end portion of the first conductor W1 on the riser R of the first segment S1.

On the other hand, as illustrated in FIG. 8B, the B flyer hooks the start end portion of the second conductor W2 on the riser R of the thirteenth segment S13.

Winding-wire Winding Process 2 (Slot: Twelfth Winding Wire C12, Sixth Winding Wire C6)

As illustrated in FIG. 8A, the A flyer routes the first conductor W1 hooked by the riser R of the first segment S1 in the counterclockwise direction when seen from the axial commutator 5 side (hereinafter referred to simply as a counterclockwise direction) to the slot SL with the slot number "23". Then, the A flyer winds the twelfth winding wire C12 with the winding direction of the clockwise direction when seen from outside in the radial direction (hereinafter referred to simply as a forward winding direction) around the inner winding portion T12c of the twelfth tooth T12 with the routed first conductor W1 between the slots SL with the slot numbers "23" and "1".

On the other hand, as illustrated in FIG. 8B, the B flyer routes the second conductor W2 hooked by the riser R of the thirteenth segment S13 in the counterclockwise direction to the slot SL with the slot number "11". Then, the B flyer winds the sixth winding wire C6 in the forward winding direction around the inner winding portion T6c of the sixth tooth T6 with the routed second conductor W2 between the slots SL with the slot numbers "11" and "13".

Winding-wire Winding Process 3 (Slot: Second Winding Wire C2, Eighth Winding Wire C8)

As illustrated in FIG. 8A, the A flyer pulls out the first conductor W1 having wound the twelfth winding wire C12 around the inner winding portion T12c to the commutator side from the slot SL with the slot number "1". That is, the A flyer pulls out the first conductor W1 in a direction getting closer to the commutator in the axial direction. Subsequently, the A flyer routes the first conductor W1 having been pulled out to the commutator side in the clockwise direction when seen from the axial commutator 5 side (hereinafter referred to simply as a clockwise direction) to the slot SL with the slot number "5". Then, the A flyer winds the second winding wire C2 with the winding direction of the counterclockwise direction when seen from outside in the radial direction (hereinafter referred to simply as a reverse winding direction) around the inner winding portion T2c of the second tooth T2 with the routed first conductor W1.

On the other hand, as illustrated in FIG. 8B, the B flyer pulls out the second conductor W2 having wound the sixth winding wire C6 around the inner winding portion T6c to the commutator side from the slot SL with the slot number "13". Subsequently, the B flyer routes the second conductor W2 having been pulled out to the commutator side in the clockwise direction to the slot SL with the slot number "17". Then, the B flyer winds the eighth winding wire C8 in the reverse winding direction around the inner winding portion T8c of the eighth tooth T8 with the routed second conductor W2 between the slots SL with the slot numbers "17" and "15".

Winding-wire Winding Process 4 (Slot: Fourth Winding Wire C4, Tenth Winding Wire C10)

As illustrated in FIG. 8A, the A flyer pulls out the first conductor W1 having wound the second winding wire C2 around the inner winding portion T2c to a side opposite to the commutator from the slot SL with the slot number "5". That is, the A flyer pulls out the first conductor W1 in a direction getting away from the commutator in the axial direction. Subsequently, the A flyer routes the first conductor W1 having been pulled out to the side opposite to the commutator in the clockwise direction to the slot SL with the slot number "9". Then, the A flyer winds the fourth winding wire C4 in the forward winding direction around the inner winding portion T4c of the fourth tooth T4 with the routed first conductor W1 between the slots SL with the slot numbers "9" and "7".

On the other hand, as illustrated in FIG. 8B, the B flyer pulls out the second conductor W2 having wound the eighth winding wire C8 around the inner winding portion T8c to the side opposite to the commutator from the slot SL with the slot number "17". Subsequently, the B flyer routes the second conductor W2 having been pulled out to side opposite to the commutator in the clockwise direction to the slot SL with the slot number "21".

Then, the B flyer winds the tenth winding wire C10 in the forward winding direction around the inner winding portion T10c of the tenth tooth T10 with the routed second conductor W2 between the slots SL with the slot numbers "21" and "19".

Winding-wire Winding Process 5 (Segment: S10, S22)

As illustrated in FIG. 8A, the A flyer pulls out the first conductor W1 having wound the fourth winding wire C4 around the inner winding portion T4c to the commutator side through the slot SL with the slot number "9". Subsequently, the A flyer routes the first conductor W1 having been pulled out to the commutator side to the tenth segment S10 in the clockwise direction and hooks it on the riser R of the tenth segment S10.

On the other hand, as illustrated in FIG. 8B, the B flyer pulls out the second conductor W2 having wound the tenth winding wire C10 around the inner winding portion T10c to the commutator side through the slot SL with the slot number "21". Subsequently, the B flyer routes the second conductor W2 having been pulled out to the commutator side to the twenty-second segment S22 in the clockwise direction and hooks it on the riser R of the twenty-second segment S22.

Winding-wire Winding Process 6 (Slot: Slot Number "11", Slot Number "23")

As illustrated in FIG. 8A, the A flyer pulls out the first conductor W1 hooked on the riser R of the tenth segment S10 to the side opposite to the commutator from the commutator side through the closest slot SL with the slot number "11".

In the previous winding-wire winding process 2, the sixth winding wire C6 is wound by the B flyer between the slot numbers "11" and "13", that is, around the inner winding portion T6c of the sixth tooth T6. Thus, when the first conductor W1 is routed to the side opposite to the commutator from the commutator side and pulled out through the slot SL with the slot number "11", it is pulled out to the side opposite to the commutator by passing through the outermost periphery of the sixth winding wire C6 wound around the inner winding portion T6c of the sixth tooth T6.

On the other hand, as illustrated in FIG. 8B, the B flyer pulls out the second conductor W2 hooked on the riser R of the twenty-second segment S22 to the side opposite to the commutator from the commutator side through the closest slot SL with the slot number "23".

In the previous winding-wire winding process 2, the twelfth winding wire C12 is wound by the A flyer between the slot numbers "23" and "1", that is, around the inner winding portion T12c of the twelfth tooth T12. Thus, when the second conductor W2 is routed to the side opposite to the commutator from the commutator side and pulled out through the slot SL with the slot number "23", it is pulled out to the side opposite to the commutator by passing through the outermost periphery of the twelfth winding wire C12 wound around the inner winding portion T12c of the twelfth tooth T12.

Winding-wire Winding Process 7 (Slot: Slot Number "21", Slot Number "9")

As illustrated in FIG. 8A, the A flyer routes the first conductor W1 having been pulled out to the side opposite to the commutator from the slot SL with the slot number "11" to the slot SL with the slot number "21" in the clockwise direction. Then, the A flyer pulls out the first conductor W1 having been routed to the slot SL with the slot number "21" to the commutator side from the slot SL with the slot number "21".

In the previous winding-wire winding process 4, the tenth winding wire C10 is wound by the B flyer between the slot numbers "21" and "19", that is, around the inner winding portion T10c of the tenth tooth T10. Thus, when the first conductor W1 is routed to the commutator side from the side opposite to the commutator and pulled out through the slot SL with the slot number "21", it is pulled out to the commutator side by passing through the outermost periphery of the tenth winding wire C10 wound around the inner winding portion T10c of the tenth tooth T10.

On the other hand, as illustrated in FIG. 8B, the B flyer routes the second conductor W2 having been pulled out to the side opposite to the commutator from the slot SL with the slot number "23" to the slot SL with the slot number "9" in the clockwise direction. Then, the B flyer pulls out the second conductor W2 having been routed to the slot SL with the slot number "9" to the commutator side from the slot SL with the slot number "9".

In the previous winding-wire winding process 4, the fourth winding wire C4 is wound by the A flyer between the slot numbers "9" and "7", that is, around the inner winding portion T4c of the fourth tooth T4. Thus, when the second conductor W2 is routed to the commutator side from the side opposite to the commutator and pulled out through the slot SL with the slot number "9", it is pulled out to the commutator side by passing through the outermost periphery of the fourth winding wire C4 wound around the inner winding portion T4c of the fourth tooth T4.

Winding-wire Winding Process 8 (Segment: S16, S4)

Figure 9A:
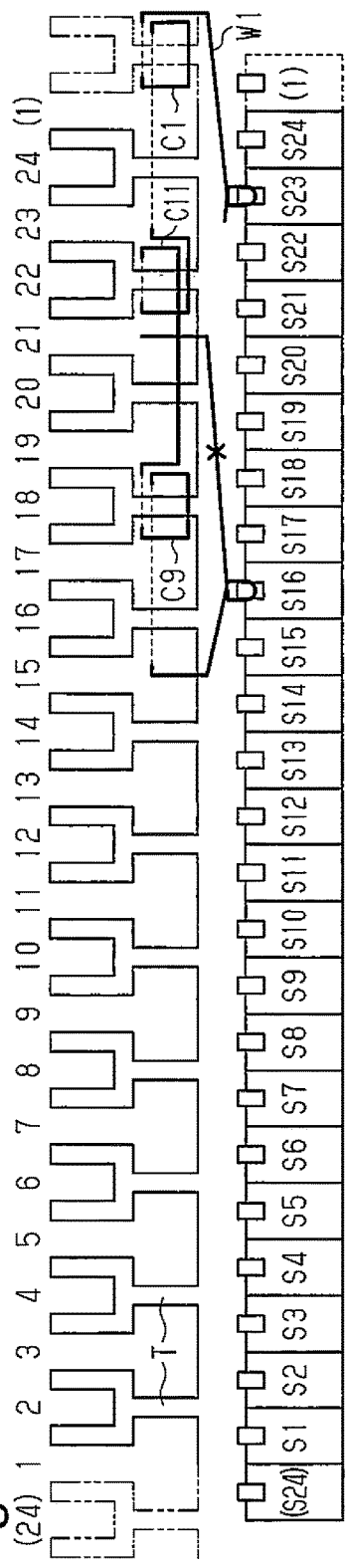
FIG. 9A is an explanatory view of winding-wire winding processes 8 to 13 of the A flyer in the first embodiment.

As illustrated in FIG. 9A, the A flyer routes the first conductor W1 having been pulled out to the commutator side from the slot SL with the slot number "21" to the sixteenth segment S16 in the counterclockwise direction and hooks it on the riser R of the sixteenth segment S16.

Figure 9B:
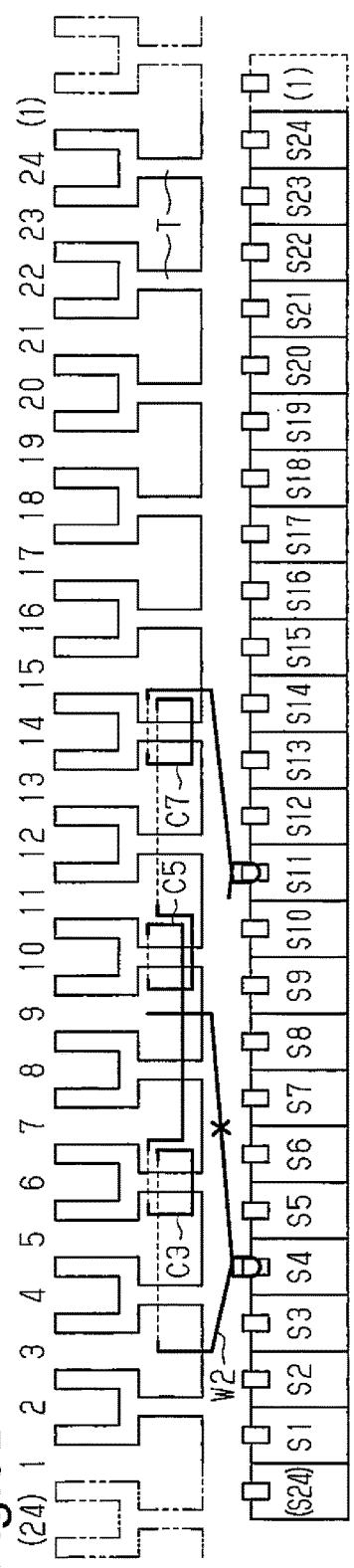
FIG. 9B is an explanatory view of winding-wire winding processes 8 to 13 of the B flyer in the first embodiment.

On the other hand, as illustrated in FIG. 9B, the B flyer routes the second conductor W2 having been pulled out to the commutator side from the slot SL with the slot number "9" to the fourth segment S4 in the counterclockwise direction and hooks it on the riser R of the fourth segment S4.

Winding-wire Winding Process 9 (Slot: Slot Number "15", Slot Number "3")

As illustrated in FIG. 9A, the A flyer routes the first conductor W1 having been hooked on the riser R of the sixteenth segment S16 to the slot SL with the slot number "15" in the counterclockwise direction and pulls it out to the side opposite to the commutator from the commutator side through the slot SL with the slot number "15".

On the other hand, as illustrated in FIG. 9B, the B flyer routes the second conductor W2 having been hooked on the riser R of the fourth segment S4 to the slot SL with the slot number "3" in the counterclockwise direction and pulls it out from the commutator side to the side opposite to the commutator through the slot SL with the slot number "3".

Winding-wire Winding Process 10 (Slot: Ninth Winding Wire C9, Third Winding Wire C3)

As illustrated in FIG. 9A, the A flyer routes the first conductor W1 having been pulled out to the side opposite to the commutator from the slot SL with the slot number "15" to the slot SL with the slot number "19" in the clockwise direction. Then, the A flyer winds the ninth winding wire C9 in the forward winding direction around the inner winding portion T9c of the ninth tooth T9 with the routed first conductor W1 between the slots SL with the slot numbers "19" and "17".

At this time, in the previous winding-wire winding processes 6 and 7, the first conductor W1 routed on the side opposite to the commutator between the slot numbers "11" and "21" is located inside the ninth winding wire C9 to be wound. Therefore, winding of the ninth winding wire C9 around the inner winding portion T9c of the ninth tooth T9 does not present an obstacle.

On the other hand, as illustrated in FIG. 9B, the B flyer routes the second conductor W2 having been pulled out from the slot SL with the slot number "3" to the side opposite to the commutator to the slot SL with the slot number "7" in the clockwise direction. Then, the B flyer winds the third winding wire C3 in the forward winding direction around the inner winding portion T3c of the third tooth T3 with the routed second conductor W2 between the slots SL with the slot numbers "7" and "5".

At this time, in the previous winding-wire winding processes 6 and 7, the second conductor W2 routed on the side opposite to the commutator between the slot numbers "23" and "9" is located inside the third winding wire C3 to be wound. Therefore, winding of the third winding wire C3 around the inner winding portion T3c of the third tooth T3 does not present an obstacle.

Winding-wire Winding Process 11 (Slot: Eleventh Winding Wire C11, Fifth Winding Wire C5)

As illustrated in FIG. 9A, the A flyer pulls out the first conductor W1 having wound the ninth winding wire C9 around the inner winding portion T9c to the commutator side from the slot SL with the slot number "19". Subsequently, the A flyer routes the first conductor W1 having been pulled out to the commutator side to the slot SL with the slot number "23" in the clockwise direction. Then, the A flyer winds the eleventh winding wire C11 in the reverse winding direction around the inner winding portion T11c of the eleventh tooth T11 with the routed first conductor W1 between the slots SL with the slot numbers "23" and "21".

On the other hand, as illustrated in FIG. 9B, the B flyer pulls out the second conductor W2 having wound the third winding wire C3 around the inner winding portion T3c to the commutator side from the slot SL with the slot number "7". Subsequently, the B flyer routes the second conductor W2 having been pulled out to the commutator side to the slot SL with the slot number "11" in the clockwise direction. Then, the B flyer winds the fifth winding wire C5 in the reverse winding direction around the inner winding portion T5c of the fifth tooth T5 with the routed second conductor W2 between the slots SL with the slot numbers "11" and "9".

Winding-wire Winding Process 12 (Slot: First Winding Wire C1, Seventh Winding Wire C7)

As illustrated in FIG. 9A, the A flyer pulls out the first conductor W1 having wound the eleventh winding wire C11 around the inner winding portion T11c to the side opposite to the commutator from the slot SL with the slot number "23". Subsequently, the A flyer routes the first conductor W1 having been pulled out to the side opposite to the commutator to the slot SL with the slot number "3" in the clockwise direction. Then, the A flyer winds the first winding wire C1 in the forward winding direction around the inner winding portion T1c of the first tooth T1 with the routed first conductor W1 between the slots SL with the slot numbers "3" and "1".

At this time, in the previous winding-wire winding processes 6 and 7, the second conductor W2 routed on the side opposite to the commutator between the slot numbers "23" and "9" is located inside the first winding wire C1 to be wound. Therefore, winding of the first winding wire C1 around the inner winding portion T1c of the first tooth T1 does not present an obstacle.

On the other hand, as illustrated in FIG. 9B, the B flyer pulls out the second conductor W2 having wound the fifth winding wire C5 around the inner winding portion T5c to the side opposite to the commutator from the slot SL with the slot number "11". Subsequently, the B flyer routes the second conductor W2 having been pulled out to the side opposite to the commutator to the slot SL with the slot number "15" in the clockwise direction. Then, the B flyer winds the seventh winding wire C7 in the forward winding direction around the inner winding portion T7c of the seventh tooth T7 with the routed second conductor W2 between the slots SL with the slot numbers "15" and "13".

At this time, in the previous winding-wire winding processes 6 and 7, the first conductor W1 routed on the side opposite to the commutator between the slot numbers "11" and "21" is located inside the seventh winding wire C7 to be wound. Therefore, winding of the seventh winding wire C7 around the inner winding portion T7c of the seventh tooth T7 does not present an obstacle.

Winding-wire Winding Process 13 (Segment: S23, S11)

As illustrated in FIG. 9A, the A flyer pulls out the first conductor W1 having wound the first winding wire C1 around the inner winding portion T1c to the commutator side from the slot SL with the slot number "3". Subsequently, the A flyer routes the first conductor W1 having been pulled out to the commutator side to the twenty-third segment S23 in the counterclockwise direction and hooks it by the riser R of the twenty-third segment S23.

On the other hand, as illustrated in FIG. 9B, the B flyer pulls out the second conductor W2 having wound the seventh winding wire C7 around the inner winding portion T7c to the commutator side from the slot SL with the slot number "15". Subsequently, the B flyer routes the second conductor W2 having been pulled out to the commutator side to the eleventh segment S11 in the counterclockwise direction and hooks it on the riser R of the eleventh segment S11.

At this time, the first to twelfth winding wires C1 to C12 in the concentrated winding are wound by the A flyer and the B flyer around all the 12 inner winding portions Tc1 to T12c, respectively. Then, the thirteenth to twenty-fourth winding wires C13 to C24 in the distributed winding are wound in the subsequent processes.

Winding-wire Winding Process 14 (Slot: Slot Number "22", Slot Number "10")

As illustrated in FIG. 10A, the A flyer routes the first conductor W1 hooked on the riser R of the twenty-third segment S23 to the slot SL with the slot number "22" in the counterclockwise direction and pulls it out to the side opposite to the commutator from the commutator side through the slot SL with the slot number "22".

On the other hand, as illustrated in FIG. 10B, the B flyer routes the second conductor W2 hooked by the riser R of the eleventh segment S11 to the slot SL with the slot number "10" in the counterclockwise direction and pulls it out to the side opposite to the commutator from the commutator side through the slot SL with the slot number "10".

Winding-wire Winding Process 15 (Slot: Twenty-fourth Winding Wire C24, Eighteenth Winding Wire C18)

As illustrated in FIG. 10A, the A flyer routes the first conductor W1 having been pulled out to the side opposite to the commutator through the slot SL with the slot number "22" to the slot SL with the slot number "2" in the clockwise direction. Then, the A flyer winds the twenty-fourth winding wire C24 in the forward winding direction with the routed first conductor W1 between the slots SL with the slot numbers "2" and "24", that is, between the second branch portion T1b of the first tooth T1 and the first branch portion T12a of the twelfth tooth T12.

On the other hand, as illustrated in FIG. 10B, the B flyer routes the second conductor W2 having been pulled out to the side opposite to the commutator through the slot SL with the slot number "10" to the slot SL with the slot number "14" in the clockwise direction. Then, the B flyer winds the eighteenth winding wire C18 in the forward winding direction with the routed second conductor W2 between the slots SL with the slot numbers "14" and "12", that is, between the second branch portion T7b of the seventh tooth T7 and the first branch portion T6a of the sixth tooth T6.

Winding-wire Winding Process 16 (Slot: Fourteenth Winding Wire C14, Twentieth Winding Wire C20)

As illustrated in FIG. 10A, the A flyer pulls out the first conductor W1 of the twenty-fourth winding wire C24 wound between the second branch portion T1b and the first branch portion T12a from the slot SL with the slot number "2" to the commutator side. Subsequently, the A flyer routes the first conductor W1 having been pulled out to the commutator side to the slot SL with the slot number "6" in the clockwise direction. Then, the A flyer winds the fourteenth winding wire C14 in the reverse winding direction with the routed first conductor W1 between the slots SL with the slot numbers "6" and "4", that is, between the second branch portion T3b of the third tooth T3 and the first branch portion T2a of the second tooth T2.

On the other hand, as illustrated in FIG. 10B, the B flyer pulls out the second conductor W2 of the eighteenth winding wire C18 wound between the second branch portion T7b and the first branch portion T6a to the commutator side from the slot SL with the slot number "14". Subsequently, the B flyer routes the second conductor W2 having been pulled out to the commutator side to the slot SL with the slot number "18" in the clockwise direction. Then, the B flyer winds the twentieth winding wire C20 in the reverse winding direction with the routed second conductor W2 between the slots SL with the slot numbers "18" and "16", that is, between the second branch portion T9b of the ninth tooth T9 and the first branch portion T8a of the eighth tooth T8.

Winding-wire Winding Process 17 (Slot: Sixteenth Winding Wire C16, Twenty-second Winding Wire C22)

As illustrated in FIG. 10A, the A flyer pulls out the first conductor W1 of the fourteenth winding wire C14 wound between the second branch portion T3b and the first branch portion T2a from the slot SL with the slot number "6" to the side opposite to the commutator. Subsequently, the A flyer routes the first conductor W1 having been pulled out to the side opposite to the commutator to the slot SL with the slot number "10" in the clockwise direction. Then, the A flyer winds the sixteenth winding wire C16 in the forward winding direction with the routed first conductor W1 between the slots SL with the slot numbers "10" and "8", that is, between the second branch portion T5b of the fifth tooth T5 and the first branch portion T4a of the fourth tooth T4.

On the other hand, as illustrated in FIG. 10B, the B flyer pulls out the second conductor W2 of the twentieth winding wire C20 wound between the second branch portion T9b and the first branch portion T8a to the side opposite to the commutator from the slot SL with the slot number "18". Subsequently, the B flyer routes the second conductor W2 having been pulled out to the side opposite to the commutator to the slot SL with the slot number "22" in the clockwise direction. Then, the B flyer winds the twenty-second winding wire C22 in the forward winding direction with the routed second conductor W2 between the slots SL with the slot numbers "22" and "20", that is, between the second branch portion T11b of the eleventh tooth T11 and the first branch portion T10a of the tenth tooth T10.

Winding-wire Winding Process 18 (Segment: S6, S18)

As illustrated in FIG. 10A, the A flyer pulls out the first conductor W1 wound between the second branch portion T5b and the first branch portion T4a to the commutator side through the slot SL with the slot number "10". Subsequently, the A flyer pulls out the first conductor W1 having been pulled out to the commutator side to the sixth segment S6 in the counterclockwise direction and hooks it on the riser R of the sixth segment S6.

On the other hand, as illustrated in FIG. 10B, the B flyer pulls out the second conductor W2 wound between the second branch portion T11b and the first branch portion T10a to the commutator side through the slot SL with the slot number "22". Subsequently, the B flyer pulls out the second conductor W2 having been pulled out to the commutator side to the eighteenth segment S18 in the counterclockwise direction and hooks it on the riser R of the eighteenth segment S18.

Winding-wire Winding Process 9 (Slot: Slot Number "2", Slot Number "14")

As illustrated in FIG. 10A, the A flyer routes the first conductor W1 hooked on the riser R of the sixth segment S6 to the slot SL with the slot number "2" in the counterclockwise direction and pulls it out to the side opposite to the commutator from the commutator side through the slot SL with the slot number "2".

In the previous winding-wire winding process 15, the twenty-fourth winding wire C24 is wound by the A flyer between the slot numbers "2" and "24", that is, between the second branch portion T1b of the first tooth T1 and the first branch portion T12a of the twelfth tooth T12. Thus, when the first conductor W1 is routed to the side opposite to the commutator from the commutator side through the slot SL with the slot number "2" and pulled out, it passes through the outermost periphery of the twenty-fourth winding wire C24 and is pulled out to the side opposite to the commutator.

On the other hand, as illustrated in FIG. 10B, the B flyer routes the second conductor W2 hooked by the riser R of the eighteenth segment S18 to the slot SL with the slot number "14" in the counterclockwise direction and pulls it out to the side opposite to the commutator from the commutator side through the slot SL with the slot number "14".

In the previous winding-wire winding process 15, the eighteenth winding wire C18 is wound by the B flyer between the slot numbers "14" and "12", that is, between the second branch portion T7b of the seventh tooth T7 and the first branch portion T6a of the sixth tooth T6. Thus, when the second conductor W2 is routed to the side opposite to the commutator from the commutator side through the slot SL with the slot number "14" and pulled out, it passes through the outermost periphery of the eighteenth winding wire C18 and is pulled out to the side opposite to the commutator.

Winding-wire Winding Process 20 (Slot: Slot Number "16", Slot Number "4")

As illustrated in FIG. 11A, the A flyer routes the first conductor W1 having been pulled out to the side opposite to the commutator from the slot SL with the slot number "2" to the slot SL with the slot number "16" in the counterclockwise direction. Then, the A flyer pulls out the first conductor W1 having been routed to the slot SL with the slot number "16" to the commutator side from the slot SL with the slot number "16".

In the previous winding-wire winding process 16, the twentieth winding wire C20 is wound by the B flyer between the slot numbers "18" and "16", that is, between the second branch portion T9b of the ninth tooth T9 and the first branch portion T8a of the eighth tooth T8. Thus, when the first conductor W1 is routed to the commutator side from the side opposite to the commutator through the slot SL with the slot number "16" and pulled out, it passes through the outermost periphery of the twentieth winding wire C20 and is pulled out to the side opposite to the commutator.

On the other hand, as illustrated in FIG. 11B, the B flyer routes the second conductor W2 having been pulled out to the side opposite to the commutator from the slot SL with the slot number "14" to the slot SL with the slot number "4" in the counterclockwise direction. Then, the B flyer pulls out the second conductor W2 having been routed to the slot SL with the slot number "4" to the commutator side from the slot SL with the slot number "4".

In the previous winding-wire winding process 16, the fourteenth winding wire C14 is wound by the A flyer between the slot numbers "6" and "4", that is, between the second branch portion T3b of the third tooth T3 and the first branch portion T2a of the second tooth T2. Thus, when the second conductor W2 is routed to the commutator side from the side opposite to the commutator through the slot SL with the slot number "4" and pulled out, it passes through the outermost periphery of the fourteenth winding wire C14 and is pulled out to the side opposite to the commutator side.

Winding-wire Winding Process 21 (Segment: S17, S5)

As illustrated in FIG. 11A, the A flyer routes the first conductor W1 having been pulled out to the commutator side from the slot SL with the slot number "16" to the seventeenth segment S17 in the clockwise direction and hooks it on the riser R of the seventeenth segment S17.

On the other hand, as illustrated in FIG. 11B, the B flyer routes the second conductor W2 having been pulled out to the commutator side from the slot SL with the slot number "4" to the fifth segment S5 in the clockwise direction and hooks it on the riser R of the fifth segment S5.

Winding-wire Winding Process 22 (Slot: Slot Number "18", Slot Number "6")

As illustrated in FIG. 11A, the A flyer pulls out the first conductor W1 hooked on the riser R of the seventeenth segment S17 from the commutator side to the side opposite to the commutator through the slot SL with the closest slot number "18".

On the other hand, as illustrated in FIG. 11B, the B flyer pulls out the second conductor W2 hooked on the riser R of the fifth segment S5 to the side opposite to the commutator from the commutator side through the closest slot SL with the slot number "6".

Winding-wire Winding Process 23 (Slot: Nineteenth Winding Wire C19, Thirteenth Winding Wire S13)

As illustrated in FIG. 11A, the A flyer routes the first conductor W1 having been pulled out to the side opposite to the commutator through the slot SL with the slot number "18" to the slot SL with the slot number "14" in the counterclockwise direction. Then, the A flyer winds the nineteenth winding wire C19 in the reverse winding direction with the routed first conductor W1 between the slots SL with the slot numbers "14" and "16", that is, between the first branch portion T7a of the seventh tooth T7 and the second branch portion T8b of the eighth tooth T8.

On the other hand, as illustrated in FIG. 11B, the B flyer routes the second conductor W2 having been pulled out to the side opposite to the commutator through the slot SL with the slot number "6" to the slot SL with the slot number "2" in the counterclockwise direction. Then, the B flyer winds the thirteenth winding wire C13 in the reverse winding direction with the routed second conductor W2 between the slots SL with the slot numbers "2" and "4", that is, between the first branch portion T1a of the first tooth T1 and the second branch portion T2b of the second tooth T2.

Winding-wire Winding Process 24 (Slot: Seventeenth Winding Wire C17, Twenty-third Winding Wire C23)

As illustrated in FIG. 11A, the A flyer pulls out the first conductor W1 of the nineteenth winding wire C19 wound between the first branch portion T7a and the second branch portion T8b to the commutator side from the slot SL with the slot number "14". Subsequently, the A flyer routes the first conductor W1 having been pulled out to the commutator side to the slot SL with the slot number "10" in the counterclockwise direction. Then, the A flyer winds the seventeenth winding wire C17 in the forward winding direction with the routed first conductor W1 between the slots SL with the slot numbers "10" and "12", that is, between the first branch portion T5a of the fifth tooth T5 and the second branch portion T6b of the sixth tooth T6.

At this time, in the previous winding-wire winding processes 19 and 20, the second conductor W2 routed on the side opposite to the commutator between the slot numbers "14" to "4" is located inside the seventeenth winding wire C17 to be wound. Therefore, winding of the seventeenth winding wire C17 with the first conductor W1 does not present an obstacle.

On the other hand, as illustrated in FIG. 11B, the B flyer pulls out the second conductor W2 of the thirteenth winding wire C13 wound between the first branch portion T1a and the second branch portion T2b to the commutator side from the slot SL with the slot number "2". Subsequently, the B flyer routes the second conductor W2 having been pulled out to the commutator side to the slot SL with the slot number "22" in the counterclockwise direction. Then, the B flyer winds the twenty-third winding wire C23 in the forward winding direction with the routed second conductor W2 between the slots SL with the slot numbers "22" and "24", that is, between the first branch portion T11a of the eleventh tooth T11 and the second branch portion T12b of the twelfth tooth T12.

At this time, in the previous winding-wire winding processes 19 and 20, the first conductor W1 routed on the side opposite to the commutator between the slot numbers "2" to "16" is located inside the twenty-third winding wire C23 to be wound. Therefore, winding of the twenty-third winding wire C23 with the second conductor W2 does not present an obstacle.

Winding-wire Winding Process 25 (Slot: Fifteenth Winding Wire C15, Twenty-first Winding Wire C21)

As illustrated in FIG. 11A, the A flyer pulls out the first conductor W1 of the seventeenth winding wire C17 wound between the first branch portion T5a and the second branch portion T6b to the side opposite to the commutator from the slot SL with the slot number "10". Subsequently, the A flyer routes the first conductor W1 having been pulled out to the side opposite to the commutator to the slot SL with the slot number "6" in the counterclockwise direction. Then, the A flyer winds the fifteenth winding wire C15 in the reverse winding direction with the routed first conductor W1 between the slots SL with the slot numbers "6" and "8", that is, between the first branch portion T3a of the third tooth T3 and the second branch portion T4b of the fourth tooth T4.

At this time, in the previous winding-wire winding processes 19 and 20, the second conductor W2 routed on the side opposite to the commutator between the slot numbers "14" to "4" is located inside the fifteenth winding wire C15 to be wound. Therefore, winding of the fifteenth winding wire C15 with the first conductor W1 does not present an obstacle.

On the other hand, as illustrated in FIG. 11B, the B flyer pulls out the second conductor W2 of the twenty-third winding wire C23 wound between the first branch portion T11a and the second branch portion T12b to the side opposite to the commutator from the slot SL with the slot number "22". Subsequently, the B flyer routes the second conductor W2 having been pulled out to the side opposite to the commutator to the slot SL with the slot number "18" in the counterclockwise direction. Then, the B flyer winds the twenty-first winding wire C21 in the reverse winding direction with the routed second conductor W2 between the slots SL with the slot numbers "18" and "20", that is, between the first branch portion T9a of the ninth tooth T9 and the second branch portion T10b of the tenth tooth T10.

At this time, in the previous winding-wire winding processes 19 and 20, the first conductor W1 routed on the side opposite to the commutator between the slot numbers "2" to "16" is located inside the twenty-first winding wire C21 to be wound. Therefore, winding of the twenty-first winding wire C21 with the second conductor W2 does not present an obstacle.

Winding-wire Winding Process 26 (Segment: S8, S20)

As illustrated in FIG. 11A, the A flyer pulls out the first conductor W1 wound between the first branch portion T3a and the second branch portion T4b to the commutator side through the slot SL with the slot number "6". Subsequently, the A flyer pulls out the first conductor W1 having been pulled out to the commutator side to the eighth segment S8 in the clockwise direction and hooks it on the riser R of the eighth segment S8. Then, the A flyer cuts off (disconnects) the first conductor W1 hooked by the riser R of the eighth segment S8.

On the other hand, as illustrated in FIG. 11B, the B flyer pulls out the second conductor W2 wound between the first branch portion T9a and the second branch portion T10b to the commutator side through the slot SL with the slot number "18". Subsequently, the B flyer pulls out the second conductor W2 having been pulled out to the commutator side to the twentieth segment S20 in the clockwise direction and hooks it on the riser R of the twentieth segment S20. Then, the B flyer cuts off (disconnects) the second conductor W2 hooked by the riser R of the twentieth segment S20.

As a result, the winding work of the first to twenty-fourth winding wires C1 to C24 using the double-flyer winding machine composed of the A flyer and the B flyer is finished.

That is, until the first to twelfth winding wires C1 to C12 made of twelve concentrated winding wires and the thirteenth to twenty-fourth winding wires C13 to C24 made of twelve distributed winding wires have been wound, the A flyer and the B flyer have performed the winding work without disconnecting the first and second conductors W1 and W2 in the middle, respectively.

Winding-wire Winding Process 27 (Cut-off and Removal)

This cut-off and removal includes four cut-off and removal operations of an unnecessary portion between the concentrated winding wires wound with the first conductor W1, an unnecessary portion between the concentrated winding wires wound with the second conductor W2, an unnecessary portion between the distributed winding wires wound with the first conductor W1, and an unnecessary portion between the distributed winding wires wound with the second conductor W2.

(1) Cut-off and Removal of Unnecessary Portion Between Concentrated Winding Wires Wound With the First Conductor W1

The first conductor W1 is cut at two spots (both ends) indicated by cross marks, respectively, on the commutator side in FIGS. 8A and 9A. The two spots, that is, a portion extending to the slot SL with the slot number "11" from the riser R of the tenth segment S10 and a portion extending to the riser R of the sixteenth segment S16 from the slot SL with the slot number "21", are cut.

That is because, in the winding-wire winding process 6 to the winding-wire winding process 8, a portion of the first conductor W1 routed from the riser R of the tenth segment S10 to the riser R of the sixteenth segment S16 is the unnecessary portion. That is, if the unnecessary portion of first conductor W1 is left as it is, the second short-circuit wire L2 and the eighth short-circuit wire L8 are brought into an electrically short-circuited state. Thus, they need to be cut off and removed as unnecessary portions in order to prevent the above-described short-circuited state.

Then, after the two spots on the commutator side are cut off, the unnecessary portion of first conductor W1 between the two spots is pulled out from the side opposite to the commutator. At this time, the portion extended and routed from the riser R of the tenth segment S10 to the slot SL with the slot number "11" (side portion of the unnecessary portion of conductor) is arranged on the outermost periphery of the sixth winding wire C6 wound previously by the B flyer. Similarly, the portion extended and routed from the slot SL with the slot number "21" to the riser R of the sixteenth segment S16 (side portion of the unnecessary portion of conductor) is arranged on the outermost periphery of the tenth winding wire C10 wound previously by the B flyer.

Thus, the unnecessary portion of first conductor W1 is pulled out from the side opposite to the commutator without damaging the sixth winding wire C6 and the tenth winding wire C10 wound by the B flyer.

(2) Cut-off and Removal of Unnecessary Portion Between Concentrated Winding Wires Wound With the Second Conductor W2

The second conductor W2 is cut at two spots (both ends) indicated by cross marks, respectively, on the commutator side in FIGS. 8B and 9B. The two spots, that is, a portion extending to the slot SL with the slot number "23" from the riser R of the twenty-second segment S22 and a portion extending to the riser R of the fourth segment S4 from the slot SL with the slot number "9", are cut.

That is because, in the winding-wire winding process 6 to the winding-wire winding process 8, a portion of the second conductor W2 routed from the riser R of the twenty-second segment S22 to the riser R of the fourth segment S4 is the unnecessary portion. That is, if the unnecessary portion of second conductor W2 is left as it is, the sixth short-circuit wire L6 and the fourth short-circuit wire L4 are brought into an electrically short-circuited state. Thus, they need to be cut off and removed as unnecessary portions in order to prevent the above-described short-circuited state.

Then, after the two spots on the commutator side are cut off, the unnecessary portion of second conductor W2 between the two spots is pulled out from the side opposite to the commutator. At this time, the portion extended and routed from the riser R of the twenty-second segment S22 to the slot SL with the slot number "23" (side portion of the unnecessary portion of conductor) is arranged on the outermost periphery of the twelfth winding wire C12 wound previously by the A flyer. Similarly, the portion extended and routed from the slot SL with the slot number "9" to the riser R of the fourth segment S4 (side portion of the unnecessary portion of conductor) is arranged on the outermost periphery of the fourth winding wire C4 wound previously by the A flyer.

Thus, the unnecessary portion of second conductor W2 is pulled out from the side opposite to the commutator without damaging the twelfth winding wire C12 and the fourth winding wire C4 wound by the A flyer.

(3) Cut-off And Removal of Unnecessary Portion Between Distributed Winding Wires Wound With the First Conductor W1

The first conductor W1 is cut at two spots (both ends) indicated by cross marks, respectively, on the commutator side in FIGS. 10A and 11A. The two spots, that is, a portion extending to the slot SL with the slot number "2" from the riser R of the sixth segment S6 and a portion extending to the riser R of the seventeenth segment S17 from the slot SL with the slot number "16", are cut.

That is because, in the winding-wire winding process 19 to the winding-wire winding process 21, a portion of the first conductor W1 routed from the riser R of the sixth segment S6 to the riser R of the seventeenth segment S17 is the unnecessary portion. That is, if the unnecessary portion of first conductor W1 is left as it is, the sixth short-circuit wire L6 and the first short-circuit wire L1 are brought into an electrically short-circuited state. Thus, they need to be cut off and removed as unnecessary portions in order to prevent the above-described short-circuited state.

Then, after the two spots on the commutator side are cut off, the unnecessary portion of first conductor W1 between the two spots is pulled out from the side opposite to the commutator. At this time, the portion extended and routed from the riser R of the sixth segment S6 to the slot SL with the slot number "2" (side portion of the unnecessary portion of conductor) is arranged on the outermost periphery of the twenty-fourth winding wire C24 wound previously by the A flyer. Similarly, the portion extended and routed from the slot SL with the slot number "16" to the riser R of the seventeenth segment S17 (side portion of the unnecessary portion of conductor) is arranged on the outermost periphery of the twentieth winding wire C20 wound previously by the B flyer.

Thus, the unnecessary portion of first conductor W1 is pulled out from the side opposite to the commutator without damaging the twenty-fourth winding wire C24 wound by the A flyer and the twentieth winding wire C20 wound by the B flyer.

(4) Cut-off and Removal of Unnecessary Portion Between Distributed Winding Wires Wound With the Second Conductor W2

The second conductor W2 is cut at two spots (both ends) indicated by cross marks, respectively, on the commutator side in FIGS. 10B and 11B. The two spots, that is, a portion extending to the slot SL with the slot number "14" from the riser R of the eighteenth segment S18 and a portion extending to the riser R of the fifth segment S5 from the slot SL with the slot number "4", are cut.

That is because, in the winding-wire winding process 19 to the winding-wire winding process 21, a portion of the second conductor W2 routed from the riser R of the eighteenth segment S18 to the riser R of the fifth segment S5 is the unnecessary portion. That is, if the unnecessary portion of second conductor W2 is left as it is, the second short-circuit wire L2 and the fifth short-circuit wire L5 are brought into an electrically short-circuited state. Thus, they need to be cut off and removed as unnecessary portions in order to prevent the above-described short-circuited state.

Then, after the two spots on the commutator side are cut off, the unnecessary portion of second conductor W2 between the two spots is pulled out from the side opposite to the commutator. At this time, the portion extended and routed from the riser R of the eighteenth segment S18 to the slot SL with the slot number "14" (side portion of the unnecessary portion of conductor) is arranged on the outermost periphery of the eighteenth winding wire C18 wound previously by the B flyer. Similarly, the portion extended and routed from the slot SL with the slot number "4" to the riser R of the fifth segment S5 (side portion of the unnecessary portion of conductor) is arranged on the outermost periphery of the fourteenth winding wire C14 wound previously by the A flyer.

Thus, the unnecessary portion of second conductor W2 is pulled out from the side opposite to the commutator without damaging the eighteenth winding wire C18 wound by the B flyer and the fourteenth winding wire C14 wound by the A flyer.

Then, when the four unnecessary portions are removed, the riser R is bent in a direction in which the portion where the winding end portions of the respective corresponding short-circuit wires and the winding wires and the like are hooked, is held. Subsequently, fusing is performed, and by this fusing, the riser R of each segment is joined and electrically connected with the winding end portion of each corresponding winding wire and the non-end portion of each corresponding short-circuit wire, respectively.

As a result, the armature 3 is produced.

Subsequently, an action of the above-described first embodiment will be described.

The double-flyer winding machine provided with the A flyer and the B flyer performs the winding-wire winding work in a state in which the A flyer and the B flyer are faced with each other at 180°. Thus, the A flyer and the B flyer do not collide against each other in the middle of the winding-wire winding work, and the winding-wire winding work of each share is performed, respectively.

The A and B flyers perform winding so that the 22 winding wires excluding the twelfth winding wire C12 and the sixth winding wire C6 at the winding start, having their start ends and terminal ends pulled out separately to the commutator side and the side opposite to the commutator. That is, the A and B flyers perform winding such that the start ends and the terminal ends of the 22 winding wires are pulled out separately in a direction getting closer to the commutator and in a direction away from the commutator. Then, the conductors W1 and W2 between the concentrated winding wires to be hooked by the risers R are hooked by the risers R other than the risers R by which the conductors W1 and W2 between the concentrated winding wires have been already hooked. Moreover, the conductors W1 and W2 between the distributed winding wires to be hooked by the riser R are also hooked by the risers R other than the risers R by which the conductors W1 and W2 between the concentrated winding wires and the conductors W1 and W2 between the distributed winding wires have been already hooked.

As a result, when the first to twenty-fourth winding wires C1 to C24 are to be wound, the number of times that the conductors W1 and W2 are hooked on the risers R of the first to twenty-fourth segments S1 to S24 by the A flyer or the B flyer is once at the maximum.

Moreover, when the first to eighth short-circuit wires L1 to L8 are to be connected, the number of times that the conductors W1 and W2 are hooked on the risers R of the first to twenty-fourth segments S1 to S24 by the A flyer or the B flyer is once at the maximum.

Therefore, the number of times that the conductors W1 and W2 are hooked on the risers R of the first to twenty-fourth segments S1 to S24 is twice at the maximum. In other words, the conductors hooked by the risers R of the first to twenty-fourth segments S1 to S24 are the two conductors W1 and W2 at the maximum, which is an extremely small number. As a result, in fusing for electrically connecting the conductors W1 and W2 with the risers R performed in the subsequent process, insulation from the adjacent riser R can be ensured.

Moreover, when the winding work was performed by the A and B flyers until the first to twenty-fourth winding wires C1 to C24 had been wound, the unnecessary portions of the first and second conductors W1 and W2 were cut off and removed, respectively. Thus, the winding-wire winding work time can be reduced. By cutting off both ends of the unnecessary portions of the conductors W1 and W2 on the commutator side and by pulling out the unnecessary portions of conductors W1 and W2 on the side opposite to the commutator, the unnecessary portions of the conductors W1 and W2 can be removed.

At this time, the conductors W1 and W2 were routed so that both side portions of the unnecessary portions of conductors W1 and W2 are arranged on the outermost periphery of the winding wires. Thus, when the unnecessary portions of conductors W1 and W2 are to be pulled out to the side opposite to the commutator, pulling-out can be made smoothly without damaging the winding wires.

Subsequently, advantages of the above-described first embodiment will be described below.

(1) According to this embodiment, the number of hooked conductors W1 and W2 hooked by the risers R of the first to twenty-fourth segments 51 to S24 can be reduced, and insulation from the adjacent riser R can be ensured.

(2) According to this embodiment, the winding work was performed by the A and B flyers until all the winding wires C1 to C24 had been wound and then, the unnecessary portions of conductors W1 and W2 were cut off and removed, respectively. Thus, the tact number can be reduced, and the winding-wire winding work time can be reduced.

(3) According to this embodiment, the unnecessary portions of conductors W1 and W2 are arranged on the outermost periphery of the winding wires. Thus, by cutting off the both ends of the unnecessary portions of conductors W1 and W2 on the commutator side and by pulling out the unnecessary portions of conductors W1 and W2 on the side opposite to the commutator, puling-out can be done smoothly without damaging the winding wires.

The above-described first embodiment can be changed as follows:

In the first embodiment, fusing was performed after the winding-wire winding process 27 for cutting off and removing the unnecessary portions of conductors W1 and W2. Instead of this, the winding-wire winding process 27 for cutting off and removing the unnecessary portions of conductors W1 and W2 may be performed after fusing.

Moreover, in the first embodiment, the number of teeth T is set to 12, but this is not limiting, and the number of teeth T may be changed as appropriate.

(Second Embodiment)

Subsequently, a second embodiment will be described. The second embodiment is different from the first embodiment in the winding method of the winding wire. Thus, in the second embodiment, for convenience of explanation, the winding method of the winding wire will be described.

In the second embodiment, the winding of the first to twenty-fourth winding wires C1 to C24 will be described in accordance with a winding-wire winding process table illustrated in the following Table 3 and winding explanatory views illustrated in FIGS. 12 to 15.

TABLE 3

| | | Flyer | |
|---|---|---|---|
| | | A Flyer | B Flyer |
| Winding-wire winding process 1 | Segment | S1: (Latched) | S13: (Latched) |
| 2 | Slot | Slot No. "23"→"1": (C12) | Slot No. "11"→"13": (C6) |
| 3 | Slot | Slot No. "5"→"3": (C2) | Slot No. "17"→"15": (C8) |
| 4 | Slot | Slot No. "9"→"7": (C4) | Slot No. "21"→"19": (C10) |
| 5 | Slot | Slot No. "13"→"11": (C6) | Slot No. "1"→"23": (C12) |
| 6 | Segment | S10: (Latched) | S22: (Latched) |
| 7 | Slot | Slot No. "9": (To side opposite to commutator) | Slot No. "21": (To side opposite to commutator) |
| 8 | Slot | Slot No. "19": (To commutator side) | Slot No. "7": (To commutator side) |
| 9 | Segment | S16: (Latched) | S4: (Latched) |
| 10 | Slot | Slot No. "15": (To side opposite to commutator) | Slot No. "3": (To side opposite to commutator) |
| 11 | Slot | Slot No. "19"→"17": (C9) | Slot No. "7"→"5": (C3) |
| 12 | Slot | Slot No. "23"→"21": (C11) | Slot No. "11"→"9": (C5) |
| 13 | Slot | Slot No. "3"→"1": (C1) | Slot No. "15"→"13": (C7) |
| 14 | Segment | S23: (Latched) | S11: (Latched) |
| 15 | Slot | Slot No. "22": (To side opposite to commutator) | Slot No. "10": (To side opposite to commutator) |
| 16 | Slot | Slot No. "2"→"24": (C24) | Slot No. "14"→"12": (C18) |
| 17 | Slot | Slot No. "6"→"4": (C14) | Slot No. "18"→"16": (C20) |
| 18 | Slot | Slot No. "10"→"8": (C16) | Slot No. "22"→"20": (C22) |
| 19 | Segment | S6: (Latched) | S18: (Latched) |
| 20 | Slot | Slot No. "4": (To side opposite to commutator) | Slot No. "16": (To side opposite to commutator) |
| 21 | Slot | Slot No. "18": (To commutator side) | Slot No. "6": (To commutator side) |
| 22 | Segment | S17: (Latched) | S5: (Latched) |
| 23 | Slot | Slot No. "16"→"14": (C19) | Slot No. "4"→"2": (C13) |
| 24 | Slot | Slot No. "10"→"12": (C17) | Slot No. "22"→"24": (C23) |
| 25 | Slot | Slot No. "6"→"8": (C15) | Slot No. "18"→"20": (C21) |
| 26 | Segment | S8: (Latched)→Disconnection | S20: (Latched)→Disconnection |
| 27 | Cut-off/removal | 4 spots cut-off→removed | 4 spots cut-off→removed |

In the second embodiment, as is obvious from the process table illustrated in Table 3 and the winding explanatory views illustrated in FIGS. 12 to 15, this is a method of winding one of the winding wires and another of the winding wires arranged at positions faced with each other at 180° at the same time, and the double-flyer winding machine (A flyer and B flyer) same as above is used.

Winding-wire Winding Process 1 (Segment: S1, S13)

As illustrated in FIG. 12A, the A flyer hooks the start end portion of the first conductor W1 on the riser R of the first segment 51.

On the other hand, as illustrated in FIG. 12B, the B flyer hooks the start end portion of the second conductor W2 on the riser R of the thirteenth segment S13.

Winding-wire Winding Process 2 (Slot: Twelfth Winding Wire C12, Sixth Winding Wire C6)

As illustrated in FIG. 12A, the A flyer routes the first conductor W1 hooked by the riser R of the first segment S1 in the counterclockwise direction to the slot SL with the slot number "23". Then, the A flyer winds the twelfth winding wire C12 in the forward winding direction around the inner winding portion T12c of the twelfth tooth T12 with the routed first conductor W1 between the slots SL with the slot numbers "23" and "1".

On the other hand, as illustrated in FIG. 12B, the B flyer routes the second conductor W2 hooked by the riser R of the thirteenth segment S13 in the counterclockwise direction to the slot SL with the slot number "11". Then, the B flyer winds the sixth winding wire C6 in the forward winding direction around the inner winding portion T6c of the sixth tooth T6 with the routed second conductor W2 between the slots SL with the slot numbers "11" and "13".

Winding-wire Winding Process 3 (Slot: Second Winding Wire C2, Eighth Winding Wire C8)

As illustrated in FIG. 12A, the A flyer pulls out the first conductor W1 having wound the twelfth winding wire C12 around the inner winding portion T12c to the commutator side from the slot SL with the slot number "1". Subsequently, the A flyer routes the first conductor W1 having been pulled out to the commutator side in the clockwise direction to the slot SL with the slot number "5". Then, the A flyer winds the second winding wire C2 in the reverse winding direction around the inner winding portion T2c of the second tooth T2 with the routed first conductor W1 between the slots SL with the slot numbers "5" and "3".

On the other hand, as illustrated in FIG. 12B, the B flyer pulls out the second conductor W2 having wound the sixth winding wire C6 around the inner winding portion T6c to the commutator side from the slot SL with the slot number "13". Subsequently, the B flyer routes the second conductor W2 having been pulled out to the commutator side in the clockwise direction to the slot SL with the slot number "17".

Then, the B flyer winds the eighth winding wire C8 in the reverse winding direction around the inner winding portion T8c of the eighth tooth T8 with the routed second conductor W2 between the slots SL with the slot numbers "17" and "15".

Winding-wire Winding Process 4 (Slot: Fourth Winding Wire C4, Tenth Winding Wire C10)

As illustrated in FIG. 12A, the A flyer pulls out the first conductor W1 having wound the second winding wire C2 around the inner winding portion T2c to a side opposite to the commutator from the slot SL with the slot number "5". Subsequently, the A flyer routes the first conductor W1 having been pulled out to the side opposite to the commutator in the clockwise direction to the slot SL with the slot number "9". Then, the A flyer winds the fourth winding wire C4 in the forward winding direction around the inner winding portion T4c of the fourth tooth T4 with the routed first conductor W1 between the slots SL with the slot numbers "9" and "7".

On the other hand, as illustrated in FIG. 12B, the B flyer pulls out the second conductor W2 having wound the eighth winding wire C8 around the inner winding portion T8c to the side opposite to the commutator from the slot SL with the slot number "17". Subsequently, the B flyer routes the second conductor W2 having been pulled out to the side opposite to the commutator in the clockwise direction to the slot SL with the slot number "21". Then, the B flyer winds the tenth winding wire C10 in the forward winding direction around the inner winding portion T10c of the tenth tooth T10 with the routed second conductor W2 between the slots SL with the slot numbers "21" and "19".

Winding-wire Winding Process 5 (Slot: Sixth Winding Wire C6, Twelfth Winding Wire C12)

As illustrated in FIG. 12A, the A flyer pulls out the first conductor W1 having wound the fourth winding wire C4 around the inner winding portion T4c to the commutator side from the slot SL with the slot number "9". Subsequently, the A flyer routes the first conductor W1 having been pulled out to the commutator side to the slot SL with the slot number "13" in the clockwise direction. Then, the A flyer winds the sixth winding wire C6 by one turn in the reverse winding direction around the inner winding portion T6c of the sixth tooth T6 with the routed first conductor W1 between the slots SL with the slot numbers "13" and "11".

On the other hand, as illustrated in FIG. 12B, the B flyer pulls out the second conductor W2 having wound the tenth winding wire C10 around the inner winding portion T10c to the commutator side from the slot SL with the slot number "21". Subsequently, the B flyer routes the second conductor W2 having been pulled out to the commutator side to the slot SL with the slot number "1" in the clockwise direction. Then, the B flyer winds the twelfth winding wire C12 by one turn in the reverse winding direction around the inner winding portion T12c of the twelfth tooth T12 with the routed second conductor W2 between the slots SL with the slot numbers "1" and "23".

Winding-wire Winding Process 6 (Segment: S10, S22)

As illustrated in FIG. 12A, the A flyer pulls out the first conductor W1 having wound the sixth winding wire C6 around the inner winding portion T6c to the commutator side through the slot SL with the slot number "11". Subsequently, the A flyer routes the first conductor W1 having been pulled out to the commutator side to the tenth segment S10 in the counterclockwise direction and hooks it on the riser R of the tenth segment S10.

On the other hand, as illustrated in FIG. 12B, the B flyer pulls out the second conductor W2 having wound the twelfth winding wire C12 around the inner winding portion T12c to the commutator side through the slot SL with the slot number "23". Subsequently, the B flyer routes the second conductor W2 having been pulled out to the commutator side to the twenty-second segment S22 in the counterclockwise direction and hooks it on the riser R of the twenty-second segment S22.

Winding-wire Winding Process 7 (Slot: Slot Number "9", Slot Number "21")

As illustrated in FIG. 12A, the A flyer routes the first conductor W1 hooked on the riser R of the tenth segment S10 in the counterclockwise direction and pulls it out to the side opposite to the commutator from the commutator side through the slot SL with the slot number "9".

On the other hand, as illustrated in FIG. 12B, the B flyer routes the second conductor W2 hooked on the riser R of the twenty-second segment S22 in the counterclockwise direction and pulls it out to the side opposite to the commutator from the commutator side through the slot SL with the slot number "21".

Winding-wire Winding Process 8 (Slot: Slot Number "19", Slot Number "7")

As illustrated in FIG. 12A, the A flyer routes the first conductor W1 having been pulled out to the side opposite to the commutator from the slot SL with the slot number "9" to the slot SL with the slot number "19" in the clockwise direction. Then, the A flyer pulls out the first conductor W1 having been routed to the slot SL with the slot number "19" to the commutator side from the slot SL with the slot number "19".

On the other hand, as illustrated in FIG. 12B, the B flyer routes the second conductor W2 having been pulled out to the side opposite to the commutator from the slot SL with the slot number "21" to the slot SL with the slot number "7" in the clockwise direction. Then, the B flyer pulls out the second conductor W2 having been routed to the slot SL with the slot number "7" to the commutator side from the slot SL with the slot number "7".

Winding-wire Winding Process 9 (Segment: S16, S4)

As illustrated in FIG. 13A, the A flyer routes the first conductor W1 having been pulled out to the commutator side from the slot SL with the slot number "19" to the sixteenth segment S16 in the counterclockwise direction and hooks it on the riser R of the sixteenth segment S16.

On the other hand, as illustrated in FIG. 13B, the B flyer routes the second conductor W2 having been pulled out to the commutator side from the slot SL with the slot number "7" to the fourth segment S4 in the counterclockwise direction and hooks it on the riser R of the fourth segment S4.

Winding-wire Winding Process 10 (Slot: Slot Number "15", Slot Number "3")

As illustrated in FIG. 13A, the A flyer routes the first conductor W1 having been hooked on the riser R of the sixteenth segment S16 to the slot SL with the slot number "15" in the counterclockwise direction and pulls it out to the side opposite to the commutator from the commutator side through the slot SL with the slot number "15".

On the other hand, as illustrated in FIG. 13B, the B flyer routes the second conductor W2 having been hooked on the riser R of the fourth segment S4 to the slot SL with the slot number "3" in the counterclockwise direction and pulls it out from the commutator side to the side opposite to the commutator through the slot SL with the slot number "3".

Winding-wire Winding Process 11 (Slot: Ninth Winding Wire C9, Third Winding Wire C3)

As illustrated in FIG. 13A, the A flyer routes the first conductor W1 having been pulled out to the side opposite to the commutator from the slot SL with the slot number "15" to the slot SL with the slot number "19" in the clockwise direction. Then, the A flyer winds the ninth winding wire C9 in the forward winding direction around the inner winding portion T9c of the ninth tooth T9 with the routed first conductor W1 between the slots SL with the slot numbers "19" and "17".

When the ninth winding wire C9 is wound around the inner winding portion T9c, the first conductor W1 has been pulled out by the A flyer from the side opposite to the commutator to the commutator side at the slot SL with the slot number "19" in the preceding winding-wire winding process 8. Therefore, the ninth winding wire C9 is wound so that the first conductor W1 previously passing through the slot SL with the slot number "19" is embedded inside in the radial direction.

On the other hand, as illustrated in FIG. 13B, the B flyer routes the second conductor W2 having been pulled out from the slot SL with the slot number "3" to the side opposite to the commutator to the slot SL with the slot number "7" in the clockwise direction. Then, the B flyer winds the third winding wire C3 in the forward winding direction around the inner winding portion T3c of the third tooth T3 with the routed second conductor W2 between the slots SL with the slot numbers "7" and "5".

When the third winding wire C3 is wound around the inner winding portion T3c, the second conductor W2 has been pulled out by the B flyer from the side opposite to the commutator to the commutator side at the slot SL with the slot number "7" in the preceding winding-wire winding process 8. Therefore, the third winding wire C3 is wound so that the second conductor W2 previously passing through the slot SL with the slot number "7" is embedded inside in the radial direction.

Winding-wire Winding Process 12 (Slot: Eleventh Winding Wire C11, Fifth Winding Wire C5)

As illustrated in FIG. 13A, the A flyer pulls out the first conductor W1 having wound the ninth winding wire C9 around the inner winding portion T9c to the commutator side from the slot SL with the slot number "19". Subsequently, the A flyer routes the first conductor W1 having been pulled out to the commutator side to the slot SL with the slot number "23" in the clockwise direction. Then, the A flyer winds the eleventh winding wire C11 in the reverse winding direction around the inner winding portion T11c of the eleventh tooth T11 with the routed first conductor W1 between the slots SL with the slot numbers "23" and "21".

When the eleventh winding wire C11 is wound around the inner winding portion T11c, the second conductor W2 has been pulled out by the B flyer from the commutator side to the side opposite to the commutator at the slot SL with the slot number "21" in the preceding winding-wire winding process 7. Therefore, the eleventh winding wire C11 is wound so that the second conductor W2 previously passing through the slot SL with the slot number "21" is embedded inside in the radial direction.

On the other hand, as illustrated in FIG. 13B, the B flyer pulls out the second conductor W2 having wound the third winding wire C3 around the inner winding portion T3c to the commutator side from the slot SL with the slot number "7". Subsequently, the B flyer routes the second conductor W2 having been pulled out to the commutator side to the slot SL with the slot number "11" in the clockwise direction. Then, the B flyer winds the fifth winding wire C5 in the reverse winding direction around the inner winding portion T5c of the fifth tooth T5 with the routed second conductor W2 between the slots SL with the slot numbers "11" and "9".

When the fifth winding wire C5 is wound around the inner winding portion T5c, the first conductor W1 has been pulled out by the A flyer from the commutator side to the side opposite to the commutator at the slot SL with the slot number "9" in the preceding winding-wire winding process 7. Therefore, the fifth winding wire C5 is wound so that the first conductor W1 previously passing through the slot SL with the slot number "9" is embedded inside in the radial direction.

Winding-wire Winding Process 13 (Slot: First Winding Wire C1, Seventh Winding Wire C7)

As illustrated in FIG. 13A, the A flyer pulls out the first conductor W1 having wound the eleventh winding wire C11 around the inner winding portion T11c to the side opposite to the commutator from the slot SL with the slot number "23". Subsequently, the A flyer routes the first conductor W1 having been pulled out to the side opposite to the commutator to the slot SL with the slot number "3" in the clockwise direction. Then, the A flyer winds the first winding wire C1 in the forward winding direction around the inner winding portion T1c of the first tooth T1 with the routed first conductor W1 between the slots SL with the slot numbers "3" and "1".

On the other hand, as illustrated in FIG. 13B, the B flyer pulls out the second conductor W2 having wound the fifth winding wire C5 around the inner winding portion T5c to the side opposite to the commutator from the slot SL with the slot number "11". Subsequently, the B flyer routes the second conductor W2 having been pulled out to the side opposite to the commutator to the slot SL with the slot number "15" in the clockwise direction. Then, the B flyer winds the seventh winding wire C7 in the forward winding direction around the inner winding portion T7c of the seventh tooth T7 with the routed second conductor W2 between the slots SL with the slot numbers "15" and "13".

Winding-wire Winding Process 14 (Segment: S23, S11)

As illustrated in FIG. 13A, the A flyer pulls out the first conductor W1 having wound the first winding wire C1 around the inner winding portion T1c to the commutator side from the slot SL with the slot number "3". Subsequently, the A flyer routes the first conductor W1 having been pulled out to the commutator side to the twenty-third segment S23 in the counterclockwise direction and hooks it on the riser R of the twenty-third segment S23.

On the other hand, as illustrated in FIG. 13B, the B flyer pulls out the second conductor W2 having wound the seventh winding wire C7 around the inner winding portion T7c to the commutator side from the slot SL with the slot number "15". Subsequently, the B flyer routes the second conductor W2 having been pulled out to the commutator side to the eleventh segment S11 in the counterclockwise direction and hooks it on the riser R of the eleventh segment S11.

At this time, the first to twelfth winding wires C1 to C12 in the concentrated winding are wound by the A flyer and the B flyer around all the 12 inner winding portions Tc1 to T12c, respectively. Then, the thirteenth to twenty-fourth winding wires C13 to C24 in the distributed winding are wound in the subsequent processes.

Winding-wire Winding Process 15 (Slot: Slot Number "22", Slot Number "10")

As illustrated in FIG. 14A, the A flyer routes the first conductor W1 hooked on the riser R of the twenty-third segment S23 to the slot SL with the slot number "22" in the counterclockwise direction and pulls it out to the side opposite to the commutator from the commutator side through the slot SL with the slot number "22".

On the other hand, as illustrated in FIG. 14B, the B flyer routes the second conductor W2 hooked on the riser R of the eleventh segment S11 to the slot SL with the slot number "10" in the counterclockwise direction and pulls it out to the side opposite to the commutator from the commutator side through the slot SL with the slot number "10".

Winding-wire Winding Process 16 (Slot: Twenty-fourth Winding Wire C24, Eighteenth Winding Wire C18)

As illustrated in FIG. 14A, the A flyer routes the first conductor W1 having been pulled out to the side opposite to the commutator through the slot SL with the slot number "22" to the slot SL with the slot number "2" in the clockwise direction. Then, the A flyer winds the twenty-fourth winding wire C24 in the forward winding direction with the routed first conductor W1 between the slots SL with the slot numbers "2" and "24", that is, between the second branch portion T1b of the first tooth T1 and the first branch portion T12a of the twelfth tooth T12.

On the other hand, as illustrated in FIG. 14B, the B flyer routes the second conductor W2 having been pulled out to the side opposite to the commutator through the slot SL with the slot number "10" to the slot SL with the slot number "14" in the clockwise direction. Then, the B flyer winds the eighteenth winding wire C18 in the forward winding direction with the routed second conductor W2 between the slots SL with the slot numbers "14" and "12", that is, between the second branch portion T7b of the seventh tooth T7 and the first branch portion T6a of the sixth tooth T6.

Winding-wire Winding Process 17 (Slot: Fourteenth Winding Wire C14, Twentieth Winding Wire C20)

As illustrated in FIG. 14A, the A flyer pulls out the first conductor W1 of the twenty-fourth winding wire C24 wound between the second branch portion T1b and the first branch portion T12a from the slot SL with the slot number "2" to the commutator side. Subsequently, the A flyer routes the first conductor W1 having been pulled out to the commutator side to the slot SL with the slot number "6" in the clockwise direction. Then, the A flyer winds the fourteenth winding wire C14 in the reverse winding direction with the routed first conductor W1 between the slots SL with the slot numbers "6 " and "4", that is, between the second branch portion T3b of the third tooth T3 and the first branch portion T2a of the second tooth T2.

On the other hand, as illustrated in FIG. 14B, the B flyer pulls out the second conductor W2 of the eighteenth winding wire C18 wound between the second branch portion T7b and the first branch portion T6a to the commutator side from the slot SL with the slot number "14". Subsequently, the B flyer routes the second conductor W2 having been pulled out to the commutator side to the slot SL with the slot number "18" in the clockwise direction. Then, the B flyer winds the twentieth winding wire C20 in the reverse winding direction with the routed second conductor W2 between the slots SL with the slot numbers "18" and "16", that is, between the second branch portion T9b of the ninth tooth T9 and the first branch portion T8a of the eighth tooth T8.

Winding-wire Winding Process 18 (Slot: Sixteenth Winding Wire C16, Twenty-second Winding Wire C22)

As illustrated in FIG. 14A, the A flyer pulls out the first conductor W1 of the fourteenth winding wire C14 wound between the second branch portion T3b and the first branch portion T2a from the slot SL with the slot number "6" to the side opposite to the commutator. Subsequently, the A flyer routes the first conductor W1 having been pulled out to the side opposite to the commutator to the slot SL with the slot number "10" in the clockwise direction. Then, the A flyer winds the sixteenth winding wire C16 in the forward winding direction with the routed first conductor W1 between the slots SL with the slot numbers "10" and "8", that is, between the second branch portion T5b of the fifth tooth T5 and the first branch portion T4a of the fourth tooth T4.

On the other hand, as illustrated in FIG. 14B, the B flyer pulls out the second conductor W2 of the twentieth winding wire C20 wound between the second branch portion T9b and the first branch portion T8a to the side opposite to the commutator from the slot SL with the slot number "18". Subsequently, the B flyer routes the second conductor W2 having been pulled out to the side opposite to the commutator to the slot SL with the slot number "22" in the clockwise direction. Then, the B flyer winds the twenty-second winding wire C22 in the forward winding direction with the routed second conductor W2 between the slots SL with the slot numbers "22" and "20", that is, between the second branch portion T11b of the eleventh tooth T11 and the first branch portion T10a of the tenth tooth T10.

Winding-wire Winding Process 19 (Segment: S6, S18)

As illustrated in FIG. 14A, the A flyer pulls out the first conductor W1 wound between the second branch portion T5b and the first branch portion T4a to the commutator side through the slot SL with the slot number "10". Subsequently, the A flyer pulls out the first conductor W1 having been pulled out to the commutator side to the sixth segment S6 in the counterclockwise direction and hooks it on the riser R of the sixth segment S6.

On the other hand, as illustrated in FIG. 14B, the B flyer pulls out the second conductor W2 wound between the second branch portion T11b and the first branch portion T10a to the commutator side through the slot SL with the slot number "22". Subsequently, the B flyer pulls out the second conductor W2 having been pulled out to the commutator side to the eighteenth segment S18 in the counterclockwise direction and hooks it on the riser R of the eighteenth segment S18.

Winding-wire Winding Process 20 (Slot: Slot Number "4", Slot Number "16")

As illustrated in FIG. 14A, the A flyer routes the first conductor W1 hooked on the riser R of the sixth segment S6 to the slot SL with the slot number "4" in the counterclockwise direction and pulls it out to the side opposite to the commutator from the commutator side through the slot SL with the slot number "4".

On the other hand, as illustrated in FIG. 14B, the B flyer routes the second conductor W2 hooked on the riser R of the eighteenth segment S18 to the slot SL with the slot number "16" in the counterclockwise direction and pulls it out to the side opposite to the commutator from the commutator side through the slot SL with the slot number "16".

Winding-wire Winding Process 21 (Slot: Slot Number "18", Slot Number "6")

Figure 15A:
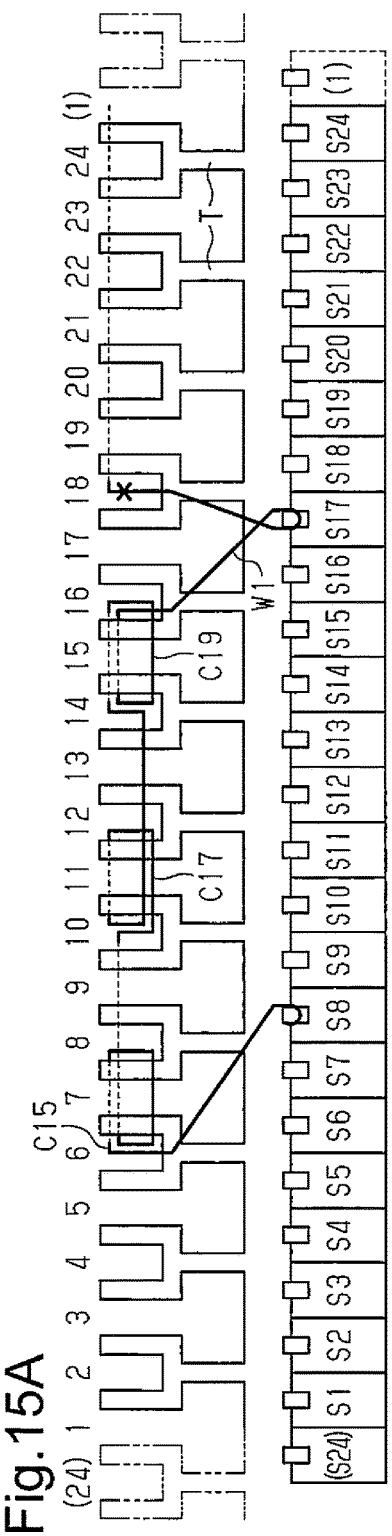
FIG. 15A is an explanatory view of winding-wire winding processes 21 to 26 of the A flyer in the second embodiment.

As illustrated in FIG. 15A, the A flyer routes the first conductor W1 having been pulled out to the side opposite to the commutator from the slot SL with the slot number "4" to the slot SL with the slot number "18" in the counterclockwise direction. Then, the A flyer pulls out the first conductor W1 having been routed to the slot SL with the slot number "18" to the commutator side from the slot SL with the slot number "18".

Figure 15B:
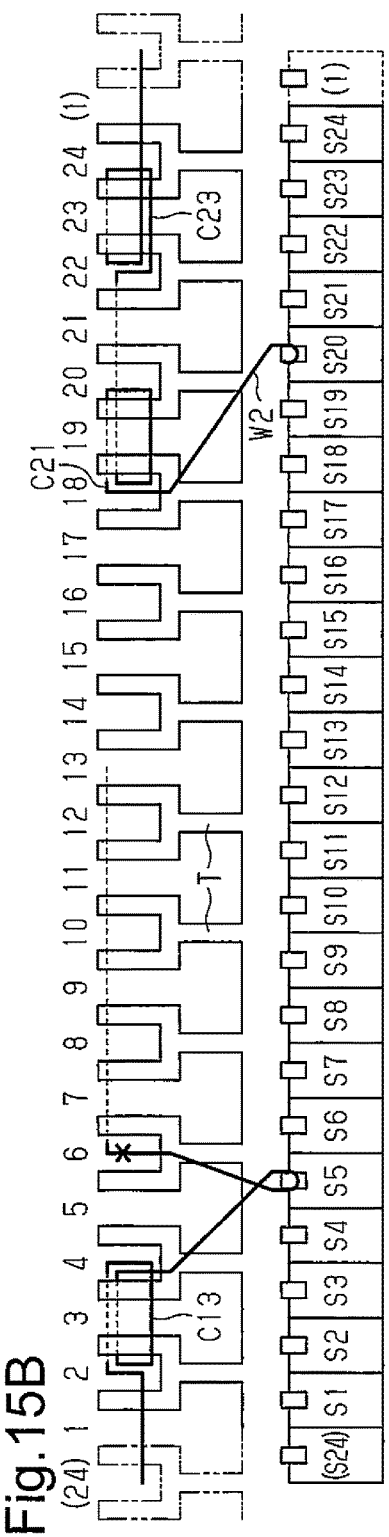
FIG. 15B is an explanatory view of winding-wire winding processes 21 to 26 of the B flyer in the second embodiment.

On the other hand, as illustrated in FIG. 15B, the B flyer routes the second conductor W2 having been pulled out to the side opposite to the commutator from the slot SL with the slot number "16" to the slot SL with the slot number "6" in the counterclockwise direction. Then, the B flyer pulls out the second conductor W2 having been routed to the slot SL with the slot number "6" to the commutator side from the slot SL with the slot number "6".

Winding-wire Winding Process 22 (Segment: S17, S5)

As illustrated in FIG. 15A, the A flyer pulls out the first conductor W1 having been pulled out to the commutator side from the slot SL with the slot number "17" to the closest seventeenth segment S17 and hooks it on the riser R of the seventeenth segment S17.

On the other hand, as illustrated in FIG. 15B, the B flyer pulls out the second conductor W2 having been pulled out to the commutator side from the slot SL with the slot number "6" to the closest fifth segment S5 and hooks it on the riser R of the fifth segment S5.

Winding-wire Winding Process 23 (Slot: Nineteenth Winding Wire C19, Thirteenth Winding Wire C13)

As illustrated in FIG. 15A, the A flyer routes the first conductor W1 hooked on the riser R of the seventeenth segment S17 to the slot SL with the slot number "16" in the counterclockwise direction. Then, the A flyer winds the nineteenth winding wire C19 in the reverse winding direction with the routed first conductor W1 between the slots SL with the slot numbers "16" and "14", that is, between the first branch portion T7a of the seventh tooth T7 and the second branch portion T8b of the eighth tooth T8.

When the nineteenth winding wire C19 is wound, the second conductor W2 has been pulled out by the B flyer from the commutator side to the side opposite to the commutator at the slot SL with the slot number "16" in the preceding winding-wire winding process 20. Therefore, the nineteenth winding wire C19 is wound so that the second conductor W2 previously passing through the slot SL with the slot number "16" is embedded inside in the radial direction.

On the other hand, as illustrated in FIG. 15B, the B flyer routes the second conductor W2 hooked on the riser R of the fifth segment S5 to the slot SL with the slot number "4" in the counterclockwise direction. Then, the B flyer winds the thirteenth winding wire C13 in the reverse winding direction with the routed second conductor W2 between the slots SL with the slot numbers "4" and "2", that is, between the first branch portion T1a of the first tooth T1 and the second branch portion T2b of the second tooth T2.

When the thirteenth winding wire C13 is wound, the first conductor W1 has been pulled out by the A flyer from the commutator side to the side opposite to the commutator at the slot SL with the slot number "4" in the preceding winding-wire winding process 20. Therefore, the thirteenth winding wire C13 is wound so that the first conductor W1 previously passing through the slot SL with the slot number "4" is embedded inside in the radial direction.

Winding-wire Winding Process 24 (Slot: Seventeenth Winding Wire C17, Twenty-third Winding Wire C23)

As illustrated in FIG. 15A, the A flyer pulls out the first conductor W1 of the nineteenth winding wire C19 wound between the first branch portion T7a and the second branch portion T8b to the commutator side from the slot SL with the slot number "14". Subsequently, the A flyer routes the first conductor W1 having been pulled out to the commutator side to the slot SL with the slot number "10" in the counterclockwise direction. Then, the A flyer winds the seventeenth winding wire C17 in the forward winding direction with the routed first conductor W1 between the slots SL with the slot numbers "10" and "12", that is, between the first branch portion T5a of the fifth tooth T5 and the second branch portion T6b of the sixth tooth T6.

On the other hand, as illustrated in FIG. 15B, the B flyer pulls out the second conductor W2 of the thirteenth winding wire C13 wound between the first branch portion T1a and the second branch portion T2b to the commutator side from the slot SL with the slot number "2". Subsequently, the B flyer routes the second conductor W2 having been pulled out to the commutator side to the slot SL with the slot number "22" in the counterclockwise direction. Then, the B flyer winds the twenty-third winding wire C23 in the forward winding direction with the routed second conductor W2 between the slots SL with the slot numbers "22" and "24", that is, between the first branch portion T11a of the eleventh tooth T11 and the second branch portion T12b of the twelfth tooth T12.

Winding-wire Winding Process 25 (Slot: Fifteenth Winding Wire C15, Twenty-first Winding Wire C21)

As illustrated in FIG. 15A, the A flyer pulls out the first conductor W1 of the seventeenth winding wire C17 wound between the first branch portion T5a and the second branch portion T6b to the side opposite to the commutator from the slot SL with the slot number "10". Subsequently, the A flyer routes the first conductor W1 having been pulled out to the side opposite to the commutator to the slot SL with the slot number "6" in the counterclockwise direction. Then, the A flyer winds the fifteenth winding wire C15 in the reverse winding direction with the routed first conductor W1 between the slots SL with the slot numbers "6" and "8", that is, between the first branch portion T3a of the third tooth T3 and the second branch portion T4b of the fourth tooth T4.

When the fifteenth winding wire C15 is wound, the second conductor W2 has been pulled out by the B flyer from the side opposite to the commutator to the commutator side at the slot SL with the slot number "6" in the preceding winding-wire winding process 21. Therefore, the fifteenth winding wire C15 is wound so that the second conductor W2 previously passing through the slot SL with the slot number "6" is embedded inside in the radial direction.

On the other hand, as illustrated in FIG. 15B, the B flyer pulls out the second conductor W2 of the twenty-third winding wire C23 wound between the first branch portion T11a and the second branch portion T12b to the side opposite to the commutator from the slot SL with the slot number "22". Subsequently, the B flyer routes the second conductor W2 having been pulled out to the side opposite to the commutator to the slot SL with the slot number "18" in the counterclockwise direction. Then, the B flyer winds the twenty-first winding wire C21 in the reverse winding direction with the routed second conductor W2 between the slots SL with the slot numbers "18" and "20", that is, between the first branch portion T9a of the ninth tooth T9 and the second branch portion T10b of the tenth tooth T10.

When the twenty-first winding wire C21 is wound, the first conductor W1 has been pulled out by the A flyer from the side opposite to the commutator to the commutator side at the slot SL with the slot number "18" in the preceding winding-wire winding process 21. Therefore, the twenty-first winding wire C21 is wound so that the first conductor W1 previously passing through the slot SL with the slot number "18" is embedded inside in the radial direction.

Winding-wire Winding Process 26 (Segment: S8, S20)

As illustrated in FIG. 15A, the A flyer pulls out the first conductor W1 wound between the first branch portion T3a and the second branch portion T4b to the commutator side through the slot SL with the slot number "6". Subsequently, the A flyer pulls out the first conductor W1 having been pulled out to the commutator side to the eighth segment S8 in the clockwise direction and hooks it on the riser R of the eighth segment S8. Then, the A flyer cuts off (disconnects) the first conductor W1 hooked by the riser R of the eighth segment S8.

On the other hand, as illustrated in FIG. 15B, the B flyer pulls out the second conductor W2 wound between the first branch portion T9a and the second branch portion T10b to the commutator side through the slot SL with the slot number "18". Subsequently, the B flyer pulls out the second conductor W2 having been pulled out to the commutator side to the twentieth segment S20 in the clockwise direction and hooks it on the riser R of the twentieth segment S20. Then, the B flyer cuts off (disconnects) the second conductor W2 hooked by the riser R of the twentieth segment S20.

As a result, the winding work of the first to twenty-fourth winding wires C1 to C24 using the double-flyer winding machine composed of the A flyer and the B flyer is finished.

That is, until the first to twelfth winding wires C1 to C12 made of twelve concentrated winding wires and the thirteenth to twenty-fourth winding wires C13 to C24 made of twelve distributed winding wires have been wound, the A flyer and the B flyer have performed the winding work without disconnecting the first and second conductors W1 and W2 in the middle, respectively.

Winding-wire Winding Process 27 (Cut-off and Removal)

This cut-off and removal includes four cut-off and removal operations of an unnecessary portion between the concentrated winding wires wound with the first conductor W1, an unnecessary portion between the concentrated winding wires wound with the second conductor W2, an unnecessary portion between the distributed winding wires wound with the first conductor W1, and an unnecessary portion between the distributed winding wires wound with the second conductor W2.

(1) Cut-off and Removal of Unnecessary Portion Between Concentrated Winding Wires Wound with the First Conductor W1

The first conductor W1 is cut at two spots indicated by cross marks on the side opposite to the commutator in FIGS. 12A and 13A, respectively. The two spots, that is, a portion pulled out from the slot SL with the slot number "9" and a portion pulled into the slot SL with the slot number "19", are cut.

That is because, in the winding-wire winding process 7 to the winding-wire winding process 8, a portion of the first conductor W1 routed from the slot SL with the slot number "9" to the slot SL with the slot number "19" is the unnecessary portion. That is, if the unnecessary portion of first conductor W1 is left as it is, the second short-circuit wire L2 and the eighth short-circuit wire L8 are brought into an electrically short-circuited state. Thus, they need to be cut off and removed as unnecessary portions in order to prevent the above-described short-circuited state.

Then, after the two spots on the side opposite to the commutator are cut off, the unnecessary portion of first conductor W1 between the two spots is removed from the side opposite to the commutator.

At this time, the first conductor W1 remaining on the side of the slot SL with the slot number "9" after cutting (side part of the unnecessary portion of conductor) is embedded and held inside in the radial direction of the fifth winding wire C5 wound by the B flyer in the winding-wire winding process 12. Moreover, the first conductor W1 pulled out from the riser R of the tenth segment S10 to the slot SL with the slot number "9" is wound by one turn around the closest inner winding portion T6c as the sixth winding wire C6 before being hooked by the riser R of the tenth segment S10. Therefore, the first conductor W1 hooked by the riser R of the tenth segment S10 is hooked by the riser R between the sixth winding wire C6 and the fifth winding wire C5 without loosening.

Similarly, the first conductor W1 remaining on the side of the slot SL with the slot number "19" after cutting (side part of the unnecessary portion of conductor) is embedded and held inside in the radial direction of the ninth winding wire C9 wound by the A flyer in the winding-wire winding process 11.

Thus, even if the unnecessary portion of first conductor W1 is cut off and removed, the wound winding wire does not become loose or unwound.

(2) Cut-off and Removal of Unnecessary Portion Between Concentrated Winding Wires Wound with the Second Conductor W2

The second conductor W2 is cut at two spots indicated by cross marks on the side opposite to the commutator in FIGS. 12B and 13B. The two spots, that is, a portion pulled out from the slot SL with the slot number "21" and a portion pulled into the slot SL with the slot number "7", are cut.

That is because, in the winding-wire winding process 7 to the winding-wire winding process 8, a portion of the second conductor W2 routed from the slot SL with the slot number "21" to the slot SL with the slot number "7" is the unnecessary portion. That is, if the unnecessary portion of second conductor W2 is left as it is, the sixth short-circuit wire L6 and the fourth short-circuit wire L4 are brought into an electrically short-circuited state. Thus, they need to be cut off and removed as unnecessary portions in order to prevent the above-described short-circuited state.

Then, after the two spots on the side opposite the commutator are cut off, the unnecessary portion of second conductor W2 between the two spots is removed from the side opposite to the commutator.

At this time, the second conductor W2 remaining on the side of the slot SL with the slot number "21" after cutting (side part of the unnecessary portion of conductor) is embedded and held inside in the radial direction of the eleventh winding wire C11 wound by the A flyer in the winding-wire winding process 12. Moreover, the second conductor W2 pulled out from the riser R of the twenty-second segment S22 to the slot SL with the slot number "21" is wound by one turn around the closest inner winding portion T12c as the twelfth winding wire C12 before being hooked by the riser R of the twenty-second segment S22. Therefore, the second conductor W2 hooked by the riser R of the twenty-second segment S22 is hooked by the riser R between the twelfth winding wire C12 and the eleventh winding wire C11 without loosening.

Similarly, the second conductor W2 remaining on the side of the slot SL with the slot number "7" after cutting (side part of the unnecessary portion of conductor) is embedded and held inside in the radial direction of the third winding wire C3 wound by the B flyer in the winding-wire winding process 11.

Thus, even if the unnecessary portion of second conductor W2 is cut off and removed, the wound winding wire does not become loose or unwound.

(3) Cut-off and Removal of Unnecessary Portion Between Distributed Winding Wires Wound with the First Conductor W1

The first conductor W1 is cut at two spots indicated by cross marks on the side opposite to the commutator in FIGS. 14A and 15A, respectively. The two spots, that is, a portion pulled out from the slot SL with the slot number "4" and a portion pulled into the slot SL with the slot number "18", are cut.

That is because, in the winding-wire winding process 20 to the winding-wire winding process 21, a portion of the first conductor W1 routed from the slot SL with the slot number "4" to the slot SL with the slot number "18" is the unnecessary portion. That is, if the unnecessary portion of first conductor W1 is left as it is, the sixth short-circuit wire L6 and the first short-circuit wire L1 are brought into an electrically short-circuited state. Thus, they need to be cut off and removed as unnecessary portions in order to prevent the above-described short-circuited state.

Then, after the two spots on the side opposite to the commutator are cut off, the unnecessary portion of first conductor W1 between the two spots is removed from the side opposite to the commutator. At this time, the first conductor W1 remaining on the side of the slot SL with the slot number "4" after cutting (side part of the unnecessary portion of conductor) is embedded and held inside in the radial direction of the thirteenth winding wire C13 wound by the B flyer in the winding-wire winding process 23. Similarly, the first conductor W1 remaining on the side of the slot SL with the slot number "18" after cutting (side part of the unnecessary portion of conductor) is embedded and held inside in the radial direction of the twenty-first winding wire C21 wound by the B flyer in the winding-wire winding process 25.

Thus, even if the unnecessary portion of first conductor W1 is cut off and removed, the wound winding wire does not become loose or unwound.

(4) Cut-off and Removal of Unnecessary Portion Between Distributed Winding Wires Wound with the Second Conductor W2

The second conductor W2 is cut at two spots indicated by cross marks on the side opposite to the commutator in FIGS. 14B and 15B, respectively. The two spots, that is, a portion pulled out from the slot SL with the slot number "16" and a portion pulled into the slot SL with the slot number "6", are cut.

That is because, in the winding-wire winding process 20 to the winding-wire winding process 21, a portion of the second conductor W2 routed from the slot SL with the slot number "16" to the slot SL with the slot number "6" is the unnecessary portion. That is, if the unnecessary portion of second conductor W2 is left as it is, the second short-circuit wire L2 and the fifth short-circuit wire L5 are brought into an electrically short-circuited state. Thus, they need to be cut off and removed as unnecessary portions in order to prevent the above-described short-circuited state.

Then, after the two spots on the side opposite to the commutator are cut off, the unnecessary portion of second conductor W2 between the two spots is removed from the side opposite to the commutator.

At this time, the second conductor W2 remaining on the side of the slot SL with the slot number "16" after cutting (side part of the unnecessary portion of conductor) is embedded and held inside in the radial direction of the nineteenth winding wire C19 wound by the A flyer in the winding-wire winding process 23. Similarly, the second conductor W2 remaining on the side of the slot SL with the slot number "6" after cutting (side part of the unnecessary portion of conductor) is embedded and held inside in the radial direction of the fifteenth winding wire C15 wound by the A flyer in the winding-wire winding process 25.

Thus, even if the unnecessary portion of second conductor W2 is cut off and removed, the wound winding wire does not become loose or unwound.

Then, when the four unnecessary portions are removed, the riser R is bent in a direction in which the portion where the winding end portions of the respective corresponding short-circuit wires and the winding wires and the like are hooked is held. Subsequently, fusing is performed, and by this fusing, the riser R of each segment is joined and electrically connected with the winding end portion of each corresponding winding wire and the non-end portion of each corresponding short-circuit wire, respectively.

As a result, the armature 3 is produced.

Subsequently, an action of the above-described second embodiment will be described.

Similarly to the first embodiment, the wiring-wire winding work in each share is performed without collision between the A flyer and the B flyer. At this time, similarly to the first embodiment, the 22 winding wires excluding the twelfth winding wire C12 and the sixth winding wire C6 at the winding start are wound such that their start ends and terminal ends are pulled out separately to the commutator side and the side opposite to the commutator. That is, the A and B flyers perform winding such that the start ends and the terminal ends of the 22 winding wires are pulled out separately in the direction getting closer to the commutator and in the direction away from the commutator.

Then, the conductors W1 and W2 between the concentrated winding wires to be hooked by the risers R are hooked by the risers R other than the risers R by which the conductors W1 and W2 between the concentrated winding wires have been already hooked. Moreover, the conductors W1 and W2 between the distributed winding wires to be hooked by the risers R are also hooked by the risers R other than the risers R by which the conductors W1 and W2 between the concentrated winding wires and the conductors W1 and W2 between the distributed winding wires have been already hooked.

As a result, similarly to the first embodiment, the conductors hooked by the risers R of the first to twenty-fourth segments S1 to S24 are two conductors W1 and W2 including the short-circuit wires at the maximum, which is an extremely small number. As a result, in fusing for electrically connecting the conductors W1 and W2 to the risers R in the subsequent process, insulation from the adjacent riser R can be ensured.

Moreover, after the winding work is performed by the A and B flyers until the first to twenty-fourth winding wires C1 to C24 have been wound, the unnecessary portions of the first and second conductors W1 and W2 were cut off and removed, respectively. Thus, the winding-wire winding work time can be reduced. By cutting off both the ends of the unnecessary portions of conductors W1 and W2 on the side opposite to the commutator and by pulling out the unnecessary portions of conductors W1 and W2 on the side opposite to the commutator, the unnecessary portions of W1 and W2 can be removed.

At this time, the portions of conductors W1 and W2 remaining in the slot SL after the unnecessary portions of conductors W1 and W2 are cut off are embedded and held inside in the radial direction in the winding wire wound in the slot SL. Thus, even if the unnecessary portions of conductors W1 and W2 are cut off and removed, the wound winding wire does not become loose or unwound.

Subsequently, advantages of the above-described second embodiment will be described below.

(4) According to this embodiment, the number of hooked conductors W1 and W2 hooked by the risers R of the first to twenty-fourth segments 51 to S24 can be reduced, and insulation from the adjacent riser R can be ensured.

(5) According to this embodiment, the winding work was performed by the A and B flyers until all the winding wires C1 to C24 had been wound and then, the unnecessary portions of the first and second conductors W1 and W2 were cut off and removed, respectively. Thus, the tact number can be reduced, and the winding-wire winding work time can be reduced.

(6) According to this embodiment, the portions of conductors W1 and W2 remaining in the slot SL after the unnecessary portions of conductors W1 and W2 are cut off are embedded and held inside in the radial direction in the winding wire wound in the slot SL. Thus, even if the unnecessary portions of conductors W1 and W2 are cut off and removed, the wound winding wire does not become loose or unwound.

The above-described second embodiment can be changed as follows:

In the second embodiment, similarly to the first embodiment, fusing was performed after the winding-wire winding process 27 for cutting off and removing the unnecessary portions of conductors W1 and W2. Instead of this, the winding-wire winding process 27 for cutting off and removing the unnecessary portions of conductors W1 and W2 may be performed after fusing.

In the second embodiment, too, similarly, the number of teeth T is set to 12, but this is not limiting, and the number of teeth T may be changed as appropriate.

(Third Embodiment)

Subsequently, a third embodiment will be described. The third embodiment is different from the first and second embodiments in the winding method of the winding wire. Thus, in the third embodiment, for convenience of explanation, the winding method of the winding wire will be described.

In the third embodiment, the winding of the first to twenty-fourth winding wires C1 to C24 will be described in accordance with a winding-wire winding process table illustrated in the following Table 4 and winding explanatory views illustrated in FIGS. 16 to 19.

TABLE 4

| | | Flyer | |
| --- | --- | --- | --- |
| | | A Flyer | B Flyer |
| Winding-wire winding process 1 | Segment | S1: (Latched) | S13: (Latched) |
| 2 | Slot | Slot No. "1"→"3": (C1) | Slot No. "13"→"15": (C7) |
| 3 | Slot | Slot No. "7"→"5": (C3) | Slot No. "19"→"17": (C9) |
| 4 | Slot | Slot No. "11"→"9": (C5) | Slot No. "23"→"21": (C11) |
| 5 | Segment | S10: (Latched) | S22: (Latched) |
| 6 | Slot | Slot No. "11": (To side opposite to commutator) | Slot No. "23": (To side opposite to commutator) |
| 7 | Slot | Slot No. "15"→"13": (C7) | Slot No. "3"→"1": (C1) |
| 8 | Slot | Slot No. "19"→"17": (C9) | Slot No. "7"→"5": (C3) |
| 9 | Slot | Slot No. "23"→"21": (C11) | Slot No. "11"→"9": (C5) |
| 10 | Slot | Slot No. "17": (To commutator side) | Slot No. "5": (To commutator side) |
| 11 | Segment | S17: (Latched) | S5: (Latched) |
| 12 | . . . | Disconnection | Disconnection |
| 13 | Segment | S15: (Latched) | S3: (Latched) |
| 14 | Slot | Slot No. "15"→"17": (C8) | Slot No. "3"→"5": (C2) |
| 15 | Slot | Slot No. "11"→"13": (C6) | Slot No. "23"→"1": (C12) |
| 16 | Slot | Slot No. "7"→"9": (C4) | Slot No. "19"→"21": (C10) |
| 17 | Segment | S8: (Latched) | S20: (Latched) |
| 18 | Slot | Slot No. "9"→"7": (C4) | Slot No. "21"→"19": (C10) |
| 19 | Slot | Slot No. "3"→"5": (C2) | Slot No. "15"→"17": (C8) |
| 20 | Slot | Slot No. "23"→"1": (C12) | Slot No. "11"→"13": (C6) |
| 21 | Slot | Slot No. "19"→"21": (C10) | Slot No. "7"→"9": (C4) |
| 22 | Slot | Slot No. "23": (To commutator side) | Slot No. "11": (To commutator side) |
| 23 | Segment | S23: (Latched) | S11: (Latched) |
| 24 | Slot | Slot No. "24"→"22": (C23) | Slot No. "12"→"10": (C17) |
| 25 | Slot | Slot No. "18"→"20": (C21) | Slot No. "6"→"8": (C15) |
| 26 | Slot | Slot No. "14"→"16": (C19) | Slot No. "2"→"4": (C13) |
| 27 | Segment | S14: (Latched) | S2: (Latched) |
| 28 | Slot | Slot No. "14": (To side opposite commutator) | to Slot No. "2": (To side opposite to commutator) |
| 29 | Slot | Slot No. "10"→"12": (C17) | Slot No. "22"→"24": (C23) |
| 30 | Slot | Slot No. "6"→"8": (C15) | Slot No. "18"→"20": (C21) |
| 31 | Slot | Slot No. "2"→"4": (C13) | Slot No. "14"→"16": (C19) |
| 32 | Slot | Slot No. "8": (To commutator side) | Slot No. "20": (To commutator side) |
| 33 | Segment | S7: (Latched) | S19: (Latched) |
| 34 | . . . | Disconnection | Disconnection |
| 35 | Segment | S16: (Latched) | S4: (Latched) |
| 36 | Slot | Slot No. "16"→"18": (C20) | Slot No. "4"→"6": (C14) |
| 37 | Slot | Slot No. "12"→"14": (C18) | Slot No. "24"→"2": (C24) |
| 38 | Slot | Slot No. "8"→"10": (C16) | Slot No. "20"→"22": (C22) |

TABLE 4-continued

| | | Flyer | |
| --- | --- | --- | --- |
| | | A Flyer | B Flyer |
| 39 | Segment | S9: (Latched) | S21: (Latched) |
| 40 | Slot | Slot No. "10"→"8": (C16) | Slot No. "22"→"20": (C22) |
| 41 | Slot | Slot No. "4"→"6": (C14) | Slot No. "16"→"18": (C20) |
| 42 | Slot | Slot No. "24"→"2": (C24) | Slot No. "12"→"14": (C18) |
| 43 | Slot | Slot No. "20"→"22": (C22) | Slot No. "8"→"10": (C16) |
| 44 | Slot | Slot No. "24": (To commutator side) | Slot No. "12": (To commutator side) |
| 45 | Segment | S24: (Latched) | S12: (Latched) |
| 46 | ... | Disconnection | Disconnection |

In the third embodiment, as is obvious from the process table illustrated in Table 4 and the winding explanatory views illustrated in FIGS. 16 to 19, this is a method of winding one of the winding wires and another of the winding wires arranged at positions faced with each other at 180° at the same time, and the double-flyer winding machine (A flyer and B flyer) same as above is used.

Winding-wire Winding Process 1 (Segment: S1, S13)

As illustrated in FIG. 16A, the A flyer hooks the start end portion of the first conductor W1 by the riser R of the first segment S1.

On the other hand, as illustrated in FIG. 16B, the B flyer hooks the start end portion of the second conductor W2 by the riser R of the thirteenth segment S13.

Winding-wire Winding Process 2 (Slot: First Winding Wire C1, Seventh Winding Wire C7)

As illustrated in FIG. 16A, the A flyer pulls out the first conductor W1 hooked by the riser R of the first segment S1 to the slot SL with the closest slot number "1". Then, the A flyer winds the winding wire for the first winding wire C1 in the forward winding direction around the inner winding portion T1c of the first tooth T1 with the pulled out first conductor W1 between the slots SL with the slot numbers "1" and "3".

That is, the number of turns of the first conductor W1 by the A flyer around the inner winding portion T1c of this first tooth T1 is a half of the number of turns of the first winding wire C1 to be wound around the inner winding portion T1c. By winding the remaining half of the number of turns with the second conductor W2 by the B flyer in the forward winding direction in the subsequent process (winding-wire winding process 7), the first winding wire C1 in the forward winding direction around the inner winding portion T1c is completed.

On the other hand, as illustrated in FIG. 16B, the B flyer pulls out the second conductor W2 hooked by the riser R of the thirteenth segment S13 to the closest slot SL with the slot number "13". Then, the B flyer winds a winding wire for the seventh winding wire C7 in the forward winding direction around the inner winding portion T7c of the seventh tooth T7 with the pulled out second conductor W2 between the slots SL with the slot numbers "13" and "15".

That is, the number of turns of the second conductor W2 by the B flyer around the inner winding portion T7c of this seventh tooth T7 is a half of the number of turns of the seventh winding wire C7 to be wound around the inner winding portion T7c. By winding the remaining half of the number of turns with the first conductor W1 by the A flyer in the subsequent process (winding-wire winding process 7) in the forward winding direction, the seventh winding wire C7 in the forward winding direction around the inner winding portion T7c is completed.

Winding-wire Winding Process 3 (Slot: Third Winding Wire C3, Ninth Winding Wire C9)

As illustrated in FIG. 16A, the A flyer pulls out the first conductor W1 having wound only by a half of the number of turns of the first winding wire C1 around the inner winding portion T1c to the commutator side from the slot SL with the slot number "3". Subsequently, the A flyer routes the first conductor W1 having been pulled out to the commutator side to the slot SL with the slot number "7" in the clockwise direction. Then, the A flyer winds a winding wire for the third winding wire C3 in the reverse winding direction around the inner winding portion T3c of the third tooth T3 with the routed first conductor W1 between the slots SL with the slot numbers "7" and "5".

That is, the number of turns of the first conductor W1 by the A flyer around the inner winding portion T3c of this third tooth T3 is a half of the number of turns of the third winding wire C3 to be wound around the inner winding portion T3c. By winding the remaining half of the number of turns with the second conductor W2 by the B flyer in the reverse winding direction in the subsequent process (winding-wire winding process 8), the third winding wire C3 in the reverse winding direction around the inner winding portion T3c is completed.

On the other hand, as illustrated in FIG. 16B, the B flyer pulls out the second conductor W2 having been wound by a half of the number of turns of the seventh winding wire C7 around the inner winding portion T7c to the commutator side from the slot SL with the slot number "15". Subsequently, the B flyer routes the second conductor W2 having been pulled out to the commutator side to the slot SL with the slot number "19" in the clockwise direction. Then, the B flyer winds the winding wire for the ninth winding wire C9 in the reverse winding direction around the inner winding portion T9c of the ninth tooth T9 with the routed second conductor W2 between the slots SL with the slot numbers "19" and "17".

That is, the number of turns of the second conductor W2 by the B flyer around the inner winding portion T9c of this ninth tooth T9 is a half of the number of turns of the ninth winding wire C9 to be wound around the inner winding portion T9c. By winding the remaining half of the number of turns with the first conductor W1 by the A flyer in the reverse winding direction in the subsequent process (winding-wire winding process 8), the ninth winding wire C9 in the reverse winding direction around the inner winding portion T9c is completed.

Winding-wire Winding Process 4 (Slot: Fifth Winding Wire C5, Eleventh Winding Wire C11)

As illustrated in FIG. 16A, the A flyer pulls out the first conductor W1 having wound only by a half of the number of turns of the third winding wire C3 around the inner winding portion T3c to the side opposite to the commutator from the slot SL with the slot number "7". Subsequently, the A flyer routes the first conductor W1 having been pulled out to the side opposite to the commutator to the slot SL with the slot number "11" in the clockwise direction. Then, the A flyer winds a winding wire for the fifth winding wire C5 in the forward winding direction around the inner winding portion T5c of the fifth tooth T5 with the routed first conductor W1 between the slots SL with the slot numbers "11" and "9".

That is, the number of turns of the first conductor W1 by the A flyer around the inner winding portion T5c of this fifth tooth T5 is a half of the number of turns of the fifth winding wire C5 to be wound around the inner winding portion T5c. By winding the remaining half of the number of turns with the second conductor W2 by the B flyer in the forward winding direction in the subsequent process (winding-wire winding process 9), the fifth winding wire C5 in the forward winding direction around the inner winding portion T5c is completed.

On the other hand, as illustrated in FIG. 16B, the B flyer pulls out the second conductor W2 having been wound by a half of the number of turns of the ninth winding wire C9 around the inner winding portion T9c to the side opposite to the commutator from the slot SL with the slot number "19". Subsequently, the B flyer routes the second conductor W2 having been pulled out to the side opposite to the commutator to the slot SL with the slot number "23" in the clockwise direction. Then, the B flyer winds the winding wire for the eleventh winding wire C11 in the forward winding direction around the inner winding portion T11c of the eleventh tooth T11 with the routed second conductor W2 between the slots SL with the slot numbers "23" and "21".

That is, the number of turns of the second conductor W2 by the B flyer around the inner winding portion T11c of this eleventh tooth T11 is a half of the number of turns of the eleventh winding wire C11 to be wound around the inner winding portion T11c. By winding the remaining half of the number of turns with the first conductor W1 by the A flyer in the forward winding direction in the subsequent process (winding-wire winding process 9), the eleventh winding wire C11 in the forward winding direction around the inner winding portion T11c is completed.

Winding-wire Winding Process 5 (Segment: S10, S22)

As illustrated in FIG. 16A, the A flyer pulls out the first conductor W1 having wound only by a half of the number of turns of the fifth winding wire C5 around the inner winding portion T5c to the closest tenth segment S10 from the slot SL with the slot number "11" and hooks it on the riser R of the tenth segment S10.

On the other hand, as illustrated in FIG. 16B, the B flyer pulls out the second conductor W2 having been wound by a half of the number of turns of the eleventh winding wire C11 around the inner winding portion T11c to the closest twenty-second segment S22 from the slot SL with the slot number "23" and hooks it on the riser R of the twenty-second segment S22.

Winding-wire Winding Process 6 (Slot: Slot Number "11", Slot Number "23")

As illustrated in FIG. 16A, the A flyer pulls out the first conductor W1 hooked on the riser R of the tenth segment S10 to the side opposite to the commutator through the slot SL with the slot number "11" from the commutator side.

On the other hand, as illustrated in FIG. 16B, the B flyer pulls out the second conductor W2 having been hooked on the riser R of the twenty-second segment S22 from the commutator side to the side opposite to the commutator through the slot SL with the slot number "23".

Winding-wire Winding Process 7 (Slot: Seventh Winding Wire C7, First Winding Wire C1)

As illustrated in FIG. 16A, the A flyer routes the first conductor W1 having been pulled out to the side opposite to the commutator from the slot SL with the slot number "11" to the slot SL with the slot number "15" in the clockwise direction. Then, the A flyer winds a winding wire for the seventh winding wire C7 in the forward winding direction around the inner winding portion T7c of the seventh tooth T7 with the routed first conductor W1 between the slots SL with the slot numbers "15" and "13".

Here, the number of turns of the first conductor W1 by the A flyer around the inner winding portion T7c of this seventh tooth T7 is a half of the number of turns of the seventh winding wire C7 to be wound around the inner winding portion T7c. That is, in the preceding winding-wire winding process 2, the B flyer has wound the half in the forward winding direction with the second conductor W2. Thus, by winding the remaining half of the winding turns around the inner winding portion T7c in the forward winding direction at this point of time, the seventh winding wire C7 is completed.

On the other hand, as illustrated in FIG. 16B, the B flyer routes the second conductor W2 having been pulled out to the side opposite to the commutator from the slot SL with the slot number "23" to the slot SL with the slot number "3" in the clockwise direction. Then, the B flyer winds a winding wire for the first winding wire C1 in the forward winding direction around the inner winding portion T1c of the first tooth T1 with the routed second conductor W2 between the slots SL with the slot numbers "3" and "1".

Here, the number of turns of the second conductor W2 by the B flyer around the inner winding portion T1c of this first tooth T1 is a half of the number of turns of the first winding wire C1 to be wound around the inner winding portion T1c. That is, in the preceding winding-wire winding process 2, the A flyer has wound the half in the forward winding direction with the first conductor W1. Thus, by winding the remaining half of the winding turns around the inner winding portion T1c in the forward winding direction at this point of time, the first winding wire C1 is completed.

Winding-wire Winding Process 8 (Slot: Ninth Winding Wire C9, Third Winding Wire C3)

As illustrated in FIG. 16A, the A flyer pulls out the first conductor W1 having wound the seventh winding wire C7 to the commutator side from the slot SL with the slot number "15". Subsequently, the A flyer routes the first conductor W1 having been pulled out to the commutator side to the slot SL with the slot number "19" in the clockwise direction. Then, the A flyer winds a winding wire for the ninth winding wire C9 in the reverse winding direction around the inner winding portion T9c of the ninth tooth T9 with the routed first conductor W1 between the slots SL with the slot numbers "19" and "17".

Here, the number of turns of the first conductor W1 by the A flyer around the inner winding portion T9c of this ninth tooth T9 is a half of the number of turns of the ninth winding wire C9 to be wound around the inner winding portion T9c. That is, in the preceding winding-wire winding process 3, the B flyer has wound the half in the reverse winding direction with the second conductor W2. Thus, by winding the remaining half of the winding turns around the inner winding portion T9c in the reverse winding direction at this point of time, the ninth winding wire C9 is completed.

On the other hand, as illustrated in FIG. 16B, the B flyer pulls out the second conductor W2 having wound the first winding wire C1 to the commutator side from the slot SL with the slot number "3". Subsequently, the B flyer routes the second conductor W2 having been pulled out to the commutator side to the slot SL with the slot number "7" in the clockwise direction. Then, the B flyer winds a winding wire for the third winding wire C3 in the reverse winding direction around the inner winding portion T3c of the third tooth T3 with the routed second conductor W2 between the slots SL with the slot numbers "7" and "5".

Here, the number of turns of the second conductor W2 by the B flyer around the inner winding portion T3c of this third tooth T3 is a half of the number of turns of the third winding wire C3 to be wound around the inner winding portion T3c. That is, in the preceding winding-wire winding process 3, the A flyer has wound the half in the reverse winding direction with the first conductor W1. Thus, by winding the remaining half of the winding turns around the inner winding portion T3c in the reverse winding direction at this point of time, the third winding wire C3 is completed.

Winding-wire Winding Process 9 (Slot: Eleventh Winding Wire C11, Fifth Winding Wire C5)

As illustrated in FIG. 16A, the A flyer pulls out the first conductor W1 having wound the ninth winding wire C9 to the side opposite to the commutator from the slot SL with the slot number "19". Subsequently, the A flyer routes the first conductor W1 having been pulled out to the side opposite to the commutator to the slot SL with the slot number "23" in the clockwise direction. Then, the A flyer winds a winding wire for the eleventh winding wire C11 in the forward winding direction around the inner winding portion T11c of the eleventh tooth T11 with the routed first conductor W1 between the slots SL with the slot numbers "23" and "21".

Here, the number of turns of the first conductor W1 by the A flyer around the inner winding portion T11c of this eleventh tooth T11 is a half of the number of turns of the eleventh winding wire C11 to be wound around the inner winding portion T11c. That is, in the preceding winding-wire winding process 4, the B flyer has wound the half in the forward winding direction with the second conductor W2. Thus, by winding the remaining half of the winding turns around the inner winding portion T11c in the forward winding direction at this point of time, the eleventh winding wire C11 is completed.

On the other hand, as illustrated in FIG. 16B, the B flyer pulls out the second conductor W2 having wound the third winding wire C3 to the side opposite to the commutator from the slot SL with the slot number "7". Subsequently, the B flyer routes the second conductor W2 having been pulled out to the side opposite to the commutator to the slot SL with the slot number "11" in the clockwise direction. Then, the B flyer winds a winding wire for the fifth winding wire C5 in the forward winding direction around the inner winding portion T5c of the fifth tooth T5 with the routed second conductor W2 between the slots SL with the slot numbers "11" and "9".

Here, the number of turns of the second conductor W2 by the B flyer around the inner winding portion T5c of this fifth tooth T5 is a half of the number of turns of the fifth winding wire C5 to be wound around the inner winding portion T5c. That is, in the preceding winding-wire winding process 4, the A flyer has wound the half in the forward winding direction with the first conductor W1. Thus, by winding the remaining half of the winding turns around the inner winding portion T5c in the forward winding direction at this point of time, the fifth winding wire C5 is completed.

Winding-wire Winding Process 10 (Slot: Slot Number "17", Slot Number "5")

As illustrated in FIG. 16A, the A flyer pulls out the first conductor W1 having wound the eleventh winding wire C11 to the side opposite to the commutator from the slot SL with the slot number "21" and routes the pulled-out first conductor W1 to the slot SL with the slot number "17" in the counterclockwise direction. Subsequently, the A flyer pulls out the first conductor W1 having been routed in the counterclockwise direction from the side opposite to the commutator to the commutator side through the slot SL with the slot number "17".

On the other hand, as illustrated in FIG. 16B, the B flyer pulls out the second conductor W2 having wound the fifth winding wire C5 to the side opposite to the commutator from the slot SL with the slot number "9" and routes the pulled-out second conductor W2 to the slot SL with the slot number "5" in the counterclockwise direction. Subsequently, the A flyer pulls out the second conductor W2 having been routed in the counterclockwise direction from the side opposite to the commutator to the commutator side through the slot SL with the slot number "5".

Winding-wire Winding Process 11 (Segment: S17, S5)

As illustrated in FIG. 16A, the A flyer pulls out the first conductor W1 having been pulled out to the commutator side through the slot SL with the slot number "17" to the closest seventeenth segment S17 and hooks it on the riser R of the seventeenth segment S17.

On the other hand, as illustrated in FIG. 16B, the B flyer pulls out the second conductor W2 having been pulled out to the commutator side through the slot SL with the slot number "5" to the closest fifth segment S5 and hooks it on the riser R of the fifth segment S5.

Winding-wire Winding Process 12 (Disconnection)

The A flyer cuts off (disconnects) the first conductor W1 hooked by the riser R of the seventeenth segment S17.

The B flyer cuts off (disconnects) the second conductor W2 hooked by the riser R of the fifth segment S5.

Winding-wire Winding Process 13 (Segment: S15, S3)

As illustrated in FIG. 17A, the A flyer newly hooks the cut first conductor W1 on the riser R of the fifteenth segment S15.

On the other hand, as illustrated in FIG. 17B, the B flyer newly hooks the cut second conductor W2 on the riser R of the third segment S3.

Winding-wire Winding Process 14 (Slot: Eighth Winding Wire C8, Second Winding Wire C2)

As illustrated in FIG. 17A, the A flyer pulls out the first conductor W1 hooked by the riser R of the fifteenth segment S15 to the closest slot SL with the slot number "15". Then, the A flyer winds a winding wire for the eighth winding wire C8 in the forward winding direction around the inner winding portion T8c of the eighth tooth T8 with the pulled-out first conductor W1 between the slots SL with the slot numbers "15" and "17".

That is, the number of turns of the first conductor W1 by the A flyer around the inner winding portion T8c of this eighth tooth T8 is a half of the number of turns of the eighth winding wire C8 to be wound around the inner winding portion T8c. Then, by winding the remaining half of the winding turns with the second conductor W2 by the B flyer in the forward winding direction in the subsequent process (winding-wire winding process 19), the eighth winding wire C8 in the forward winding direction around the inner winding portion T8c is completed.

On the other hand, as illustrated in FIG. 17B, the B flyer pulls out the second conductor W2 hooked by the riser R of the third segment S3 to the closest slot SL with the slot number "3". Then, the B flyer winds a winding wire for the second winding wire C2 in the forward winding direction around the inner winding portion T2c of the second tooth T2 with the pulled-out second conductor W2 between the slots SL with the slot numbers "3" and "5".

That is, the number of turns of the second conductor W2 by the B flyer around the inner winding portion T2c of this second tooth T2 is a half of the number of turns of the second winding wire C2 to be wound around the inner winding portion T2c. Then, by winding the remaining half of the winding turns by the A flyer with the first conductor W1 in the forward winding direction in the subsequent process (winding-wire winding process 19), the second winding wire C2 in the forward winding direction around the inner winding portion T2c is completed.

Winding-wire Winding Process 15 (Slot: Sixth Winding Wire C6, Twelfth Winding Wire C12)

As illustrated in FIG. 17A, the A flyer pulls out the first conductor W1 having wound the eighth winding wire C8 around the inner winding portion T8c only by a half of the number of turns to the side opposite to the commutator from the slot SL with the slot number "15". Subsequently, the A flyer routes the first conductor W1 having been pulled out to the side opposite to the commutator to the slot SL with the slot number "11" in the counterclockwise direction. Then, the A flyer winds a winding wire for the sixth winding wire C6 in the reverse winding direction around the inner winding portion T6c of the sixth tooth T6 with the routed first conductor W1 between the slots SL with the slot numbers "11" and "13".

That is, the number of turns of the first conductor W1 by the A flyer around the inner winding portion T6c of this sixth tooth T6 is a half of the number of turns of the sixth winding wire C6 to be wound around the inner winding portion T6c. Then, by winding the remaining half of the winding turns by the B flyer with the second conductor W2 in the reverse winding direction in the subsequent process (winding-wire winding process 20), the sixth winding wire C6 in the reverse winding direction around the inner winding portion T6c is completed.

On the other hand, as illustrated in FIG. 17B, the B flyer pulls out the second conductor W2 having wound the second winding wire C2 around the inner winding portion T2c only by a half of the number of turns to the side opposite to the commutator from the slot SL with the slot number "3". Subsequently, the B flyer routes the second conductor W2 having been pulled out to the side opposite to the commutator to the slot SL with the slot number "23" in the counterclockwise direction. Then, the B flyer winds a winding wire for the twelfth winding wire C12 in the reverse winding direction around the inner winding portion T12c of the twelfth tooth T12 with the routed second conductor W2 between the slots SL with the slot numbers "23" and "1".

That is, the number of turns of the second conductor W2 by the B flyer around the inner winding portion T12c of this twelfth tooth T12 is a half of the number of turns of the twelfth winding wire C12 to be wound around the inner winding portion T12c. Then, by winding the remaining half of the winding turns by the A flyer with the first conductor W1 in the reverse winding direction in the subsequent process (winding-wire winding process 20), the twelfth winding wire C12 in the reverse winding direction around the inner winding portion T12c is completed.

Winding-wire Winding Process 16 (Slot: Fourth Winding Wire C4, Tenth Winding Wire C10)

As illustrated in FIG. 17A, the A flyer pulls out the first conductor W1 having wound the sixth winding wire C6 around the inner winding portion T6c only by a half of the number of turns to the commutator side from the slot SL with the slot number "11". Subsequently, the A flyer routes the first conductor W1 having been pulled out to the commutator side to the slot SL with the slot number "7" in the counterclockwise direction. Then, the A flyer winds a winding wire for the fourth winding wire C4 in the forward winding direction around the inner winding portion T4c of the fourth tooth T4 with the routed first conductor W1 between the slots SL with the slot numbers "7" and "9".

That is, the number of turns of the first conductor W1 by the A flyer around the inner winding portion T4c of this fourth tooth T4 is a half of the number of turns of the fourth winding wire C4 to be wound around the inner winding portion T4c. Then, by winding the remaining half of the winding turns by the B flyer with the second conductor W2 in the forward winding direction in the subsequent process (winding-wire winding process 21), the fourth winding wire C4 in the forward winding direction around the inner winding portion T4c is completed.

On the other hand, as illustrated in FIG. 17B, the B flyer pulls out the second conductor W2 having wound the twelfth winding wire C12 around the inner winding portion T12c only by a half of the number of turns to the commutator side from the slot SL with the slot number "23". Subsequently, the B flyer routes the second conductor W2 having been pulled out to the commutator side to the slot SL with the slot number "19" in the counterclockwise direction. Then, the B flyer winds a winding wire for the tenth winding wire C10 in the forward winding direction around the inner winding portion T10c of the tenth tooth T10 with the routed second conductor W2 between the slots SL with the slot numbers "19" and "21".

That is, the number of turns of the second conductor W2 by the B flyer around the inner winding portion T10c of this tenth tooth T10 is a half of the number of turns of the tenth winding wire C10 to be wound around the inner winding portion T10c. Then, by winding the remaining half of the winding turns by the A flyer with the first conductor W1 in the forward winding direction in the subsequent process (winding-wire winding process 21), the tenth winding wire C10 in the forward winding direction around the inner winding portion T10c is completed.

Winding-wire Winding Process 17 (Segment: S8, S20)

As illustrated in FIG. 17A, the A flyer pulls out the first conductor W1 having wound the fourth winding wire C4 around the inner winding portion T4c only by a half of the number of turns from the slot SL with the slot number "9" to the closest eighth segment S8 and hooks it on the riser R of the eighth segment S8.

On the other hand, as illustrated in FIG. 17B, the B flyer pulls out the second conductor W2 having wound the tenth winding wire C10 around the inner winding portion T10c only by a half of the number of turns from the slot SL with the slot number "21" to the closest twentieth segment S20 and hooks it on the riser R of the twentieth segment S20.

Winding-wire Winding Process 18 (Slot: Fourth Winding Wire C4, Tenth Winding Wire C10)

As illustrated in FIG. 17A, the A flyer pulls out the first conductor W1 hooked and hooked on the riser R of the eighth segment S8 to the closest slot SL with the slot number "9". Then, the A flyer winds the pulled-out first conductor W1 only by one turn around the inner winding portion T4c of the fourth tooth T4 in the reverse winding direction between the slots SL with the slot numbers "9" and "7" and pulls out the first conductor W1 to the commutator side from the slot SL with the slot number "7".

On the other hand, as illustrated in FIG. 17B, the B flyer pulls out the second conductor W2 hooked and hooked on the riser R of the twentieth segment S20 to the closest slot SL with the slot number "21". Then, the B flyer winds the pulled-out second conductor W2 only by one turn around the inner winding portion T10c of the tenth tooth T10 in the reverse winding direction between the slots SL with the slot numbers "21" and "19" and pulls out the second conductor W2 to the commutator side from the slot SL with the slot number "19".

Winding-wire Winding Process 19 (Slot: Second Winding Wire C2, Eighth Winding Wire C8)

As illustrated in FIG. 17A, the A flyer routes the first conductor W1 having been pulled out to the commutator side from the slot SL with the slot number "7" to the slot SL with the slot number "3" in the counterclockwise direction. Then, the A flyer winds a winding wire for the second winding wire C2 in the forward winding direction around the inner winding portion T2c of the second tooth T2 with the routed first conductor W1 between the slots SL with the slot numbers "3" and "5".

Here, the number of turns of the first conductor W1 by the A flyer around the inner winding portion T2c of this second tooth T2 is a half of the number of turns of the second winding wire C2 to be wound around the inner winding portion T2c. That is, in the preceding winding-wire winding process 14, the B flyer has wound the half in the forward winding direction with the second conductor W2. Thus, by winding the remaining half of the winding turns around the inner winding portion T2c in the forward winding direction at this point of time, the second winding wire C2 is completed.

On the other hand, as illustrated in FIG. 17B, the B flyer routes the second conductor W2 having been pulled out to the commutator side from the slot SL with the slot number "19" to the slot SL with the slot number "15" in the counterclockwise direction. Then, the B flyer winds a winding wire for the eighth winding wire C8 in the forward winding direction around the inner winding portion T8c of the eighth tooth T8 with the routed second conductor W2 between the slots SL with the slot numbers "15" and "17".

Here, the number of turns of the second conductor W2 by the B flyer around the inner winding portion T8c of this eighth tooth T8 is a half of the number of turns of the eighth winding wire C8 to be wound around the inner winding portion T8c. That is, in the preceding winding-wire winding process 14, the A flyer has wound the half in the forward winding direction with the first conductor W1. Thus, by winding the remaining half of the winding turns around the inner winding portion T8c in the forward winding direction at this point of time, the eighth winding wire C8 is completed.

Winding-wire Winding Process 20 (Slot: Twelfth Winding Wire C12, Sixth Winding Wire C6)

As illustrated in FIG. 17A, the A flyer pulls out the first conductor W1 having wound the second winding wire C2 to the side opposite to the commutator from the slot SL with the slot number "3". Subsequently, the A flyer routes the first conductor W1 having been pulled out to the side opposite to the commutator to the slot SL with the slot number "23" in the counterclockwise direction. Then, the A flyer winds a winding wire for the twelfth winding wire C12 in the reverse winding direction around the inner winding portion T12c of the twelfth tooth T12 with the routed first conductor W1 between the slots SL with the slot numbers "23" and "1".

Here, the number of turns of the first conductor W1 by the A flyer around the inner winding portion T12c of this twelfth tooth T12 is a half of the number of turns of the twelfth winding wire C12 to be wound around the inner winding portion T12c. That is, in the preceding winding-wire winding process 15, the B flyer has wound the half in the reverse winding direction with the second conductor W2. Thus, by winding the remaining half of the winding turns around the inner winding portion T12c in the reverse winding direction at this point of time, the twelfth winding wire C12 is completed.

On the other hand, as illustrated in FIG. 17B, the B flyer pulls out the second conductor W2 having wound the eighth winding wire C8 to the side opposite to the commutator from the slot SL with the slot number "15". Subsequently, the B flyer routes the second conductor W2 having been pulled out to the side opposite to the commutator to the slot SL with the slot number "11" in the counterclockwise direction. Then, the B flyer winds a winding wire for the sixth winding wire C6 in the reverse winding direction around the inner winding portion T6c of the sixth tooth T6 with the routed second conductor W2 between the slots SL with the slot numbers "11" and "13".

Here, the number of turns of the second conductor W2 by the B flyer around the inner winding portion T6c of this sixth tooth T6 is a half of the number of turns of the sixth winding wire C6 to be wound around the inner winding portion T6c. That is, in the preceding winding-wire winding process 15, the A flyer has wound the half in the reverse winding direction with the first conductor W1. Thus, by winding the remaining half of the winding turns around the inner winding portion T6c in the reverse winding direction at this point of time, the sixth winding wire C6 is completed.

Winding-wire Winding Process 21 (Slot: Tenth Winding Wire C10, Fourth Winding Wire C4)

As illustrated in FIG. 17A, the A flyer pulls out the first conductor W1 having wound the twelfth winding wire C12 to the commutator side from the slot SL with the slot number "23". Subsequently, the A flyer routes the first conductor W1 having been pulled out to the commutator side to the slot SL with the slot number "19" in the counterclockwise direction. Then, the A flyer winds a winding wire for the tenth winding wire C10 in the forward winding direction around the inner winding portion T10c of the tenth tooth T10 with the routed first conductor W1 between the slots SL with the slot numbers "19" and "21".

Here, the number of turns of the first conductor W1 by the A flyer around the inner winding portion T10c of this tenth tooth T10 is a half of the number of turns of the tenth winding wire C10 to be wound around the inner winding portion T10c. That is, in the preceding winding-wire winding process 16, the B flyer has wound the half in the forward winding direction with the second conductor W2. Thus, by winding the remaining half of the winding turns around the inner winding portion T10c in the forward winding direction at this point of time, the tenth winding wire C10 is completed.

On the other hand, as illustrated in FIG. 17B, the B flyer pulls out the second conductor W2 having wound the sixth winding wire C6 to the commutator side from the slot SL with the slot number "11". Subsequently, the B flyer routes the second conductor W2 having been pulled out to the commutator side to the slot SL with the slot number "7" in the counterclockwise direction. Then, the B flyer winds a winding wire for the fourth winding wire C4 in the forward winding direction around the inner winding portion T4c of the fourth tooth T4 with the routed second conductor W2 between the slots SL with the slot numbers "7" and "9".

Here, the number of turns of the second conductor W2 by the B flyer around the inner winding portion T4c of this fourth tooth T4 is a half of the number of turns of the fourth winding wire C4 to be wound around the inner winding portion T4c. That is, in the preceding winding-wire winding process 16, the A flyer has wound the half in the forward winding direction with the first conductor W1. Thus, by winding the remaining half of the winding turns around the inner winding portion T4c in the forward winding direction at this point of time, the fourth winding wire C4 is wound.

Winding-wire Winding Process 22 (Slot: Slot Number "23", Slot Number "11")

As illustrated in FIG. 17A, the A flyer pulls out the first conductor W1 having wound the tenth winding wire C10 to the side opposite to the commutator from the slot SL with the slot number "19" and routes the pulled-out first conductor W1 to the slot SL with the slot number "23" in the clockwise direction. Subsequently, the A flyer pulls out the first conductor W1 having been routed in the clockwise direction from the side opposite to the commutator to the commutator side through the slot SL with the slot number "23".

On the other hand, as illustrated in FIG. 17B, the B flyer pulls out the second conductor W2 having wound the fourth winding wire C4 to the side opposite to the commutator from the slot SL with the slot number "7" and routes the pulled-out second conductor W2 to the slot SL with the slot number "11" in the clockwise direction. Subsequently, the A flyer pulls out the second conductor W2 having been routed in the clockwise direction from the side opposite to the commutator to the commutator side through the slot SL with the slot number "11".

Winding-wire Winding Process 23 (Segment: S23, S11)

As illustrated in FIG. 17A, the A flyer pulls out the first conductor W1 having been pulled out to the commutator side through the slot SL with the slot number "23" to the closest twenty-third segment S23 and hooks it on the riser R of the twenty-third segment S23.

On the other hand, as illustrated in FIG. 17B, the B flyer pulls out the second conductor W2 having been pulled out to the commutator side through the slot SL with the slot number "11" to the closest eleventh segment S11 and hooks it on the riser R of the eleventh segment S11.

At this time, the first to twelfth winding wires C1 to C12 in the concentrated winding are wound by the A flyer and the B flyer around all the 12 inner winding portions T1c to T12c, respectively. Then, the thirteenth to twenty-fourth winding wires C13 to C24 in the distributed winding are wound in the subsequent processes.

Winding-wire Winding Process 24 (Slot: Twenty-third Winding Wire C23, Seventeenth Winding Wire C17)

As illustrated in FIG. 18A, the A flyer pulls out the first conductor W1 hooked on the riser R of the twenty-third segment S23 to the closest slot SL with the slot number "24". Then, the A flyer winds a winding wire for the twenty-third winding wire C23 in the reverse winding direction with the pulled-out first conductor W1 between the slots SL with the slot numbers "24" and "22", that is, between the second branch portion T12b of the twelfth tooth T12 and the first branch portion T11a of the eleventh tooth T11.

That is, the number of turns of the first conductor W1 by the A flyer between the second branch portion T12b and the first branch portion T11a is a half of the number of turns of the twenty-third winding wire C23 to be wound between the second branch portion T12b and the first branch portion T11a. Then, by winding the remaining half of the winding turns by the B flyer with the second conductor W2 in the reverse winding direction in the subsequent process (winding-wire winding process 29), the twenty-third winding wire C23 in the reverse winding direction is completed between the second branch portion T12b and the first branch portion T11a.

On the other hand, as illustrated in FIG. 18B, the B flyer pulls out the second conductor W2 hooked on the riser R of the eleventh segment S11 to the closest slot SL with the slot number "12". Then, the B flyer winds a winding wire for the seventeenth winding wire C17 in the reverse winding direction with the pulled-out second conductor W2 between the slots SL with the slot numbers "12" and "10", that is, between the second branch portion T6b of the sixth tooth T6 and the first branch portion T5a of the fifth tooth T5.

That is, the number of turns of the second conductor W2 by the B flyer between the second branch portion T6b and the first branch portion T5a is a half of the number of turns of the seventeenth winding wire C17 to be wound between the second branch portion T6b and the first branch portion T5a. Then, by winding the remaining half of the winding turns by the A flyer with the first conductor W1 in the reverse winding direction in the subsequent process (winding-wire winding process 29), the seventeenth winding wire C17 in the reverse winding direction is completed between the second branch portion T6b and the first branch portion T5a.

Winding-wire Winding Process 25 (Slot: Twenty-first Wire C21, Fifteenth Winding Wire C15)

As illustrated in FIG. 18A, the A flyer pulls out the first conductor W1 wound between the second branch portion T12b and the first branch portion T11a only by a half of the number of turns of the twenty-third winding wire C23 to the commutator side from the slot SL with the slot number "22". Subsequently, the A flyer routes the first conductor W1 having been pulled out to the commutator side to the slot SL with the slot number "18" in the counterclockwise direction. Then, the A flyer winds a winding wire for the twenty-first winding wire C21 in the forward winding direction between the slots SL with the slot numbers "18" and "20", that is, between the first branch portion T9a of the ninth tooth T9 and the second branch portion T10b of the tenth tooth T10 with the routed first conductor W1.

That is, the number of turns of the first conductor W1 by the A flyer between the first branch portion T9a and the second branch portion T10b is a half of the number of turns of the twenty-first winding wire C21 to be wound between the first branch portion T9a and the second branch portion T10b. Then, by winding the remaining half of the winding turns by the B flyer with the second conductor W2 in the forward winding direction in the subsequent process (winding-wire winding process 30), the twenty-first winding wire C21 in the forward winding direction is completed between the first branch portion T9a and the second branch portion T10b.

On the other hand, as illustrated in FIG. 18B, the B flyer pulls out the second conductor W2 having been wound between the second branch portion T6a and the first branch portion T5b only by a half of the number of turns of the seventeenth winding wire C17 to the commutator side from the slot SL with the slot number "10".

Subsequently, the B flyer routes the second conductor W2 having been pulled out to the commutator side to the slot SL with the slot number "6" in the counterclockwise direction. Then, the B flyer winds a winding wire for the fifteenth winding wire C15 in the forward winding direction with the routed second conductor W2 between the slots SL with the slot numbers "6" and "8", that is, between the first branch portion T3a of the third tooth T3 and the second branch portion T4b of the fourth tooth T4.

That is, the number of turns of the second conductor W2 by the B flyer between the first branch portion T3a and the second branch portion T4b is a half of the number of turns of the fifteenth winding wire C15 to be wound between the first branch portion T3a and the second branch portion T4b. Then, by winding the remaining half of the winding turns by the A flyer with the first conductor W1 in the forward winding direction in the subsequent process (winding-wire winding process 30), the fifteenth winding wire C15 in the forward winding direction is completed between the first branch portion T3a and the second branch portion T4b.

Winding-wire Winding Process 26 (Slot: Nineteenth Winding Wire C19, Thirteenth Winding Wire C13)

As illustrated in FIG. 18A, the A flyer pulls out the first conductor W1 wound between the first branch portion T9a and the second branch portion T10b only by a half of the number of turns of the twenty-first winding wire C21 to the side opposite to the commutator from the slot SL with the slot number "18". Subsequently, the A flyer routes the first conductor W1 having been pulled out to the side opposite to the commutator to the slot SL with the slot number "14" in the counterclockwise direction. Then, the A flyer winds a winding wire for the nineteenth winding wire C19 in the reverse winding direction between the slots SL with the slot numbers "14" and "16", that is, between the first branch portion T7a of the seventh tooth T7 and the second branch portion T8b of the eighth tooth T8 with the routed first conductor W1.

That is, the number of turns of the first conductor W1 by the A flyer between the first branch portion T7a and the second branch portion T8b is a half of the number of turns of the nineteenth winding wire C19 to be wound between the first branch portion T7a and the second branch portion T8b. Then, by winding the remaining half of the winding turns by the B flyer with the second conductor W2 in the reverse winding direction in the subsequent process (winding-wire winding process 31), the nineteenth winding wire C19 in the reverse winding direction is completed between the first branch portion T7a and the second branch portion T8b.

On the other hand, as illustrated in FIG. 18B, the B flyer pulls out the second conductor W2 having been wound between the first branch portion T3a and the second branch portion T4b only by a half of the number of turns of the fifteenth winding wire C15 to the side opposite to the commutator from the slot SL with the slot number "6". Subsequently, the B flyer routes the second conductor W2 having been pulled out to the side opposite to the commutator to the slot SL with the slot number "2" in the counterclockwise direction. Then, the B flyer winds a winding wire for the thirteenth winding wire C13 in the reverse winding direction with the routed second conductor W2 between the slots SL with the slot numbers "2" and "4", that is, between the first branch portion T1a of the first tooth T1 and the second branch portion T2b of the second tooth T2.

That is, the number of turns of the second conductor W2 by the B flyer between the first branch portion T1a and the second branch portion T2b is a half of the number of turns of the thirteenth winding wire C13 to be wound between the first branch portion T1a and the second branch portion T2b. Then, by winding the remaining half of the winding turns by the A flyer with the first conductor W1 in the reverse winding direction in the subsequent process (winding-wire winding process 31), the thirteenth winding wire C13 in the reverse winding direction is completed between the first branch portion T1a and the second branch portion T2b.

Winding-wire Winding Process 27 (Segment: S14, S2)

As illustrated in FIG. 18A, the A flyer pulls out the first conductor W1 having wound between the first branch portion T7a and the second branch portion T8b to the commutator side through the slot SL with the slot number "14". Subsequently, the A flyer pulls out the first conductor W1 having been pulled out to the commutator side to the closest fourteenth segment S14 and hooks it on the riser R of the fourteenth segment S14.

On the other hand, as illustrated in FIG. 18B, the B flyer pulls out the second conductor W2 having wound between the first branch portion T1a and the second branch portion T2b to the commutator side through the slot SL with the slot number "2". Subsequently, the B flyer pulls out the second conductor W2 having been pulled out to the commutator side to the closest second segment S2 and hooks it on the riser R of the second segment S2.

Winding-wire Winding Process 28 (Slot: Slot Number "14", Slot Number "2")

As illustrated in FIG. 18A, the A flyer pulls out the first conductor W1 hooked on the riser R of the fourteenth segment S14 to the side opposite to the commutator from the closest slot SL with the slot number "14".

On the other hand, as illustrated in FIG. 18B, the B flyer pulls out the second conductor W2 hooked on the riser R of the second segment S2 to the side opposite to the commutator from the closest slot SL with the slot number "2".

Winding-wire Winding Process 29 (Slot: Seventeenth Winding Wire C17, Twenty-third Winding Wire C23)

As illustrated in FIG. 18A, the A flyer routes the first conductor W1 having been pulled out to the side opposite to the commutator from the slot SL with the slot number "14" to the slot SL with the slot number "10" in the counterclockwise direction. The A flyer winds a winding wire for the seventeenth winding wire C17 in the reverse winding direction between the slots SL with the slot numbers "10" and "12", that is, between the first branch portion T5a of the fifth tooth T5 and the second branch portion T6b of the sixth tooth T6 with the routed first conductor W1.

Here, the number of turns of the first conductor W1 by the A flyer between the first branch portion T5a and the second branch portion T6b is a half of the number of turns of the seventeenth winding wire C17 to be wound between the first branch portion T5a and the second branch portion T6b. That is, in the preceding winding-wire winding process 24, the B flyer has wound the half in the reverse winding direction with the second conductor W2. Thus, by winding the remaining half of the winding turns between the first branch portion T5a and the second branch portion T6b in the reverse winding direction at this point of time, the seventeenth winding wire C17 is completed.

On the other hand, as illustrated in FIG. 18B, the B flyer routes the second conductor W2 having been pulled out to the side opposite to the commutator from the slot SL with the slot number "2" to the slot SL with the slot number "22" in the counterclockwise direction. The B flyer winds a winding wire for the twenty-third winding wire C23 in the reverse winding direction between the slots SL with the slot numbers "22" and "24", that is, between the first branch portion T11a of the eleventh tooth T11 and the second branch portion T12b of the twelfth tooth T12 with the routed second conductor W2.

Here, the number of turns of the second conductor W2 by the B flyer between the first branch portion T11a and the second branch portion T12b is a half of the number of turns of the twenty-third winding wire C23 to be wound between the first branch portion T11a and the second branch portion T12b. That is, in the preceding winding-wire winding process 24, the A flyer has wound the half in the reverse winding direction with the first conductor W1. Thus, by winding the remaining half of the winding turns between the first branch portion T11a and the second branch portion T12b in the reverse winding direction at this point of time, the twenty-third winding wire C23 is completed.

Winding-wire Winding Process 30 (Slot: Fifteenth Winding Wire C15, Twenty-first Winding Wire C21)

As illustrated in FIG. 18A, the A flyer pulls out the first conductor W1 having wound the seventeenth winding wire C17 to the commutator side from the slot SL with the slot number "10". Subsequently, the A flyer routes the first conductor W1 having been pulled out to the commutator side from the slot SL with the slot number "10" in the counterclockwise direction to the slot SL with the slot number "6". The A flyer winds a winding wire for the fifteenth winding wire C15 in the forward winding direction between the slots SL with the slot numbers "6" and "8", that is, between the first branch portion T3a of the third tooth T3 and the second branch portion T4b of the fourth tooth T4 with the routed first conductor W1.

Here, the number of turns of the first conductor W1 by the A flyer between the first branch portion T3a and the second branch portion T4b is a half of the number of turns of the fifteenth winding wire C15 to be wound between the first branch portion T3a and the second branch portion T4b. That is, in the preceding winding-wire winding process 25, the B flyer has wound the half in the forward winding direction with the second conductor W2. Thus, by winding the remaining half of the winding turns between the first branch portion T3a and the second branch portion T4b in the forward winding direction at this point of time, the fifteenth winding wire C15 is completed.

On the other hand, as illustrated in FIG. 18B, the B flyer pulls out the second conductor W2 having wound the twenty-third winding wire C23 to the commutator side from the slot SL with the slot number "22". Subsequently, the B flyer routes the second conductor W2 having been pulled out to the commutator side from the slot SL with the slot number "22" in the counterclockwise direction to the slot SL with the slot number "18". The B flyer winds a winding wire for the twenty-first winding wire C21 in the forward winding direction between the slots SL with the slot numbers "18" and "20", that is, the first branch portion T9a of the ninth tooth T9 and the second branch portion T10b of the tenth tooth T10 with the routed second conductor W2.

Here, the number of turns of the second conductor W2 by the B flyer between the first branch portion T9a and the second branch portion T10b is a half of the number of turns of the twenty-first winding wire C21 to be wound between the first branch portion T9a and the second branch portion T10b. That is, in the preceding winding-wire winding process 25, the A flyer has wound the half in the forward winding direction with the first conductor W1. Thus, by winding the remaining half of the winding turns between the first branch portion T9a and the second branch portion T10b in the forward winding direction at this point of time, the twenty-first winding wire C21 is completed.

Winding-wire Winding Process 31 (Slot: Thirteenth Winding Wire C13, Nineteenth Winding Wire C19)

As illustrated in FIG. 18A, the A flyer pulls out the first conductor W1 having wound the fifteenth winding wire C15 to the side opposite to the commutator from the slot SL with the slot number "6". Subsequently, the A flyer routes the first conductor W1 having been pulled out to the side opposite to the commutator from the slot SL with the slot number "6" in the counterclockwise direction to the slot SL with the slot number "2". The A flyer winds a winding wire for the thirteenth winding wire C13 in the reverse winding direction between the slots SL with the slot numbers "2" and "4", that is, between the first branch portion T1a of the first tooth T1 and the second branch portion T2b of the second tooth T2 with the routed first conductor W1.

Here, the number of turns of the first conductor W1 by the A flyer between the first branch portion T1a and the second branch portion T2b is a half of the number of turns of the thirteenth winding wire C13 to be wound between the first branch portion T1a and the second branch portion T2b. That is, in the preceding winding-wire winding process 26, the B flyer has wound the half in the reverse winding direction with the second conductor W2. Thus, by winding the remaining half of the winding turns between the first branch portion T1a and the second branch portion T2b in the reverse winding direction at this point of time, the thirteenth winding wire C13 is completed.

On the other hand, as illustrated in FIG. 18B, the B flyer pulls out the second conductor W2 having wound the twenty-first winding wire C21 to the side opposite to the commutator from the slot SL with the slot number "18". Subsequently, the B flyer routes the second conductor W2 having been pulled out to the side opposite to the commutator from the slot SL with the slot number "18" in the counterclockwise direction to the slot SL with the slot number "14". The B flyer winds a winding wire for the nineteenth winding wire C19 in the reverse winding direction between the slots SL with the slot numbers "14" and "16", that is, between the first branch portion T7a of the seventh tooth T7 and the second branch portion T8b of the eighth tooth T8 with the routed second conductor W2.

Here, the number of turns of the second conductor W2 by the B flyer between the first branch portion T7a and the second branch portion T8b is a half of the number of turns of the nineteenth winding wire C19 to be wound between the first branch portion T7a and the second branch portion T8b. That is, in the preceding winding-wire winding process 26, the A flyer has wound the half in the reverse winding direction with the first conductor W1. Thus, by winding the remaining half of the winding turns between the first branch portion T7a and the second branch portion T8b in the reverse winding direction at this point of time, the nineteenth winding wire C19 is completed.

Winding-wire Winding Process 32 (Slot: Slot Number "8", Slot Number "20")

As illustrated in FIG. 18A, the A flyer pulls out the first conductor W1 having wound the thirteenth winding wire C13 to the side opposite to the commutator from the slot SL with the slot number "4" and routes the pulled-out first conductor W1 to the slot SL with the slot number "8" in the clockwise direction. Subsequently, the A flyer pulls out the first conductor W1 having been routed in the clockwise direction from the side opposite to the commutator through the slot SL with the slot number "8" to the commutator side.

On the other hand, as illustrated in FIG. 18B, the B flyer pulls out the second conductor W2 having wound the nineteenth winding wire C19 to the side opposite to the commutator from the slot SL with the slot number "16" and routes the pulled-out second conductor W2 to the slot SL with the slot number "20" in the clockwise direction. Subsequently, the A flyer pulls out the second conductor W2 having been routed in the clockwise direction from the side opposite to the commutator through the slot SL with the slot number "20" to the commutator side.

Winding-wire Winding Process 33 (Segment: S7, S19)

As illustrated in FIG. 18A, the A flyer pulls out the first conductor W1 having been pulled out to the commutator side through the slot SL with the slot number "8" to the closest seventh segment S7 and hooks it on the riser R of the seventh segment On the other hand, as illustrated in FIG. 18B, the B flyer pulls out the second conductor W2 having been pulled out to the commutator side through the slot SL with the slot number "20" to the closest nineteenth segment S19 and hooks it on the riser R of the nineteenth segment S19.

Winding-wire Winding Process 34 (Disconnection)

The A flyer cuts off (disconnects) the first conductor W1 hooked by the riser R of the seventh segment S7.

The B flyer cuts off (disconnects) the second conductor W2 hooked by the riser R of the nineteenth segment S19.

Winding-wire Winding Process 35 (Segment: S16, S4)

As illustrated in FIG. 19A, the A flyer newly hooks the cut first conductor W1 on the riser R of the sixteenth segment S16.

On the other hand, as illustrated in FIG. 19B, the B flyer newly hooks the cut second conductor W2 on the riser R of the fourth segment S4.

Winding-wire Winding Process 36 (Slot: Twentieth Winding Wire C20, Fourteenth Winding Wire C14)

As illustrated in FIG. 19A, the A flyer pulls out the first conductor W1 hooked by the riser R of the sixteenth segment S16 to the closest slot SL with the slot number "16". Then, the A flyer winds a winding wire for the twentieth winding wire C20 in the forward winding direction between the slots SL with the slot numbers "16" and "18", that is, between the first branch portion T8a of the eighth tooth T8 and the second branch portion T9b of the ninth tooth T9 with the pulled-out first conductor W1.

That is, the number of turns of the first conductor W1 by the A flyer between the first branch portion T8a and the second branch portion T9b is a half of the number of turns of the twentieth winding wire C20 to be wound between the first branch portion T8a and the second branch portion T9b. Then, by winding the remaining half of the winding turns with the second conductor W2 by the B flyer in the forward winding direction in the subsequent process (winding-wire winding process 41), the twentieth winding wire C20 in the forward winding direction between the first branch portion T8a and the second branch portion T9b is completed.

On the other hand, as illustrated in FIG. 19B, the B flyer pulls out the second conductor W2 hooked by the riser R of the fourth segment S4 to the closest slot SL with the slot number "4". Then, the B flyer winds a winding wire for the fourteenth winding wire C14 in the forward winding direction between the slots SL with the slot numbers "4" and "6", that is, between the first branch portion T2a of the second tooth T2 and the second branch portion T3b of the third tooth T3 with the routed second conductor W2.

That is, the number of turns of the second conductor W2 by the B flyer between the first branch portion T2a and the second branch portion T3b is a half of the number of turns of the fourteenth winding wire C14 to be wound between the first branch portion T2a and the second branch portion T3b. Then, by winding the remaining half of the winding turns with the first conductor W1 by the A flyer in the forward winding direction in the subsequent process (winding-wire winding process 41), the fourteenth winding wire C14 in the forward winding direction between the first branch portion T2a and the second branch portion T3b is completed.

Winding-wire Winding Process 37 (Slot: Eighteenth Winding Wire C18, Twenty-fourth Winding Wire C24)

As illustrated in FIG. 19A, the A flyer pulls out the first conductor W1 having been wound between the first branch portion T8a and the second branch portion T9b only by a half of the number of turns of the twentieth winding wire C20 to the side opposite to the commutator from the slot SL with the slot number "16". Subsequently, the A flyer routes the first conductor W1 having been pulled out to the side opposite to the commutator in the counterclockwise direction to the slot SL with the slot number "12". Then, the A flyer winds a winding wire for the eighteenth winding wire C18 in the reverse winding direction between the slots SL with the slot numbers "12" and "14", that is, between the first branch portion T6a of the sixth tooth T6 and the second branch portion T7b of the seventh tooth T7 with the routed first conductor W1.

That is, the number of turns of the first conductor W1 by the A flyer between the first branch portion T6a and the second branch portion T7b is a half of the number of turns of the eighteenth winding wire C18 to be wound between the first branch portion T6a and the second branch portion T7b. Then, by winding the remaining half of the winding turns with the second conductor W2 by the B flyer in the reverse winding direction in the subsequent process (winding-wire winding process 42), the eighteenth winding wire C18 in the reverse winding direction between the first branch portion T6a and the second branch portion T7b is completed.

On the other hand, as illustrated in FIG. 19B, the B flyer pulls out the second conductor W2 having been wound only by a half of the number of turns of the fourteenth winding wire C14 wound between the first branch portion T2a and the second branch portion T3b to the side opposite to the commutator from the slot SL with the slot number "4". Subsequently, the B flyer routes the second conductor W2 having been pulled out to the side opposite to the commutator in the counterclockwise direction to the slot SL with the slot number "24". Then, the B flyer winds a winding wire for the twenty-fourth winding wire C24 in the reverse winding direction between the slots SL with the slot numbers "24" and "2", that is, between the first branch portion T12a of the twelfth tooth T12 and the second branch portion T1b of the first tooth T1 with the routed second conductor W2.

That is, the number of turns of the second conductor W2 by the B flyer between the first branch portion T12a and the second branch portion T1b is a half of the number of turns of the twenty-fourth winding wire C24 to be wound between the first branch portion T12a and the second branch portion T1b. Then, by winding the remaining half of the winding turns with the first conductor W1 by the A flyer in the reverse winding direction in the subsequent process (winding-wire winding process 42), the twenty-fourth winding wire C24 in the reverse winding direction between the first branch portion T12a and the second branch portion T1b is completed.

Winding-wire Winding Process 38 (Slot: Sixteenth Winding Wire C16, Twenty-second Winding Wire C22)

As illustrated in FIG. 19A, the A flyer pulls out the first conductor W1 having been wound only by a half of the number of turns of the eighteenth winding wire C18 wound between the first branch portion T6a and the second branch portion T7b to the commutator side from the slot SL with the slot number "12". Subsequently, the A flyer routes the first conductor W1 having been pulled out to the commutator side in the counterclockwise direction to the slot SL with the slot number "8". Then, the A flyer winds a winding wire for the sixteenth winding wire C16 in the forward winding direction between the slots SL with the slot numbers "8" and "10", that is, between the first branch portion T4a of the fourth tooth T4 and the second branch portion T5b of the fifth tooth T5 with the routed first conductor W1.

That is, the number of turns of the first conductor W1 by the A flyer between the first branch portion T4a and the second branch portion T5b is a half of the number of turns of the sixteenth winding wire C16 to be wound between the first branch portion T4a and the second branch portion T5b. Then, by winding the remaining half of the winding turns with the second conductor W2 by the B flyer in the forward winding direction in the subsequent process (winding-wire winding process 43), the sixteenth winding wire C16 in the forward winding direction between the first branch portion T4a and the second branch portion T5b is completed.

On the other hand, as illustrated in FIG. 19B, the B flyer pulls out the second conductor W2 having been wound only by a half of the number of turns of the twenty-fourth winding wire C24 wound between the first branch portion T12a and the second branch portion T1b to the commutator side from the slot SL with the slot number "24". Subsequently, the B flyer routes the second conductor W2 having been pulled out to the commutator side in the counterclockwise direction to the slot SL with the slot number "20". Then, the B flyer winds a winding wire for the twenty-second winding wire C22 in the forward winding direction between the slots SL with the slot numbers "20" and "22", that is, between the first branch portion T10a of the tenth tooth T10 and the second branch portion T11b of the eleventh tooth T11 with the routed second conductor W2.

That is, the number of turns of the second conductor W2 by the B flyer between the first branch portion T10a and the second branch portion T11b is a half of the number of turns of the twenty-second winding wire C22 to be wound between the first branch portion T10a and the second branch portion T11b. Then, by winding the remaining half of the winding turns with the first conductor W1 by the A flyer in the forward winding direction in the subsequent process (winding-wire winding process 43), the twenty-second winding wire C22 in the forward winding direction between the first branch portion T10a and the second branch portion T11b is completed.

Winding-wire Winding Process 39 (Segment: S9, S21)

As illustrated in FIG. 19A, the A flyer pulls out the first conductor W1 having wound between the first branch portion T4a and the second branch portion T5b to the commutator side through the slot SL with the slot number "10". Subsequently, the A flyer pulls out the first conductor W1 having been pulled out to the commutator side to the closest ninth segment S9 and hooks it on the riser R of the ninth segment S9.

On the other hand, as illustrated in FIG. 19B, the B flyer pulls out the second conductor W2 having wound between the first branch portion T10a and the second branch portion T11b to the commutator side through the slot SL with the slot number "22". Subsequently, the B flyer pulls out the second conductor W2 having been pulled out to the commutator side to the closest twenty-first segment S21 and hooks it on the riser R of the twenty-first segment S21.

Winding-wire Winding Process 40 (Slot: Sixteenth Winding Wire C16, Twenty-second Winding Wire C22)

As illustrated in FIG. 19A, the A flyer pulls out the first conductor W1 hooked and hooked on the riser R of the ninth segment S9 to the closest slot SL with the slot number "10". Then, the A flyer winds the pulled-out first conductor W1 only by one turn in the reverse winding direction between the slots SL with the slot numbers "10" and "8", that is, between the second branch portion T5b of the fifth tooth T5 and the first branch portion T4a of the fourth tooth T4 and pulls out the first conductor W1 to the commutator side from the slot SL with the slot number "8".

On the other hand, as illustrated in FIG. 19B, the B flyer pulls out the second conductor W2 hooked and hooked on the riser R of the twenty-first segment S21 to the closest slot SL with the slot number "22". Then, the B flyer winds the pulled-out second conductor W2 only by one turn in the reverse winding direction between the slots SL with the slot numbers "22" and 20", that is, between the second branch portion T11b of the eleventh tooth T11 and the first branch portion T10a of the tenth tooth T10 and pulls out the first conductor W1 to the commutator side from the slot SL with the slot number "20".

Winding-wire Winding Process 41 (Slot: Fourteenth Winding Wire C14, Twentieth Winding Wire C20)

As illustrated in FIG. 19A, the A flyer routes the first conductor W1 having been pulled out to the commutator side from the slot SL with the slot number "8" in the counterclockwise direction to the slot SL with the slot number "4". The A flyer winds a winding wire for the fourteenth winding wire C14 in the forward winding direction between the slots SL with the slot numbers "4" and "6", that is, between the first branch portion T2a of the second tooth T2 and the second branch portion T3b of the third tooth T3 with the routed first conductor W1.

Here, the number of turns of the first conductor W1 by the A flyer between the first branch portion T2a and the second branch portion T3b is a half of the number of turns of the fourteenth winding wire C14 to be wound between the first branch portion T2a and the second branch portion T3b. That is, in the preceding winding-wire winding process 36, the B flyer has wound the half in the forward winding direction with the second conductor W2. Thus, by winding the remaining half of the winding turns between the first branch portion T2a and the second branch portion T3b in the forward winding direction at this point of time, the fourteenth winding wire C14 is completed.

On the other hand, as illustrated in FIG. 19B, the B flyer routes the second conductor W2 having been pulled out to the commutator side from the slot SL with the slot number "20" in the counterclockwise direction to the slot SL with the slot number "16". The B flyer winds a winding wire for the twentieth winding wire C20 in the forward winding direction between the slots SL with the slot numbers "16" and "18", that is, between the first branch portion T8a of the eighth tooth T8 and the second branch portion T9b of the ninth tooth T9 with the routed second conductor W2.

Here, the number of turns of the second conductor W2 by the B flyer between the first branch portion T8a and the second branch portion T9b is a half of the number of turns of the twentieth winding wire C20 to be wound between the first branch portion T8a and the second branch portion T9b. That is, in the preceding winding-wire winding process 36, the A flyer has wound the half in the forward winding direction with the first conductor W1. Thus, by winding the remaining half of the winding turns in the forward winding direction between the first branch portion T8a and the second branch portion T9b at this point of time, the twentieth winding wire C20 is completed.

Winding-wire Winding Process 42 (Slot: Twenty-fourth Winding Wire C24, Eighteenth Winding Wire C18)

As illustrated in FIG. 19A, the A flyer pulls out the first conductor W1 having been wound the fourteenth winding wire C14 to the side opposite to the commutator from the slot SL with the slot number "4". Subsequently, the A flyer routes the first conductor W1 having been pulled out to the side opposite to the commutator from the slot SL with the slot number "4" in the counterclockwise direction to the slot SL with the slot number "24". The A flyer winds a winding wire for the twenty-fourth winding wire C24 in the reverse winding direction between the slots SL with the slot numbers "24" and "2", that is, between the first branch portion T12a of the twelfth tooth T21 and the second branch portion T1b of the first tooth T1 with the routed first conductor W1.

Here, the number of turns of the first conductor W1 by the A flyer between the first branch portion T12a and the second branch portion T1b is a half of the number of turns of the twenty-fourth winding wire C24 to be wound between the first branch portion T12a and the second branch portion T1b. That is, in the preceding winding-wire winding process 37, the B flyer has wound the half in the reverse winding direction with the second conductor W2. Thus, by winding the remaining half of the winding turns in the reverse winding direction between the first branch portion T12a and the second branch portion T1b at this point of time, the twenty-fourth winding wire C24 is completed.

On the other hand, as illustrated in FIG. 19B, the B flyer pulls out the second conductor W2 having wound the twentieth winding wire C20 to the side opposite to the commutator from the slot SL with the slot number "16". Subsequently, the B flyer routes the second conductor W2 having been pulled out from the slot SL with the slot number "16" to the side opposite to the commutator in the counterclockwise direction to the slot SL with the slot number "12". The B flyer winds a winding wire for the eighteenth winding wire C18 in the reverse winding direction between the slots SL with the slot numbers "12" and "14", that is, between the first branch portion T6a of the sixth tooth T6 and the second branch portion T7b of the seventh tooth T7 with the routed second conductor W2.

Here, the number of turns of the second conductor W2 by the B flyer between the first branch portion T6a and the second branch portion T7b is a half of the number of turns of the eighteenth winding wire C18 to be wound between the first branch portion T6a and the second branch portion T7b. That is, in the preceding winding-wire winding process 37, the A flyer has wound the half in the reverse winding direction with the first conductor W1. Thus, by winding the remaining half of the winding turns in the reverse winding direction between the first branch portion T6a and the second branch portion T7b at this point of time, the eighteenth winding wire C18 is completed.

Winding-wire Winding Process 43 (Slot: Twenty-second Winding Wire C22, Sixteenth Winding Wire C16)

As illustrated in FIG. 19A, the A flyer pulls out the first conductor W1 having been wound the twenty-fourth winding wire C24 to the commutator side from the slot SL with the slot number "24". Subsequently, the A flyer routes the first conductor W1 having been pulled out to the commutator side from the slot SL with the slot number "24" in the counterclockwise direction to the slot SL with the slot number "20". The A flyer winds a winding wire for the twenty-second winding wire C22 in the forward winding direction between the slots SL with the slot numbers "20" and "22", that is, between the first branch portion T10a of the tenth tooth T10 and the second branch portion T11b of the eleventh tooth T11 with the routed first conductor W1.

Here, the number of turns of the first conductor W1 by the A flyer between the first branch portion T10a and the second branch portion T11b is a half of the number of turns of the twenty-second winding wire C22 to be wound between the first branch portion T10a and the second branch portion T11b. That is, in the preceding winding-wire winding process 38, the B flyer has wound the half in the forward winding direction with the second conductor W2. Thus, by winding the remaining half of the winding turns in the forward winding direction between the first branch portion T10a and the second branch portion T11b at this point of time, the twenty-second winding wire C22 is completed.

On the other hand, as illustrated in FIG. 19B, the B flyer pulls out the second conductor W2 having wound the eighteenth winding wire C18 to the commutator side from the slot SL with the slot number "12". Subsequently, the B flyer routes the second conductor W2 having been pulled out from the slot SL with the slot number "12" to the commutator side in the counterclockwise direction to the slot SL with the slot number "8". The B flyer winds a winding wire for the sixteenth winding wire C16 in the forward winding direction between the slots SL with the slot numbers "8" and "10", that is, between the first branch portion T4a of the fourth tooth T4 and the second branch portion T5b of the fifth tooth T5 with the routed second conductor W2.

Here, the number of turns of the second conductor W2 by the B flyer between the first branch portion T4a and the second branch portion T5b is a half of the number of turns of the sixteenth winding wire C16 to be wound between the first branch portion T4a and the second branch portion T5b. That is, in the preceding winding-wire winding process 38, the A flyer has wound the half in the forward winding direction with the first conductor W1. Thus, by winding the remaining half of the winding turns in the forward winding direction between the first branch portion T4a and the second branch portion T5b at this point of time, the sixteenth winding wire C16 is completed.

Winding-wire Winding Process 44 (Slot: Slot Number "24", Slot Number "12")

As illustrated in FIG. 19A, the A flyer pulls out the first conductor W1 having wound the twenty-second winding wire C22 to the side opposite to the commutator from the slot SL with the slot number "20" and routes the pulled-out first conductor W1 in the clockwise direction to the slot SL with the slot number "24". Subsequently, the A flyer pulls out the first conductor W1 having been routed in the clockwise direction to the commutator side from the side opposite to the commutator through the slot SL with the slot number "24".

On the other hand, as illustrated in FIG. 19B, the B flyer pulls out the second conductor W2 having wound the sixteenth winding wire C16 to the side opposite to the commutator from the slot SL with the slot number "8" and routes the pulled-out second conductor W2 in the clockwise direction to the slot SL with the slot number "12". Subsequently, the A flyer pulls out the second conductor W2 having been routed in the clockwise direction to the commutator side from the side opposite to the commutator through the slot SL with the slot number "12".

Winding-wire Winding Process 45 (Segment: S24, S12)

As illustrated in FIG. 19A, the A flyer pulls out the first conductor W1 having been pulled out to the commutator side through the slot SL with the slot number "24" to the closest twenty-fourth segment S24 and hooks it on the riser R of the twenty-fourth segment S24.

On the other hand, as illustrated in FIG. 19B, the B flyer pulls out the second conductor W2 having been pulled out to the commutator side through the slot SL with the slot number "12" to the closest twelfth segment S12 and hooks it on the riser R of the twelfth segment S12.

Winding-wire Winding Process 46 (Disconnection)

The A flyer cuts off (disconnects) the first conductor W1 hooked by the riser R of the twenty-fourth segment S24.

The B flyer cuts off (disconnects) the second conductor W2 hooked by the riser R of the twelfth segment S12.

As a result, the winding work of the first to twenty-fourth winding wires C1 to C24 using the double-flyer winding machine composed of the A flyer and the B flyer is finished.

Subsequently, each of the risers R is bent in a direction in which the portion where the respective corresponding short-circuit wires and the winding wires are hooked is held. Subsequently, fusing is performed, and by this fusing, the riser R of each segment is joined and electrically connected to each of the corresponding winding wires and short-circuit wires, respectively.

As a result, the armature 3 is produced.

Subsequently, an action of the above-described third embodiment will be described.

First, the A flyer and the B flyer share winding of all the 12 first to twelfth winding wires C1 to C12 in the concentrated winding, respectively. When the 12 first to twelfth winding wires C1 to C12 are wound, the A flyer and the B flyer similarly share winding of all the 12 thirteenth to twenty-fourth winding wires C13 to C24 in the distributed winding, respectively.

Then, the conductors W1 and W2 between the concentrated winding wires to be hooked by the risers are hooked by the risers R other than the risers R by which the conductors W1 and W2 between the concentrated winding wires have been already hooked. Moreover, the conductors W1 and W2 between the distributed winding wires to be hooked by the risers R are hooked by the risers R other than the risers R by which the conductors W1 and W2 between the concentrated winding wires and the conductors W1 and W2 between the distributed winding wires have been already hooked.

As a result, the conductors hooked by the risers R of the first to twenty-fourth segments S1 to S24 are two conductors W1 and W2 including the short-circuit wires at the maximum, which is an extremely small number. As a result, in fusing for electrically connecting the conductors W1 and W2 with the risers R performed in the subsequent process, insulation from the adjacent riser R can be ensured.

Subsequently, advantages of the above-described third embodiment will be described below.

(7) According to this embodiment, the number of conductors W1 and W2 hooked by the risers R of the first to twenty-fourth segments S1 to S24 can be reduced, and insulation from the adjacent riser R can be ensured.

The above-described third embodiment may be changed as follows:

In the third embodiment, the number of poles of the magnetic poles (magnets) provided in the stator 2 is set to 6, the number of slots to 24, and the number of segments to 24. Instead of this, the present invention may be applied to an armature having a ratio of the number of magnetic poles:number of slots:number of segments being 1:4:4.

Moreover, in the first to third embodiments, the present invention is embodied in the DC motor 1 provided with the anode-side brush B1 and the cathode-side brush B2 one each, but the present invention may be embodied in the DC motor provided with the anode-side brush B1 and the cathode-side brush B2, respectively, in plural.

(Fourth Embodiment)

Subsequently, a fourth embodiment will be described. The fourth embodiment is different form the first embodiment in the winding method of the winding wire. Thus, in the fourth embodiment, for convenience of explanation, the winding method of the winding wire will be described.

In this embodiment, regarding the first to twelfth winding wires C1 to C12 in the concentrated winding, eight winding wires, that is, the first to fourth and the seventh to tenth winding wires C1 to C4 and C7 to C10 are wound in the forward winding. On the other hand, four winding wires, that is, the fifth, the sixth, the eleventh, and the twelfth winding wires C5, C6, C11 and C12 are wound in the reverse winding.

On the other hand, regarding the thirteenth to twenty-fourth winding wires C13 to C24 in the distributed winding, eight winding wires, that is, the thirteenth to fifteenth, the eighteenth to twenty-first, and the twenty-fourth winding wires C13 to C15, C18 to C21, and C24 are wound in the forward winding. On the other hand, four winding wires, that is, the sixteenth, the seventeenth, the twenty-second, and the twenty-third winding wires C16, C17, C22 and C23 are wound in the reverse winding.

(Riser Bending Process)

Subsequent to the short-circuit wire connecting process described in the first embodiment, a riser bending process for bending the risers of the segments by which the first to eighth short-circuit wires L1 to L8 connected in the short-circuit wire connecting process are hooked is performed.

This riser bending process for bending the riser is a work of bending the risers of the segments by which the start end portions and the terminal end portions of the first to eighth short-circuit wires L1 to L8 are hooked.

In more detail, the risers R of the first and ninth segments S1 and S9 excluding the riser R of the seventeenth segment S17 are bent in a direction in which the portions where the start end portion and the terminal end portion of the first short-circuit wire L1 are hooked are held.

The risers R of the tenth and eighteenth segments S10 and S18 excluding the riser R of the second segment S2 are bent in a direction in which the portions where the start end portion and the terminal end portion of the second short-circuit wire L2 are hooked are held.

The risers R of the nineteenth and third segments S19 and S3 excluding the riser R of the eleventh segment S11 are bent in a direction in which the portions where the start end portion and the terminal end portion of the third short-circuit wire L3 are hooked are held.

The risers R of the second and twelfth segments S2 and S12 excluding the riser R of the twentieth segment S20 are bent in a direction in which the portions where the start end portion and the terminal end portion of the fourth short-circuit wire L4 are hooked are held.

The risers R of the thirteenth and twenty-first segments S13 and S21 excluding the riser R of the fifth segment S5 are bent in a direction in which the portions where the start end portion and the terminal end portion of the fifth short-circuit wire L5 are hooked are held.

The risers R of the twenty-second and sixth segments S22 and S6 excluding the riser R of the fourteenth segment S14 are bent in a direction in which the portions where the start end portion and the terminal end portion of the sixth short-circuit wire L6 are hooked are held.

The risers R of the seventh and fifteenth segments S7 and S15 excluding the riser R of the twenty-third segment S23 are bent in a direction in which the portions where the start end portion and the terminal end portion of the seventh short-circuit wire L7 are hooked are held.

The risers R of the sixteenth and twenty-fourth segments S16 and S24 excluding the riser R of the eighth segment S8 are bent in a direction in which the portions where the start end portion and the terminal end portion of the eighth short-circuit wire L8 are hooked are held.

As a result, the risers R of the eight segments, that is, the second, the fifth, the eighth, the eleventh, the fourteenth, the seventeenth, the twentieth, and the twenty-third segments S2, S5, S8, S11, S14, S17, S20, and S23 are left unbent.

That is, the winding work of the first to twenty-fourth winding wires C1 to C24 which will be performed subsequently by using the risers R of the eight segments S2, S5, S8, S11, S14, S17, S20, and S23 which are left unbent is started.

(Winding-wire Winding Process)

When the riser bending process is completed, the winding work of the first to twenty-fourth winding wires C1 to C24 is started.

Here, the winding of the first to twenty-fourth winding wires C1 to C24 will be described in accordance with a winding-wire winding process table illustrated in Table 5 below and the winding diagrams illustrated in FIGS. 20 to 31.

TABLE 5

| | | Flyer | |
| --- | --- | --- | --- |
| | | A Flyer | B Flyer |
| | Conductor | W1 | W2 |
| Winding-wire winding process 1 | Segment | S17 | S5 |
| 2 | Slot | Slot No. "3"→"1" | Slot No. "15"→"13" |
| 3 | Segment | S2 | S14 |
| 4 | Slot | Slot No. "9"→"11" | Slot No. "21"→"23" |
| 5 | Segment | S17 | S5 |
| 6 | Slot | Slot No. "19"→"17" | Slot No. "7"→"5" |
| 7 | Segment | S2 | S14 |
| 8 | | Disconnection | Disconnection |
| 9 | Segment | S11 | S23 |
| 10 | Slot | Slot No. "5"→"3" | Slot No. "17"→"15" |
| 11 | Segment | S20 | S8 |
| 12 | Slot | Slot No. "11"→"13" | Slot No. "23"→"1" |
| 13 | Segment | S11 | S23 |
| 14 | Slot | Slot No. "21"→"19" | Slot No. "9"→"7" |
| 15 | Segment | S20 | S8 |
| 16 | Slot | Slot No. "14"→"12" | Slot No. "2"→"24" |
| 17 | Segment | S5 | S17 |
| 18 | Slot | Slot No. "20"→"22" | Slot No. "8"→"10" |
| 19 | Segment | S20 | S8 |
| 20 | Slot | Slot No. "6"→"4" | Slot No. "18"→"16" |
| 21 | Segment | S5 | S17 |
| 22 | | Disconnection | Disconnection |
| 23 | Segment | S14 | S2 |
| 24 | Slot | Slot No. "16"→"14" | Slot No. "4"→"2" |
| 25 | Segment | S23 | S11 |
| 26 | Slot | Slot No. "22"→"24" | Slot No. "10"→"12" |
| 27 | Segment | S14 | S2 |
| 28 | Slot | Slot No. "8"→"6" | Slot No. "20"→"18" |
| 29 | Segment | S23 | S11 |

In this embodiment, as is obvious from the wire connection process table illustrated in Table 5 and the winding diagrams illustrated in FIGS. 20 to 31, this is a method of winding one of the winding wires and another of the winding wires arranged at positions faced with each other at 180° at the same time, and a double-flyer winding machine is used.

Therefore, in the process table, the A flyer (winding machine) and the B flyer (winding machine) share winding of the first to twenty-fourth winding wires C1 to C24 similarly to the first to eighth short-circuit wires L1 to L8.

Winding-wire Winding Process 1 (Segment: S17, S5)

Figure 20:
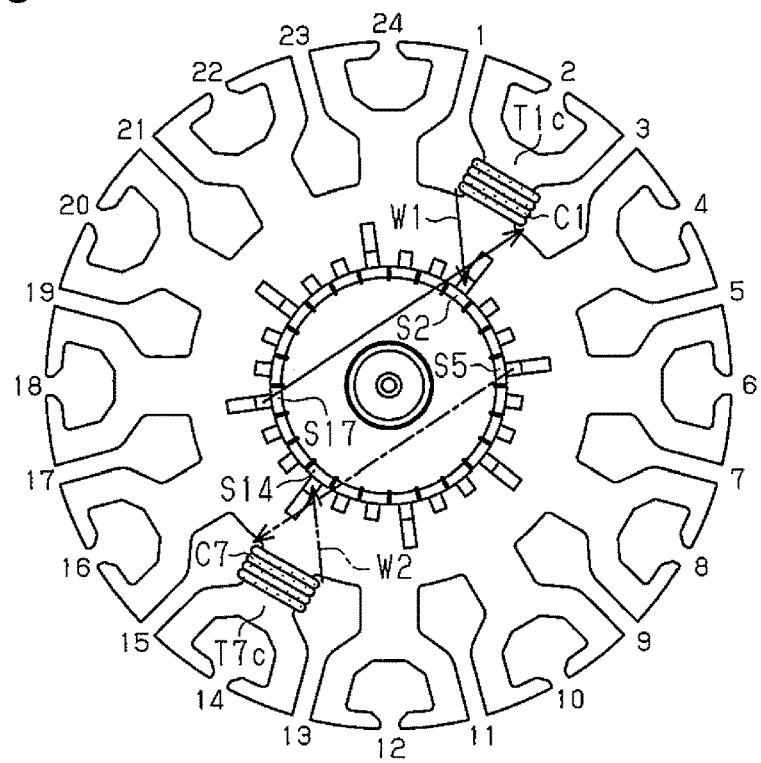
FIG. 20 is a view illustrating a winding order of first and seventh winding wires in a fourth embodiment.

As illustrated in FIG. 20, the A flyer hooks the start end portion of the first conductor W1 on the riser R of the seventeenth segment S17.

On the other hand, as illustrated in FIG. 20, the B flyer hooks the start end portion of the second conductor W2 on the riser R of the fifth segment S5.

Winding-wire Winding Process 2 (Slot: First Winding Wire C1, Seventh Winding Wire C7)

As illustrated in FIG. 20, the A flyer routes the first conductor W1 hooked by the riser R of the seventeenth segment S17 in the counterclockwise direction to the slot SL with the slot number "3". Then, the A flyer winds the routed first conductor W1 around the inner winding portion T1c of the first tooth T1 in the forward winding between the slots SL with the slot numbers "3" and "1". As a result, the first winding wire C1 in the forward winding in the concentrated winding is wound around the inner winding portion T1c.

On the other hand, as illustrated in FIG. 20, the B flyer routes the second conductor W2 hooked by the riser R of the fifth segment S5 in the counterclockwise direction to the slot SL with the slot number "15". Then, the B flyer winds the routed second conductor W2 around the inner winding portion T7c of the seventh tooth T7 in the forward winding between the slots SL with the slot numbers "15" and "13". As a result, the seventh winding wire C7 in the forward winding in the concentrated winding is wound around the inner winding portion T7c.

Winding-wire Winding Process 3 (Segment: S2, S14)

As illustrated in FIG. 20, the A flyer routes the first conductor W1 having wound the first winding wire C1 in the clockwise direction from the slot SL with the slot number "1" to the second segment S2 and hooks it on the riser R of the second segment S2.

On the other hand, as illustrated in FIG. 20, the B flyer routes the second conductor W2 having wound the seventh winding wire C7 in the clockwise direction from the slot SL with the slot number "13" to the fourteenth segment S14 and hooks it on the riser R of the fourteenth segment S14.

Winding-wire Winding Process 4 (Slot: Fifth Winding Wire C5, Eleventh Winding Wire C11)

Figure 21:
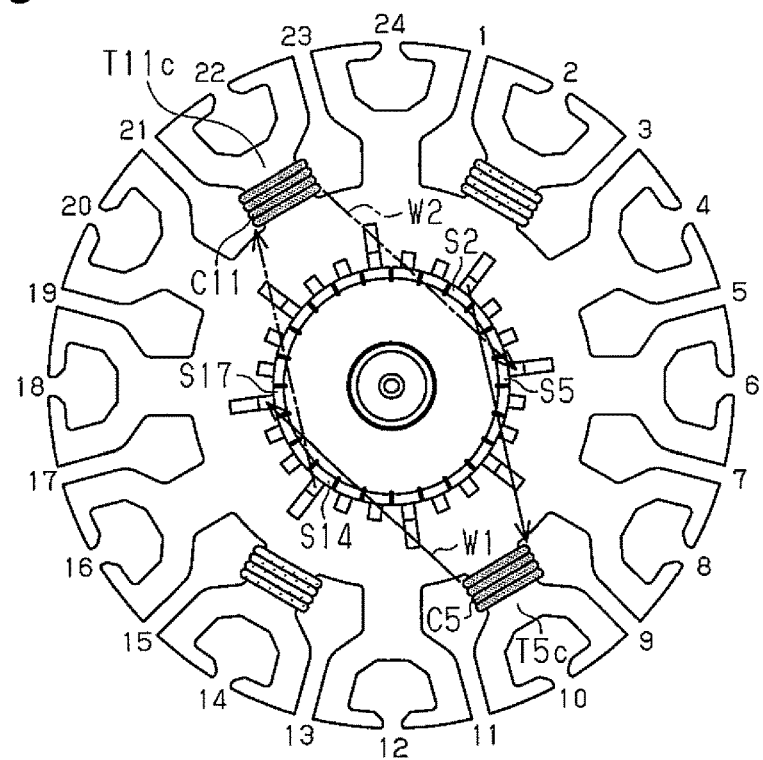
FIG. 21 is a view illustrating a winding order of fifth and eleventh winding wires in the fourth embodiment.

As illustrated in FIG. 21, the A flyer routes the first conductor W1 hooked on the riser R of the second segment S2 in the clockwise direction to the slot SL with the slot number "9". Then, the A flyer winds the routed first conductor W1 around the inner winding portion T5c of the fifth tooth T5 in the reverse winding between the slots SL with the slot numbers "9" and "11". As a result, the fifth winding wire C5 in the reverse winding in the concentrated winding is wound around the inner winding portion T5c.

On the other hand, as illustrated in FIG. 21, the B flyer routes the second conductor W2 hooked on the riser R of the fourteenth segment S14 in the clockwise direction to the slot SL with the slot number "21". Then, the B flyer winds the routed second conductor W2 around the inner winding portion T11c of the eleventh tooth T11 in the reverse winding between the slots SL with the slot numbers "21" and "23". As a result, the eleventh winding wire C11 in the reverse winding in the concentrated winding is wound around the inner winding portion T11c.

Winding-wire Winding Process 5 (Segment: S17, S5)

As illustrated in FIG. 21, the A flyer routes the first conductor W1 having wound the fifth winding wire C5 in the clockwise direction from the slot SL with the slot number "11" to the seventeenth segment S17 and hooks it on the riser R of the seventeenth segment S17.

On the other hand, as illustrated in FIG. 21, the B flyer routes the second conductor W2 having wound the eleventh winding wire C11 in the clockwise direction from the slot SL with the slot number "23" to the fifth segment S5 and hooks it on the riser R of the fifth segment S5.

Winding-wire Winding Process 6 (Slot: Ninth Winding Wire C9, Third Winding Wire C3)

Figure 22:
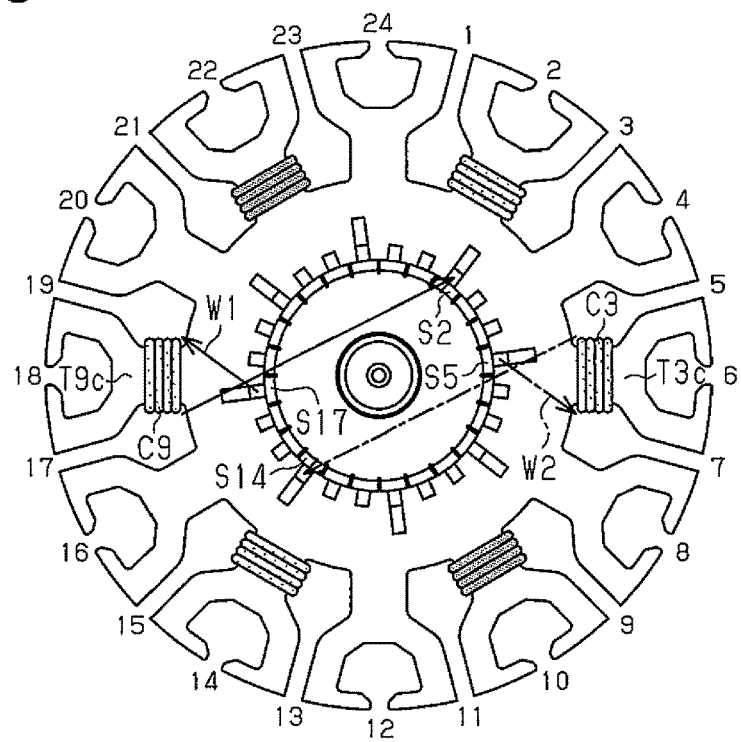
FIG. 22 is a view illustrating a winding order of ninth and third winding wires in the fourth embodiment.

As illustrated in FIG. 22, the A flyer routes the first conductor W1 hooked on the riser R of the seventeenth segment S17 in the clockwise direction to the slot SL with the slot number "19". Then, the A flyer winds the routed first conductor W1 around the inner winding portion T9c of the ninth tooth T9 in the forward winding between the slots SL with the slot numbers "19" and "17". As a result, the ninth winding wire C9 in the forward winding in the concentrated winding is wound around the inner winding portion T9c.

On the other hand, as illustrated in FIG. 22, the B flyer routes the second conductor W2 hooked on the riser R of the fifth segment S5 in the clockwise direction to the slot SL with the slot number "7". Then, the B flyer winds the routed second conductor W2 around the inner winding portion T3c of the third tooth T3 in the forward winding between the slots SL with the slot numbers "7" and "5". As a result, the third winding wire C3 in the forward winding in the concentrated winding is wound around the inner winding portion T3c.

Winding-wire Winding Process 7 (Segment: S2, S14)

As illustrated in FIG. 22, the A flyer routes the first conductor W1 having wound the ninth winding wire C9 in the clockwise direction from the slot SL with the slot number "17" to the second segment S2 and hooks it on the riser R of the second segment S2.

On the other hand, as illustrated in FIG. 22, the B flyer routes the second conductor W2 having wound the third winding wire C3 in the clockwise direction from the slot SL with the slot number "5" to the fourteenth segment S14 and hooks it on the riser R of the fourteenth segment S14.

Winding-wire Winding Process 8 (Disconnection)

The A flyer cuts off (disconnects) the first conductor W1 hooked by the riser R of the second segment S2.

The B flyer cuts off (disconnects) the second conductor W2 hooked by the riser R of the fourteenth segment S14.

Winding-wire Winding Process 9 (Segment: S11, S23)

Figure 23:
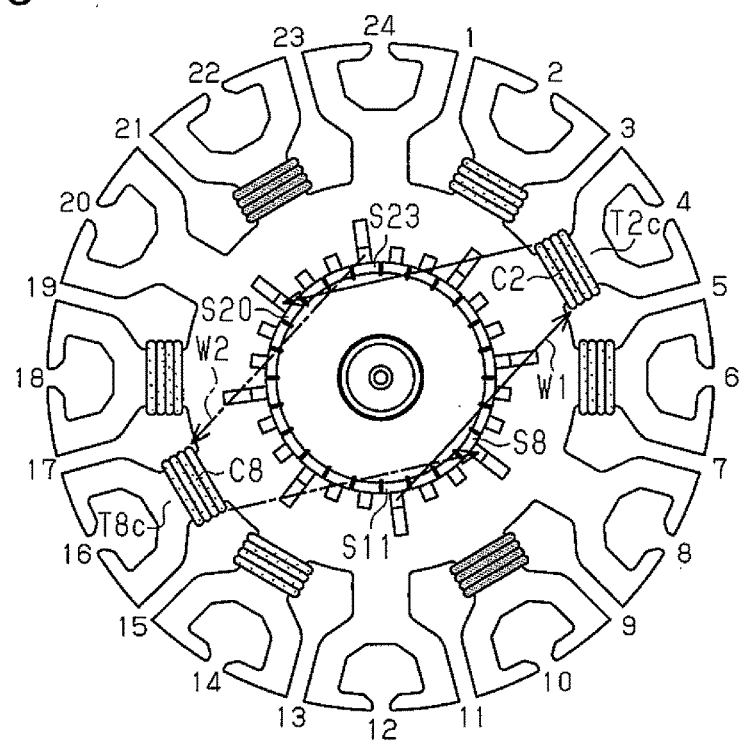
FIG. 23 is a view illustrating a winding order of second and eighth winding wires in the fourth embodiment.

As illustrated in FIG. 23, the A flyer newly hooks the cut first conductor W1 on the riser R of the eleventh segment S11.

On the other hand, as illustrated in FIG. 23, the B flyer newly hooks the cut second conductor W2 on the riser R of the twenty-third segment S23.

Winding-wire Winding Process 10 (Slot: Second Winding Wire C2, Eighth Winding Wire C8)

As illustrated in FIG. 23, the A flyer routes the first conductor W1 hooked by the riser R of the eleventh segment S11 in the counterclockwise direction to the slot SL with the slot number "5". Then, the A flyer winds the routed first conductor W1 around the inner winding portion T2c of the second tooth T2 in the forward winding between the slots SL with the slot numbers "5" and "3". As a result, the second winding wire C2 in the forward winding in the concentrated winding is wound around the inner winding portion T2c.

On the other hand, as illustrated in FIG. 23, the B flyer routes the second conductor W2 hooked by the riser R of the twenty-third segment S23 in the counterclockwise direction to the slot SL with the slot number "17". Then, the B flyer winds the routed second conductor W2 around the inner winding portion T8c of the eighth tooth T8 in the forward winding between the slots SL with the slot numbers "17" and "15". As a result, the eighth winding wire C8 in the forward winding in the concentrated winding is wound around the inner winding portion T8c.

Winding-wire Winding Process 11 (Segment: S20, S8)

As illustrated in FIG. 23, the A flyer routes the first conductor W1 having wound the second winding wire C2 in the counterclockwise direction from the slot SL with the slot number "3" to the twentieth segment S20 and hooks it on the riser R of the twentieth segment S20.

On the other hand, as illustrated in FIG. 23, the B flyer routes the second conductor W2 having wound the eighth winding wire C8 in the counterclockwise direction from the slot SL with the slot number "15" to the eighth segment S8 and hooks it on the riser R of the eighth segment S8.

Winding-wire Winding Process 12 (Slot: Sixth Winding Wire C6, Twelfth Winding Wire C12)

Figure 24:
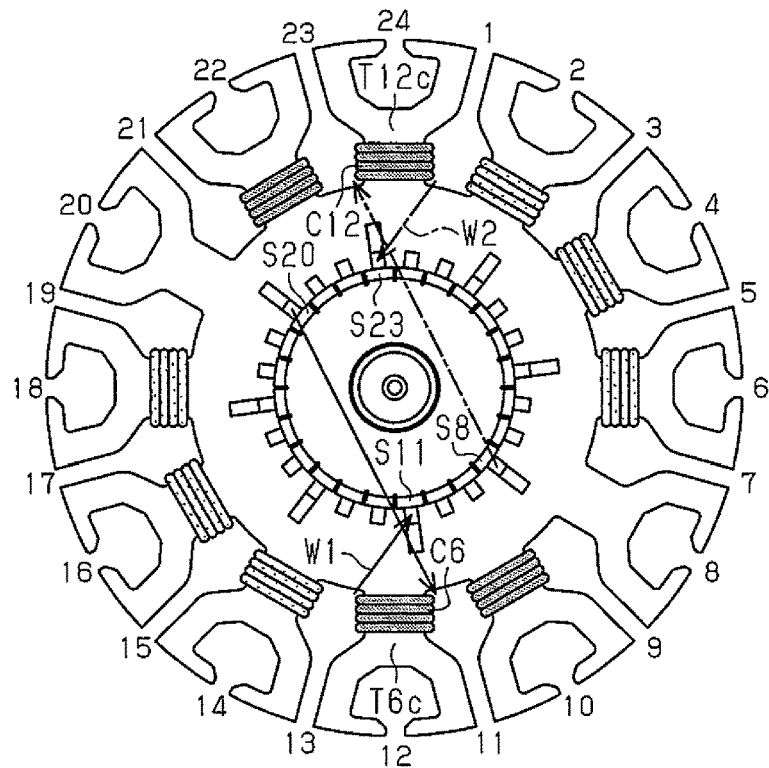
FIG. 24 is a view illustrating a winding order of sixth and twelfth winding wires in the fourth embodiment.

As illustrated in FIG. 24, the A flyer routes the first conductor W1 hooked on the riser R of the twentieth segment S20 in the counterclockwise direction to the slot SL with the slot number "11". Then, the A flyer winds the routed first conductor W1 around the inner winding portion T6c of the sixth tooth T6 in the reverse winding between the slots SL with the slot numbers "11" and "13". As a result, the sixth winding wire C6 in the reverse winding in the concentrated winding is wound around the inner winding portion T6c.

On the other hand, as illustrated in FIG. 24, the B flyer routes the second conductor W2 hooked on the riser R of the eighth segment S8 in the counterclockwise direction to the slot SL with the slot number "23". Then, the B flyer winds the routed second conductor W2 around the inner winding portion T12c of the twelfth tooth T12 in the reverse winding between the slots SL with the slot numbers "23" and "1". As a result, the twelfth winding wire C12 in the concentrated winding is wound around the inner winding portion T12c.

Winding-wire Winding Process 13 (Segment: S11, S23)

As illustrated in FIG. 24, the A flyer routes the first conductor W1 having wound the sixth winding wire C6 in the counterclockwise direction from the slot SL with the slot number "13" to the eleventh segment S11 and hooks it on the riser R of the eleventh segment S11.

On the other hand, as illustrated in FIG. 24, the B flyer routes the second conductor W2 having wound the twelfth winding wire C12 in the counterclockwise direction from the slot SL with the slot number "1" to the twenty-third segment S23 and hooks it on the riser R of the twenty-third segment S23.

Winding-wire Winding Process 14 (Slot: Tenth Winding Wire C10, Fourth Winding Wire C4)

Figure 25:
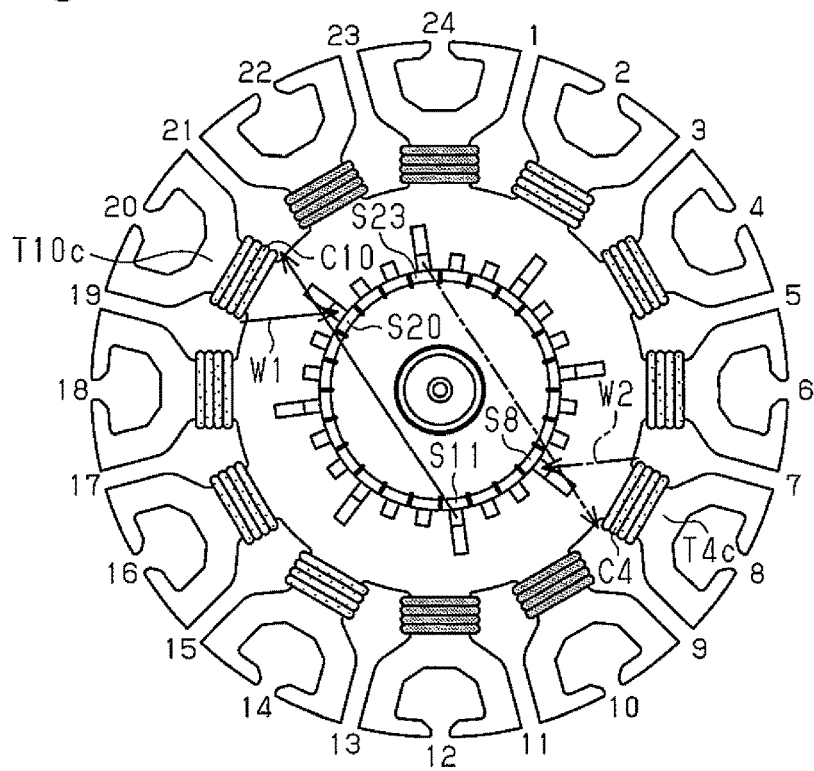
FIG. 25 is a view illustrating a winding order of tenth and fourth winding wires in the fourth embodiment.

As illustrated in FIG. 25, the A flyer routes the first conductor W1 hooked on the riser R of the eleventh segment S11 in the clockwise direction to the slot SL with the slot number "21". Then, the A flyer winds the routed first conductor W1 around the inner winding portion T10c of the tenth tooth T10 in the forward winding between the slots SL with the slot numbers "21" and "19". As a result, the tenth winding wire C10 in the forward winding in the concentrated winding is wound around the inner winding portion T10c.

On the other hand, as illustrated in FIG. 25, the B flyer routes the second conductor W2 hooked on the riser R of the twenty-third segment S23 in the clockwise direction to the slot SL with the slot number "9". Then, the B flyer winds the routed second conductor W2 around the inner winding portion T4c of the fourth tooth T4 in the forward winding between the slots SL with the slot numbers "9" and "7". As a result, the fourth winding wire C4 in the forward winding in the concentrated winding is wound around the inner winding portion T4c.

At this point of time, the first to twelfth winding wires C1 to C12 in the concentrated winding are wound by the A flyer and the B flyer around each of all the 12 inner winding portions T1c to T12c.

Winding-wire Winding Process 15 (Segment: S20, S8)

As illustrated in FIG. 25, the A flyer routes the first conductor W1 having wound the tenth winding wire C10 in the clockwise direction from the slot SL with the slot number "19" to the twentieth segment S20 and hooks it on the riser R of the twentieth segment S20.

On the other hand, as illustrated in FIG. 25, the B flyer routes the second conductor W2 having wound the fourth winding wire C4 in the clockwise direction from the slot SL with the slot number "7" to the eighth segment S8 and hooks it on the riser R of the eighth segment S8.

Winding-wire Winding Process 16 (Slot: Eighteenth Winding Wire C18, Twenty-fourth Winding Wire C24)

Figure 26:
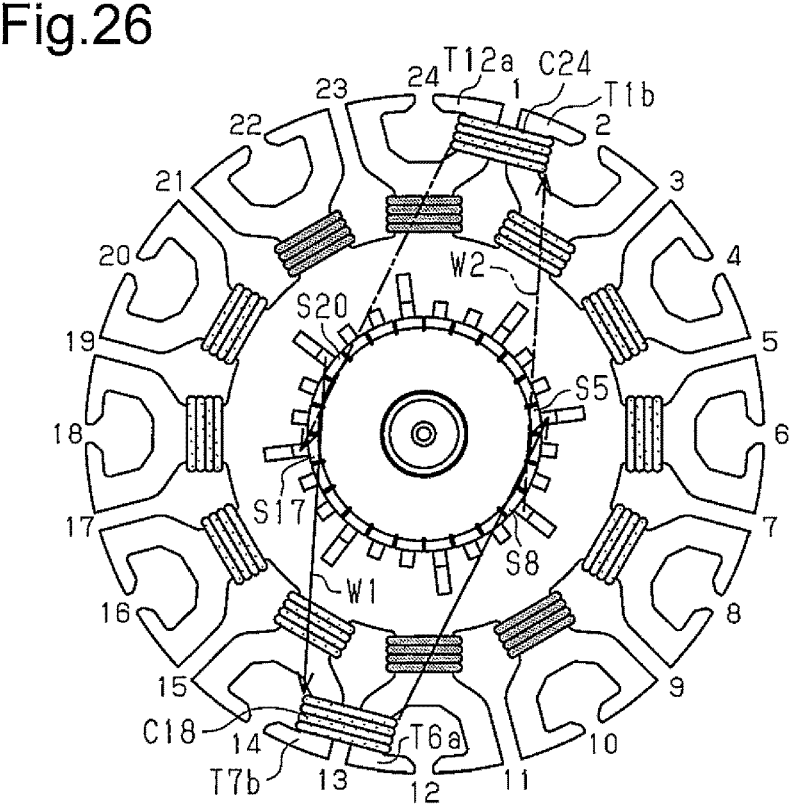
FIG. 26 is a view illustrating a winding order of eighteenth and twenty-fourth winding wires in the fourth embodiment.

As illustrated in FIG. 26, the A flyer routes the first conductor W1 hooked on the riser R of the twentieth segment S20 in the counterclockwise direction to the slot SL with the slot number "14". Then, the A flyer winds the routed first conductor W1 in the forward winding between the slots SL with the slot numbers "14" and "12", that is, between the second branch portion T7b of the seventh tooth T7 and the first branch portion T6a of the sixth tooth T6. As a result, the eighteenth winding wire C18 in the forward winding in the distributed winding is wound between the second branch portion T7b and the first branch portion T6a.

On the other hand, as illustrated in FIG. 26, the B flyer routes the second conductor W2 hooked on the riser R of the eighth segment S8 in the counterclockwise direction to the slot SL with the slot number "2". Then, the B flyer winds the routed second conductor W2 in the forward winding between the slots SL with the slot numbers "2" and "24", that is, between the second branch portion T1b of the first tooth T1 and the first branch portion T12a of the twelfth tooth T12. As a result, the twenty-fourth winding wire C24 in the forward winding in the distributed winding is wound between the second branch portion T1b and the first branch portion T12a.

Winding-wire Winding Process 17 (Segment: S5, S17)

As illustrated in FIG. 26, the A flyer routes the first conductor W1 having wound the eighteenth winding wire C18 in the counterclockwise direction from the slot SL with the slot number "12" to the fifth segment S5 and hooks it on the riser R of the fifth segment S5.

On the other hand, as illustrated in FIG. 26, the B flyer routes the second conductor W2 having wound the twenty-fourth winding wire C24 in the counterclockwise direction from the slot SL with the slot number "24" to the seventeenth segment S17 and hooks it on the riser R of the seventeenth segment S17.

Winding-wire Winding Process 18 (Slot: Twenty-second Winding Wire C22, Sixteenth Winding Wire C16)

Figure 27:
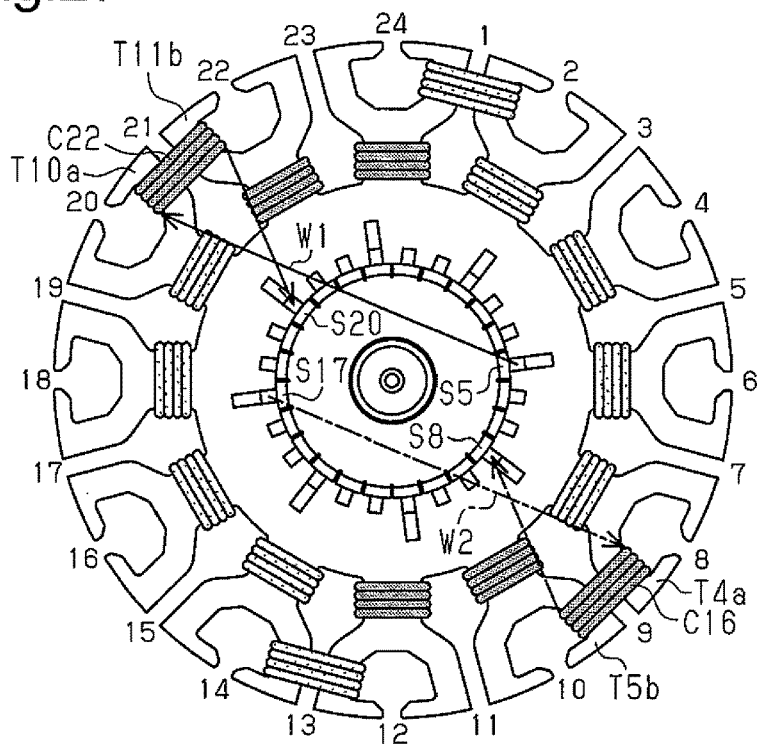
FIG. 27 is a view illustrating a winding order of twenty-second and sixteenth winding wires in the fourth embodiment.

As illustrated in FIG. 27, the A flyer routes the first conductor W1 hooked on the riser R of the fifth segment S5 in the counterclockwise direction to the slot SL with the slot number "20". Then, the A flyer winds the routed first conductor W1 in the reverse winding between the slots SL with the slot numbers "20" and "22", that is, between the second branch portion T11b of the eleventh tooth T11 and the first branch portion T10a of the tenth tooth T10. As a result, the twenty-second winding wire C22 in the reverse winding in the distributed winding is wound between the second branch portion T11b and the first branch portion T10a.

On the other hand, as illustrated in FIG. 27, the B flyer routes the second conductor W2 hooked on the riser R of the seventeenth segment S17 in the counterclockwise direction to the slot SL with the slot number "8". Then, the B flyer winds the routed second conductor W2 in the reverse winding between the slots SL with the slot numbers "8" and "10", that is, between the second branch portion T5b of the fifth tooth T5 and the first branch portion T4a of the fourth tooth T4. As a result, the sixteenth winding wire C16 in the reverse winding in the distributed winding is wound between the second branch portion T5b and the first branch portion T4a.

Winding-wire Winding Process 19 (Segment: S20, S8)

As illustrated in FIG. 27, the A flyer routes the first conductor W1 having wound the twenty-second winding wire C22 in the counterclockwise direction from the slot SL with the slot number "22" to the twentieth segment S20 and hooks it on the riser R of the twentieth segment S20.

On the other hand, as illustrated in FIG. 27, the B flyer routes the second conductor W2 having wound the sixteenth winding wire C16 in the counterclockwise direction from the slot SL with the slot number "10" to the eighth segment S8 and hooks it on the riser R of the eighth segment S8.

Winding-wire Winding Process 20 (Slot: Fourteenth Winding Wire C14, Twentieth Winding Wire C20)

Figure 28:
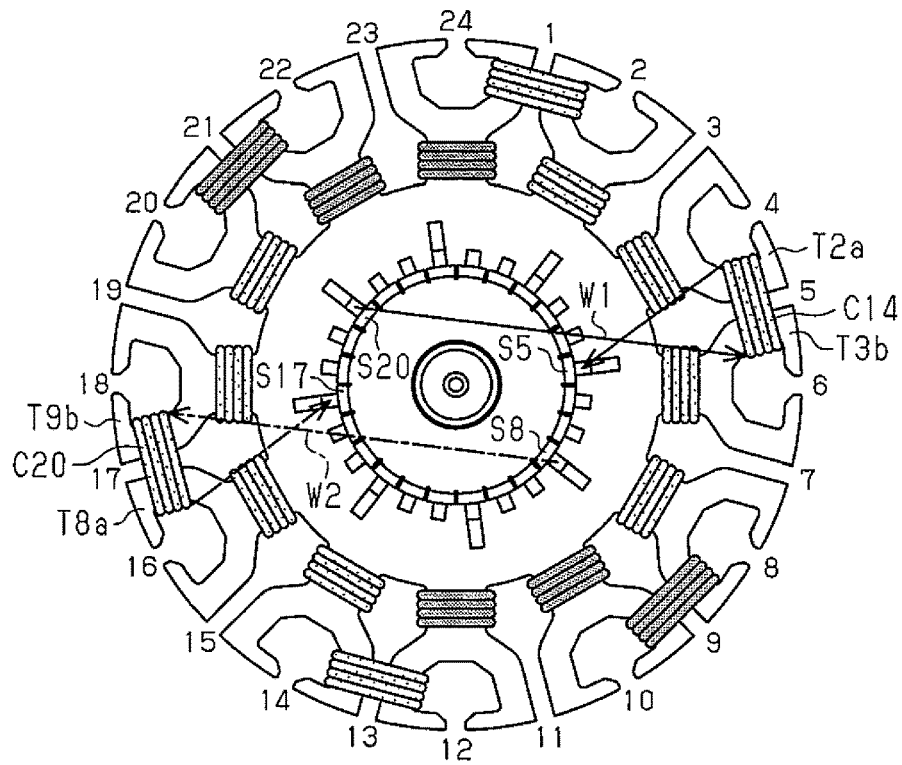
FIG. 28 is a view illustrating a winding order of fourteenth and twentieth winding wires in the fourth embodiment.

As illustrated in FIG. 28, the A flyer routes the first conductor W1 hooked on the riser R of the twentieth segment S20 in the clockwise direction to the slot SL with the slot number "6". Then, the A flyer winds the routed first conductor W1 in the forward winding between the slots SL with the slot numbers "6" and "4", that is, between the second branch portion T3b of the third tooth T3 and the first branch portion T2a of the second tooth T2. As a result, the fourteenth winding wire C14 in the forward winding in the distributed winding is wound between the second branch portion T3b and the first branch portion T2a.

On the other hand, as illustrated in FIG. 28, the B flyer routes the second conductor W2 hooked on the riser R of the eighth segment S8 in the clockwise direction to the slot SL with the slot number "18". Then, the B flyer winds the routed second conductor W2 in the forward winding between the slots SL with the slot numbers "18" and "16", that is, between the second branch portion T9b of the ninth tooth T9 and the first branch portion T8a of the eighth tooth T8. As a result, the twentieth winding wire C20 in the forward winding in the distributed winding is wound between the second branch portion T9b and the first branch portion T8a.

Winding-wire Winding Process 21 (Segment: S5, S17)

As illustrated in FIG. 28, the A flyer routes the first conductor W1 having wound the fourteenth winding wire C14 in the clockwise direction from the slot SL with the slot number "4" to the fifth segment S5 and hooks it on the riser R of the fifth segment S5.

On the other hand, as illustrated in FIG. 28, the B flyer routes the second conductor W2 having wound the twentieth winding wire C20 in the clockwise direction from the slot SL with the slot number "16" to the seventeenth segment S17 and hooks it on the riser R of the seventeenth segment S17.

Winding-wire Winding Process 22 (Disconnection)

The A flyer cuts off (disconnects) the first conductor W1 hooked by the riser R of the fifth segment S5.

The B flyer cuts off (disconnects) the second conductor W2 hooked on the riser R of the seventeenth segment S17.

Winding-wire Winding Process 23 (Segment: S14, S2)

Figure 29:
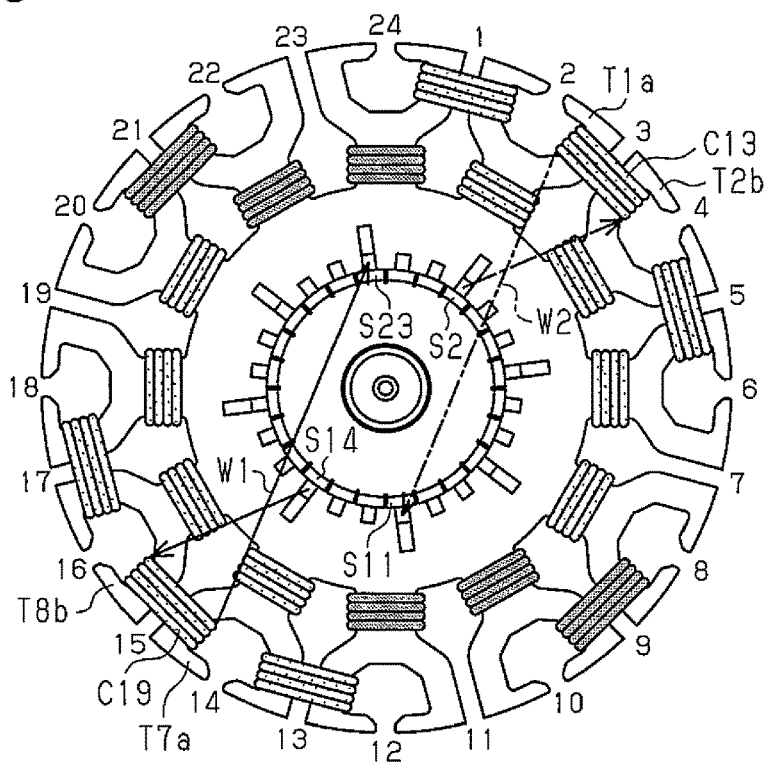
FIG. 29 is a view illustrating a winding order of nineteenth and thirteenth winding wires in the fourth embodiment.

As illustrated in FIG. 29, the A flyer newly hooks the cut first conductor W1 on the riser R of the fourteenth segment S14.

On the other hand, as illustrated in FIG. 29, the B flyer newly hooks the cut second conductor W2 on the riser R of the second segment S2.

Winding-wire Winding Process 24 (Slot: Nineteenth Winding Wire C19, Thirteenth Winding Wire C13)

As illustrated in FIG. 29, the A flyer routes the first conductor W1 hooked by the riser R of the fourteenth segment S14 in the clockwise direction to the slot SL with the slot number "16". Then, the A flyer winds the routed first conductor W1 in the forward winding between the slots SL with the slot numbers "16" and "14", that is, between the second branch portion T8b of the eighth tooth T8 and the first branch portion T7a of the seventh tooth T7. As a result, the nineteenth winding wire C19 in the forward winding in the distributed winding is wound between the second branch portion T8b and the first branch portion T7a.

On the other hand, as illustrated in FIG. 29, the B flyer routes the second conductor W2 hooked by the riser R of the second segment S2 in the clockwise direction to the slot SL with the slot number "4". Then, the B flyer winds the routed second conductor W2 in the forward winding between the slots SL with the slot numbers "4" and "2", that is, between the second branch portion T2b of the second tooth T2 and the first branch portion T1a of the first tooth T1. As a result, the thirteenth winding wire C13 in the forward winding in the distributed winding is wound between the second branch portion T2b and the first branch portion T1a.

Winding-wire Winding Process 25 (Segment: S23, S11)

As illustrated in FIG. 29, the A flyer routes the first conductor W1 having wound the nineteenth winding wire C19 in the clockwise direction from the slot SL with the slot number "14" to the twenty-third segment S23 and hooks it on the riser R of the twenty-third segment S23.

On the other hand, as illustrated in FIG. 29, the B flyer routes the second conductor W2 having wound the thirteenth winding wire C13 in the clockwise direction from the slot SL with the slot number "2" to the eleventh segment S11 and hooks it on the riser R of the eleventh segment S11.

Winding-wire Winding Process 26 (Slot: Twenty-third Winding Wire C23, Seventeenth Winding Wire C17)

Figure 30:
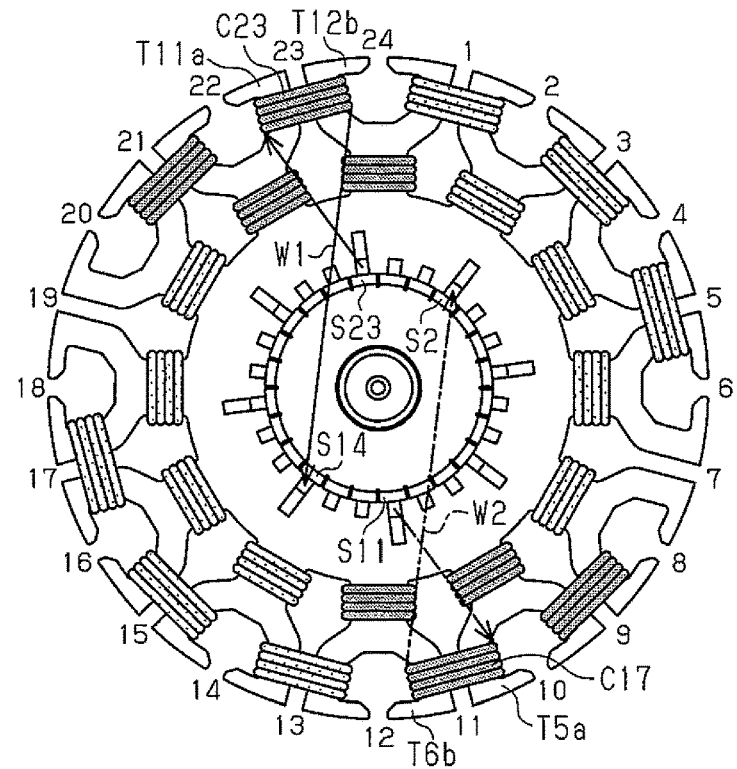
FIG. 30 is a view illustrating a winding order of twenty-third and seventeenth winding wires in the fourth embodiment.

As illustrated in FIG. 30, the A flyer routes the first conductor W1 hooked on the riser R of the twenty-third segment S23 in the counterclockwise direction to the slot SL with the slot number "22". Then, the A flyer winds the routed first conductor W1 in the reverse winding between the slots SL with the slot numbers "22" and "24", that is, between the second branch portion T12b of the twelfth tooth T12 and the first branch portion T11a of the eleventh tooth T11. As a result, the twenty-third winding wire C23 in the reverse winding in the distributed winding is wound between the second branch portion T12b and the first branch portion T11a.

On the other hand, as illustrated in FIG. 30, the B flyer routes the second conductor W2 hooked on the riser R of the eleventh segment S11 in the counterclockwise direction to the slot SL with the slot number "10". Then, the B flyer winds the routed second conductor W2 in the reverse winding between the slots SL with the slot numbers "10" and "12", that is, between the second branch portion T6b of the sixth tooth T6 and the first branch portion T5a of the fifth tooth T5. As a result, the seventeenth winding wire C17 in the reverse winding in the distributed winding is wound between the second branch portion T6b and the first branch portion T5a.

Winding-wire Winding Process 27 (Segment: S14, S2)

As illustrated in FIG. 30, the A flyer routes the first conductor W1 having wound the twenty-third winding wire C23 in the counterclockwise direction from the slot SL with the slot number "24" to the fourteenth segment S14 and hooks it on the riser R of the fourteenth segment S14.

On the other hand, as illustrated in FIG. 30, the B flyer routes the second conductor W2 having wound the seventeenth winding wire C17 in the counterclockwise direction from the slot SL with the slot number "12" to the second segment S2 and hooks it on the riser R of the second segment S2.

Winding-wire Winding Process 28 (Slot: Fifteenth Winding Wire C15, Twenty-first Winding Wire C21)

Figure 31:
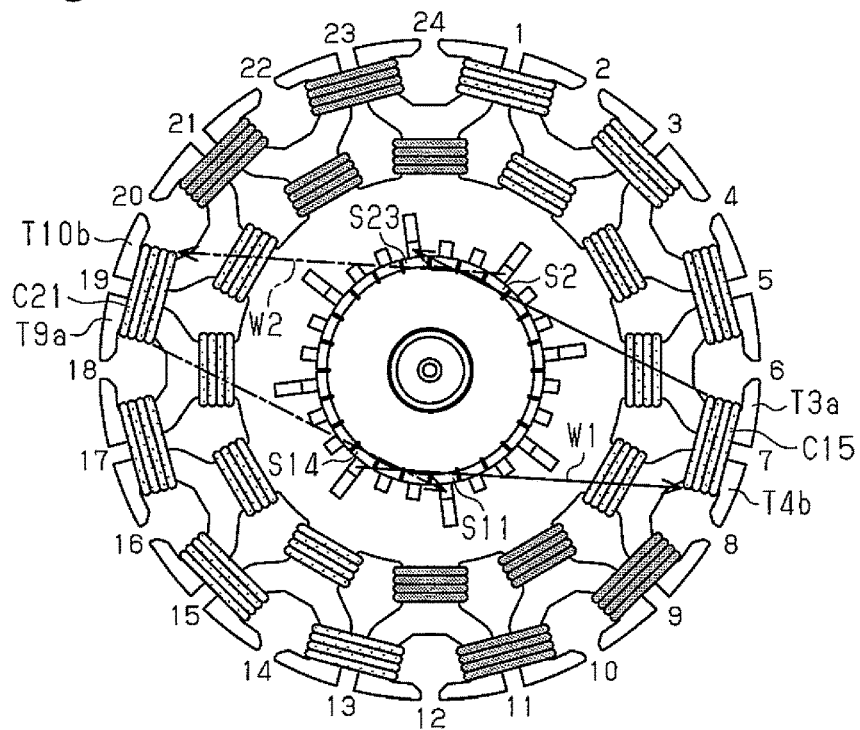
FIG. 31 is a view illustrating a winding order of fifteenth and twenty-first winding wires in the fourth embodiment.

As illustrated in FIG. 31, the A flyer routes the first conductor W1 hooked on the riser R of the fourteenth segment S14 in the counterclockwise direction to the slot SL with the slot number "8". Then, the A flyer winds the routed first conductor W1 in the forward winding between the slots SL with the slot numbers "8" and "6", that is, between the second branch portion T4b of the fourth tooth T4 and the first branch portion T3a of the third tooth T3. As a result, the fifteenth winding wire C15 in the forward winding in the distributed winding is wound between the second branch portion T4b and the first branch portion T3a.

On the other hand, as illustrated in FIG. 31, the B flyer routes the second conductor W2 hooked on the riser R of the second segment S2 in the counterclockwise direction to the slot SL with the slot number "20". Then, the B flyer winds the routed second conductor W2 in the forward winding between the slots SL with the slot numbers "20" and "18", that is, between the second branch portion T10b of the tenth tooth T10 and the first branch portion T9a of the ninth tooth T9. As a result, the twenty-first winding wire C21 in the forward winding in the distributed winding is wound between the second branch portion T10b and the first branch portion T9a.

Winding-wire Winding Process 29 (Segment: S23, S11)

As illustrated in FIG. 31, the A flyer routes the first conductor W1 having wound the fifteenth winding wire C15 in the counterclockwise direction from the slot SL with the slot number "6" to the twenty-third segment S23 and catches and hooks it on the riser R of the twenty-third segment S23.

On the other hand, as illustrated in FIG. 31, the B flyer routes the second conductor W2 having wound the twenty-first winding wire C21 in the counterclockwise direction from the slot SL with the slot number "18" to the eleventh segment S11 and catches and hooks it on the riser R of the eleventh segment S11.

As a result, the winding work of the first to twenty-fourth winding wires C1 to C24 using the double-flyer winding machine composed of the A flyer and the B flyer is finished.

Lastly, the risers R of the segments on which the start end portions (winding end portions) and the terminal end portions (winding end portions) of the first to twenty-fourth winding wires C1 to C24 are hooked are bent, and the fusing process is performed.

That is, the risers R of the eight segments, that is, the second, the fifth, the eighth, the eleventh, the fourteenth, the seventeenth, the twentieth, and the twenty-third segments S2, S5, S8, S11, S14, S17, S20, and S23 are bent in the direction in which the portions where the winding end portions of the respective corresponding winding wires are hooked are held. Subsequently, fusing is performed, and the risers R of the eight segments are joined and electrically connected to the winding end portion of each of the corresponding winding wires together with the non-end portion of each of the short-circuit wires by this fusing.

As a result, the armature 3 is produced.

Subsequently, an action of the above-described fourth embodiment will be described.

The first to eighth short-circuit wires L1 to L8 are routed in the counterclockwise direction from the risers R of the segments by which the start end portions are hooked, and the terminal end portions are hooked by the risers R of the respective corresponding segments spaced away by 240°. At this time, regarding the first to eighth short-circuit wires L1 to L8, the non-end portions are hooked on the risers R of the segments spaced away by 120° in the counterclockwise direction from the segments on which the start end portions are hooked when being routed in the counterclockwise direction and then, the first to eighth short-circuit wires L1 to L8 are routed to and hooked on the segments on which the terminal end portions spaced away by 120° in the counterclockwise direction are hooked.

Then, each of the risers R by which the start end portions and the terminal end portions of the first to eighth short-circuit wires L1 to L8 are hooked is bent. On the other hand, each of the risers R on which the non-end portions of the first to eighth short-circuit wires L1 to L8 are hooked is left unbent and used as a winding end portion of the winding wire. As a result, the hooking portions of the start end portions and the terminal end portions of the first to eighth short-circuit wires L1 to L8 are not affected by hooking of the winding end portions of the winding wires. Thus, when the winding wire is wound, the start end portions and the terminal end portions of the first to eighth short-circuit wires L1 to L8 do not become loose.

Moreover, since each of the risers R by which the start end portions and the terminal end portions of the first to eighth short-circuit wires L1 to L8 are hooked is bent, there is no more riser R which presents an obstacle when the winding wire is wound, and the winding work becomes easy.

Subsequently, advantages of the above-described fourth embodiment will be described below.

(8) According to this embodiment, the winding end portions of the winding wires are hooked by the risers R of the eight segments, that is, the second, the fifth, the eighth, the eleventh, the fourteenth, the seventeenth, the twentieth, and the twenty-third segments S2, S5, S8, S11, S14, S17, S20, and S23 on which the non-end portions of the first to eighth short-circuit wires L1 to L8 are hooked, and the winding wires are wound. Therefore, the hooked portions of the start end portions and the terminal end portions of the first to eighth short-circuit wires L1 to L8 are not affected by hooking of the winding end portions of the winding wires. As a result, there is no concern that the hooked portions of the start end portions and the terminal end portions of the first to eighth short-circuit wires L1 to L8 become loose.

(9) According to this embodiment, arrangement is made such that the risers R of the second, the fifth, the eighth, the eleventh, the fourteenth, the seventeenth, the twentieth, and the twenty-third segments S2, S5, S8, S11, S14, S17, S20, and S23 on which the non-end portions are hooked, that is, the risers R of the segments used for winding of the winding wires are not adjacent to each other in the circumferential direction. Moreover, in the riser bending process, all the risers R except the risers R used for winding of the winding wires are bent. Therefore, when the winding end portions of the winding wires are to be hooked on the risers R, since the risers R not used for winding of the winding wires have been bent, there is no more riser R which presents an obstacle, and the winding of the winding wires can be performed easily and accurately.

(10) According to this embodiment, the double-flyer winding machine is used, and connecting of the first to eighth short-circuit wires L1 to L8 is shared by the A flyer and the B flyer of the double-flyer winding machine. Thus, time for the connecting work can be reduced.

(11) According to this embodiment, the double-flyer winding machine is used, and winding of the first to twenty-fourth winding wires C1 to C24 is shared by the A flyer and the B flyer of the double-flyer winding machine. Thus, time for the winding work can be reduced.

The fourth embodiment may be changed as follows:

In the above-described fourth embodiment, the number of poles of the magnetic poles (magnets) provided in the stator 2 is set to 6, the number of slots to 24, and the number of segments to 24, but this may be changed as appropriate. The present invention may be applied to a DC motor having an armature with the number of magnetic poles being 4, the number of slots being 18, and the number of segments being 18, for example.

Figure 32:
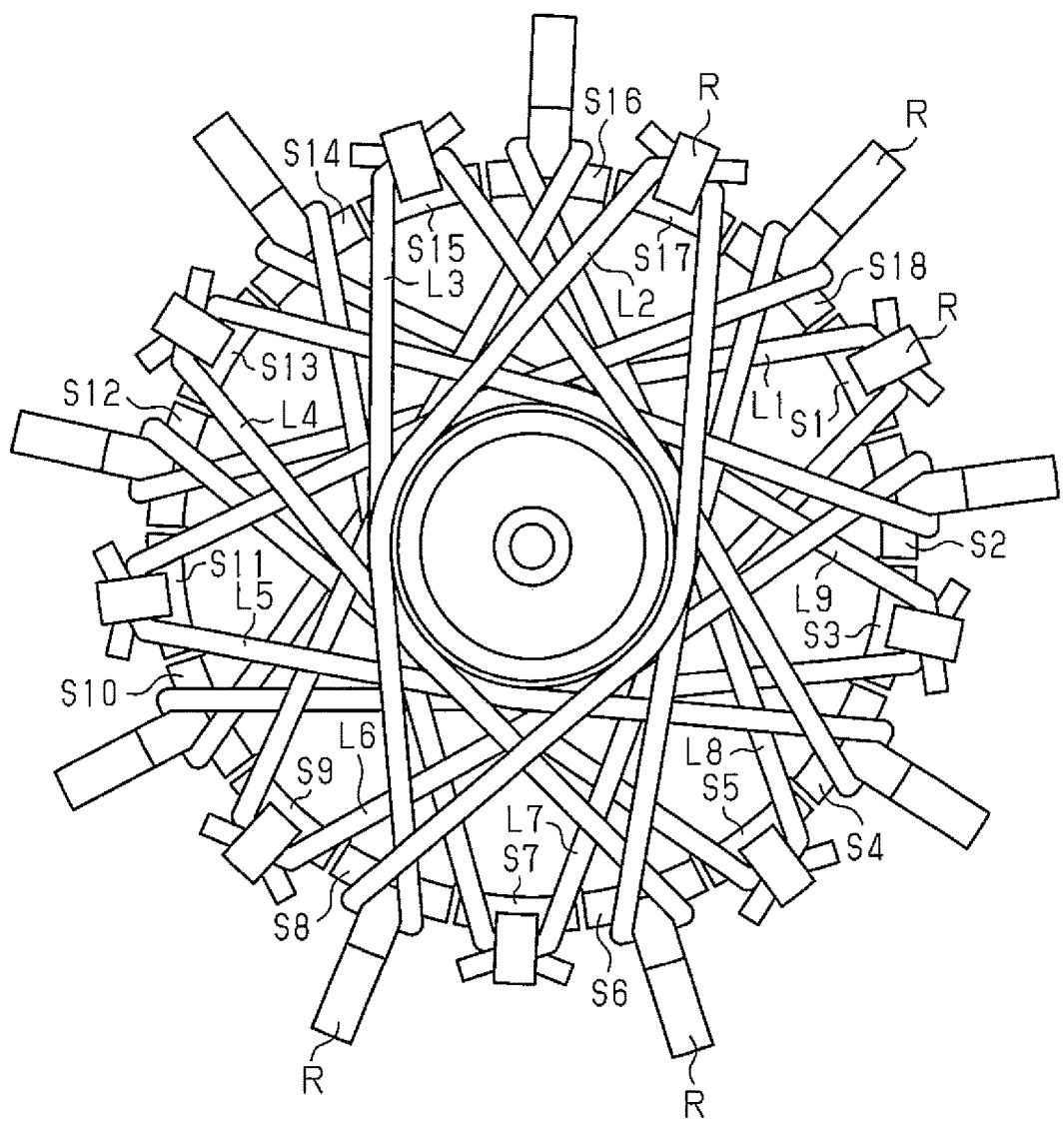
FIG. 32 is a front view of a state in which each of short-circuit wires of an armature of another example of the fourth embodiment is connected when seen from the axial direction.
Figure 33:
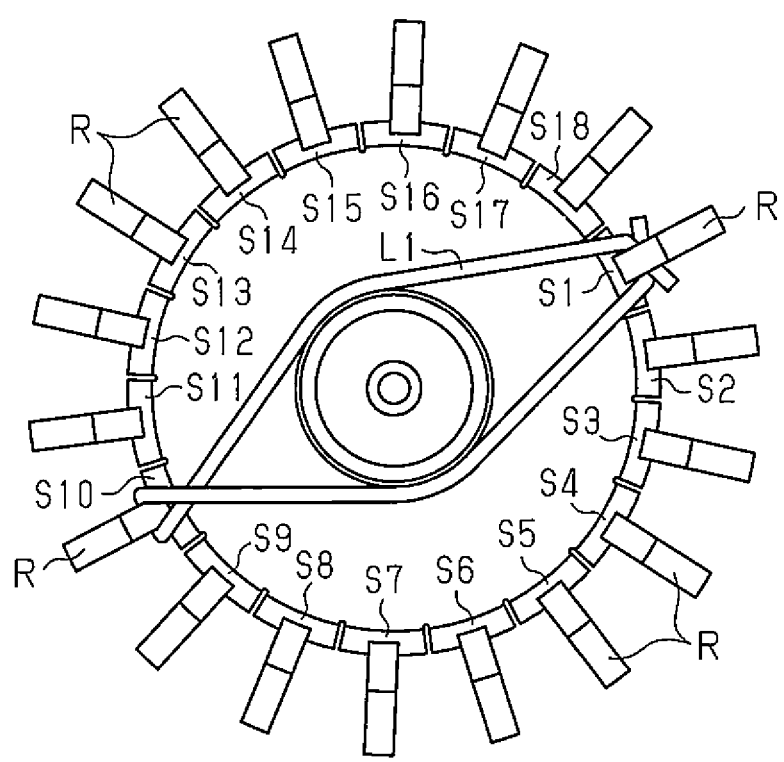
FIG. 33 is a view illustrating a connecting method of one short-circuit wire of the armature of the other example of the fourth embodiment.

In this case, as illustrated in FIGS. 32 and 33, nine short-circuit wires, that is, the first to ninth short-circuit wires L1 to L9 are provided for the commutator 5 having 18 segments, that is, the first to eighteenth segments S1 to S18. Then, with the two segments faced with each other by 180° forming a set, the short-circuit wire is assigned to each of the nine sets.

The connecting method of the short-circuit wires of each set is performed as illustrated in FIG. 33, for example. The start end portion of the first short-circuit wire L1 is hooked by the riser R of the first segment S1 for the set of the first segment S1 and the tenth segment S10. After that, the first short-circuit wire L1 is routed in the counterclockwise direction to the tenth segment S10 spaced away in the circumferential direction by 180° and crossed and hooked on the riser R of the tenth segment S10. Then, the first short-circuit wire L1 hooked on the riser R of the tenth segment S10 is routed in the counterclockwise direction to the preceding first segment S1 and hooked by the riser R of the first segment S1. As a result, the first short-circuit wire L1 is formed.

Then, by performing the subsequent wiring with the similar method, the first to ninth short-circuit wires L1 to L9 are provided on the commutator 5.

When the first to ninth short-circuit wires L1 to L9 are to be wired, the segments on which the non-end portions of the first to ninth short-circuit wires L1 to L9 are crossed and hooked are arranged away from each other with the two segments between them.

In the above-described fourth embodiment, the armature 3 of the DC motor 1 has a plurality of teeth T. Each of the teeth T is provided with the first and second branch portions Ta and Tb located at distal end portions of the inner winding portions Tc. Instead of this, the present invention may be applied to the armature 3 in which each of the teeth T is not provided with the first and second branch portions Ta and Tb.

In the above-described fourth embodiment, the present invention is embodied in the DC motor 1 provided with the anode-side brush B1 and the cathode-side brush B2 one each, but the present invention may be embodied in the DC motor provided with the anode-side brush B1 and the cathode-side brush B2 in plural, respectively.

In the above-described fourth embodiment, the connection of the first to eighth short-circuit wires L1 to L8 and the winding of the first to twenty-fourth winding wires C1 to C24 are performed by the double flyer composed of the A flyer and the B flyer. Instead of this, the connection of the first to eighth short-circuit wires L1 to L8 and the winding of the first to twenty-fourth winding wires C1 to C24 may be performed by one flyer.

In the above-described fourth embodiment, the risers R of the segments on which the start end portions and the terminal end portions of the first to eighth short-circuit wires L1 to L8 are hooked are bent in the riser bending process and then, the winding-wire winding process is started. Instead of the riser bending process, the risers R of the segments on which the start end portions and the terminal end portions of the first to eighth short-circuit wires L1 to L8 are hooked may be bent (crimped) before starting the winding-wire winding process and together with the fusing process.

It is needless to say that fusing between the start end portions and the terminal end portions of the first to eighth short-circuit wires L1 to L8 and the risers R of the segments may be performed in the fusing process in which the risers R of the second, the fifth, the eighth, the eleventh, the fourteenth, the seventeenth, the twentieth, and the twenty-third segments S2, S5, S8, S11, S14, S17, S20, and S23 and the start end portions and the terminal end portions of the winding wires are fused.

What is claimed is:

1. An armature comprising a commutator including:
   a plurality of segments grouped into a plurality of sets, each set including the plurality of segments, and each of the segments having a riser;
   a plurality of short-circuit wires, each of the short-circuit wires being configured such that the plurality of segments are electrically conducted to equalize in potential the plurality of segments in each set, each of the short-circuit wires including a start end portion, a terminal end portion, and a non-end portion located between the start end portion and the terminal end portion, and the non-end portion is hooked by the riser of segment in the same set as the segment to which the start end portion is connected and the segment to which the terminal end portion is connected but different from them, wherein
   the non-end portion of each of the short-circuit wires is hooked by the riser of segment so as not to become adjacent to the non-end portion of another short-circuit wire in the circumferential direction; and
   the winding wire is wound by using the riser of segment by which each of the non-end portions of the short-circuit wires is hooked.

* * * * *